United States Patent
Chang et al.

(10) Patent No.: US 10,662,206 B2
(45) Date of Patent: May 26, 2020

(54) METHOD FOR PREPARING SILANE DERIVATIVES FROM FURAN DERIVATIVES IN PRESENCE OF BORANE CATALYST

(71) Applicants: INSTITUTE FOR BASIC SCIENCE, Daejeon (KR); KOREA ADVANCED INSTITUTE OF SCIENCE AND TECHNOLOGY, Daejeon (KR)

(72) Inventors: Sukbok Chang, Daejeon (KR); Chinmoy Kumar Hazra, Daejeon (KR); Narasimhulu Gandhamsetty, Daejeon (KR)

(73) Assignees: INSTITUTE FOR BASIC SCIENCE, Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/304,662

(22) PCT Filed: May 24, 2017

(86) PCT No.: PCT/KR2017/005405
§ 371 (c)(1),
(2) Date: Dec. 17, 2018

(87) PCT Pub. No.: WO2017/204554
PCT Pub. Date: Nov. 30, 2017

(65) Prior Publication Data
US 2019/0263840 A1   Aug. 29, 2019

(30) Foreign Application Priority Data

May 24, 2016  (KR) .................. 10-2016-0063438
May 24, 2016  (KR) .................. 10-2016-0063562

(51) Int. Cl.
*C07F 7/08* (2006.01)
*B01J 31/14* (2006.01)

(52) U.S. Cl.
CPC .............. *C07F 7/0801* (2013.01); *B01J 31/14* (2013.01); *B01J 31/146* (2013.01); *C07F 7/08* (2013.01); *B01J 2231/323* (2013.01)

(58) Field of Classification Search
None
See application file for complete search history.

(56) References Cited

FOREIGN PATENT DOCUMENTS

RU   2 440 360 C2   1/2012

OTHER PUBLICATIONS

Kim et al., Angew. Chemie International Edition, 2016, vol. 55(1), pp. 218-222. (Year: 2016).*
ISA_Written_Opinion—PCT/KR2017/005405 (dated 2017).*
Youngchan Kim et al., Borane-Catalyzed Reductive α-Silylation of Conjugated Esters and Amides Leaving Carbonyl Groups Intact, Angewandte Chemie International Edition, Nov. 9, 2015, pp. 218-222, vol. 55, No. 1.
Antonio Romero et al., Stereoselective Synthesis of Highly Substituted γ-Lactams by the [3+2] Annulation of α-Siloxy Allylic Silanes with Chlorosulfonyl Isocyanate, Organic Letters, 2006, pp. 2127-2130, vol. 8, No. 1.
Noorsaadah Abd. Rahman et al., Compatibility Studies of Dimethyl(phenyl)silyl Group as a Masked Hydroxyl Group in Compounds Containing Cyclopropane Rings and in Compounds Containing the Enone Functionality, Synthetic Communications, 1993, pp. 1583-1994, vol. 23, No. 11.
Maria J. Climent et al., Conversion of biomass platform molecules into fuel additives and liquid hydrocarbon fuels, Green Chemistry, 2014, pp. 516-547, vol. 16, Royal Society of Chemistry.
Chinmoy K. Hazra et al., Borane catalysed ring opening and closing cascades of furans leading to silicon functionalized synthetic intermediates, nature Communications, Nov. 28, 2016, pp. 2-7, vol. 7, Article No. 13431.
International Search Report for PCT/KR2017/005405 dated Nov. 29, 2017.

* cited by examiner

*Primary Examiner* — Clinton A Brooks
*Assistant Examiner* — Kofi Adzamli
(74) *Attorney, Agent, or Firm* — Hauptman Ham, LLP

(57) ABSTRACT

The present invention relates to a method for preparing various silane derivatives by subjecting various furan derivatives to hydrosilylation in the presence of a borane catalyst. The method for preparing silane derivatives according to the present invention is a very efficient method for converting, into high value-added silane derivatives, various furan derivatives derived from biomass.

7 Claims, No Drawings

METHOD FOR PREPARING SILANE DERIVATIVES FROM FURAN DERIVATIVES IN PRESENCE OF BORANE CATALYST

CROSS REFERENCE TO RELATED APPLICATION

This present application is a national stage filing under 35 U.S.C § 371 of PCT application number PCT/KR2017/005405 filed on May 24, 2017 which is based upon and claims the benefit of priority to Korean Patent Application Nos. 10-2016-0063438 and 10-2016-0063562 both filed on May 24, 2016 respectively in the Korean Intellectual Property Office. The disclosures of the above-listed applications are hereby incorporated by reference herein in their entirety.

TECHNICAL FIELD

The present invention relates to a method of preparing a silane derivative from various furan derivatives in the presence of a borane catalyst, and more particularly, to a method of preparing a silane derivative that is available as a raw material, an intermediate, and the like in various fields using a borane catalyst from various furan derivatives from biomass.

BACKGROUND ART

Currently, crude oil is the most important raw material to produce fine chemical substances, polymer materials, or medicines. However, there is a need to develop alternatives for replacing crude oil along with reduction in oil reserves as well as an environmental problem due to collection, transportation, and refinement of crude oil.

Biomass has emerged as one of these alternatives. Biomass may be an important source for producing hydrocarbon and chemical substances with a high added value.

Accordingly, recently, research has been conducted in various ways into a reaction for entire or partial reduction of cellulose to prepare bioethanol, hydrocarbon, or synthesized intermediate.

Various furan derivatives including furfural, hydroxymethyl furfural (HMF) and derivatives from biomass thereof are capable of being used as a raw material and intermediates of various chemical substances and, thus, may be an important raw material.

Although a furan derivative is capable of being inexpensively and easily obtained from carbohydrate, numerous researches into a reaction of a furan derivative using a metallic catalyst have been reported, but there is still a need for research into a reaction of a furan derivative that is capable of being commercially mass-produced due to a high yield under an eco-friendly or mild condition without using transition metal.

For example, Green Chem. 16, 516-47 (2014) discloses a method of preparing a biomass-derived material including furan or the like as a functional group in the form of a liquid fuel, or the like via various reactions.

DISCLOSURE

Technical Problem

An object of the present invention is to provide a method of preparing a silane derivative via hydrosilylation of various furan derivatives in the presence of a borane catalyst.

Another object of the present invention is to provide various silane derivatives prepared via hydrosilylation of various furan derivatives in the presence of a borane catalyst.

Technical Solution

The present invention may provide a method of preparing a silane derivative from various furan derivatives in the presence of a borane catalyst, and more particularly, a method of preparing various silane derivatives with high stereoselectivity and a high yield under a mild condition through hydrosilylation of a furan derivative in the presence of a borane catalyst, and silane derivative prepared using the method.

The method of preparing the silane derivative according to the present invention may be very effective to obtain a silane derivative with a high yield by performing hydrosilylation of a furan derivative and a silane compound under a mild condition in the presence of a borane catalyst.

The method of preparing the silane derivative according to the present invention may be advantageous to have a high yield because a byproduct is almost barely present and to be commercially mass-produced with very high stereoselectivity and a very high conversion yield.

The present invention provides a method of preparing an anti-(2-alkyl)cyclopropyl silane derivative with an organic silyl group introduced to a specific location, which is available as an important intermediate and synthon to synthesize various medicines and agricultural chemical material, and more particularly, a method of preparing an anti-(2-alkyl)cyclopropyl silane derivative with a high yield via high stereoselectivity under a mild condition through ring-opening, hydrosilylation, and cyclization of various furan compounds from biomass using silane compound in the presence of a borane catalyst, and an anti-(2-alkyl)cyclopropyl silane derivative prepared using the method.

The method of preparing an anti-(2-alkyl)cyclopropyl silane derivative according to the present invention may be very effective to obtain an anti-(2-alkyl)cyclopropyl silane derivative with a high yield via high stereoselectivity through ring-opening, hydrosilylation, and cyclization of various furan compounds and silane compounds in one pot under a mild condition in the presence of a borane catalyst.

In addition, the method of preparing an anti-(2-alkyl) cyclopropyl silane derivative according to the present invention may be advantageous to be commercially mass-produced due to a high yield, very high stereoselectivity, and a very high conversion yield.

In more detail, the present invention may relate to two aspects of (I) a method of preparing a silane derivative obtained via ring-opening of a furan compound via a reaction between a silane compound and furan compound from biomass and (II) a method of preparing a cyclopropyl silane derivative via a reaction between a silane compound and a furan compound from biomass.

Hereinafter, the method of preparing a ring-opened silane derivative obtained via a reaction between a furan compound and a silane compound, of the above two aspects according to the present invention, will be described in detail and includes five aspects in detail.

As the aspect (I-1) above, a method of preparing a silane derivative represented by Chemical Formula 1 may include preparing Chemical Formula 1 via a reaction between Chemical Formula 2 and a silane compound of Chemical Formula 3 in the presence of a borane catalyst.

[Chemical Formula 1]

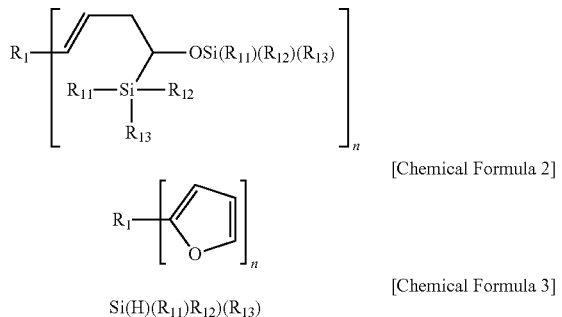

[Chemical Formula 2]

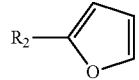

[Chemical Formula 3]

Si(H)(R$_{11}$)R$_{12}$)(R$_{13}$)

In Chemical Formulae 1 to 3,

R$_1$ is C$_1$-C$_{10}$ alkyl or C$_6$-C$_{20}$ aryl with a radical number depending on n;

R$_{11}$ to R$_{13}$ are each independently C$_1$-C$_{10}$ alkyl or C$_6$-C$_{12}$ aryl;

n is an integer of 1 to 3 and, when n is equal to or greater than 2, R$_1$ is C$_6$-C$_{12}$ aryl; and alkyl and aryl of R$_1$ are further substituted with any one selected from halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, and —OSi(R$_{21}$)(R$_{22}$)(R$_{23}$) and R$_{21}$ to R$_{23}$ are each independently C$_1$-C$_{10}$ alkyl or C$_6$-C$_{12}$ aryl.

The method of preparing the silane derivative according to the present invention may be very effective to obtain a silane derivative represented by Chemical Formula 1, in more detail, a siloxyalkenylsilane derivative with a high yield under a mild condition via a reaction between a furan derivative represented by Chemical Formula 2 and a silane compound represented by Chemical Formula 3 in the presence of a borane catalyst.

In the method of preparing the silane derivative according to the present invention, an α-siloxy-Z-alkenylsilane derivative may be prepared with a high yield via high stereoselectivity because a byproduct is almost barely present.

According to the present invention, in the case in which R$_1$ is C$_6$-C$_{20}$ aryl with a radical number depending on n, when n is 2, R$_1$ may be arylene (e.g., penylene) with two radicals and, when n is 3, R$_1$ may be, for example,

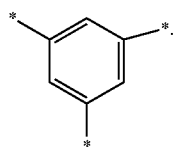

Chemical Formula 1 according to an embodiment of the present invention may be represented by Chemical Formula 1-1 and Chemical Formula 2 may be represented by Chemical Formula 2-1.

[Chemical Formula 1-1]

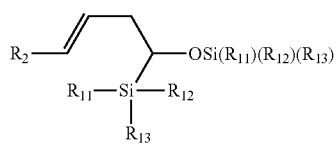

[Chemical Formula 2-1]

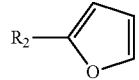

In Chemical Formulae 1-1 and 2-1,

R$_2$ may be C$_1$-C$_{10}$ alkyl or C$_6$-C$_{18}$ aryl;

R$_{11}$ to R$_{13}$ may be each independently C$_1$-C$_{10}$ alkyl or C$_6$-C$_{12}$ aryl;

alkyl and aryl of R$_2$ may be further substituted with any one selected from halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, and —OSi(R$_{21}$)(R$_{22}$)(R$_{23}$), and R$_{21}$ to R$_{23}$ may each independently be C$_1$-C$_{10}$ alkyl or C$_6$-C$_{12}$ aryl.

In Chemical Formulae 1-1 and 2-1, R$_2$ may be C$_1$-C$_7$ alkyl or C$_6$-C$_{15}$ aryl, alkyl and aryl of R$_1$ may be further substituted by any one selected from halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, and —OSi(R$_{21}$)(R$_{22}$)(R$_{23}$), and R$_{21}$ to R$_{23}$ may each independently be C$_1$-C$_{10}$ alkyl or C$_6$-C$_{12}$ aryl.

Chemical Formula 1 may be represented by Chemical Formula 1-2 and Chemical Formula 2 may be represented by Chemical Formula 2-2.

[Chemical Formula 1-2]

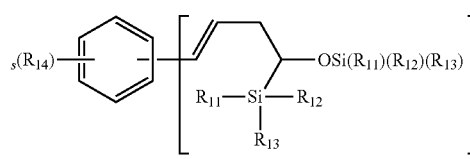

[Chemical Formula 2-2]

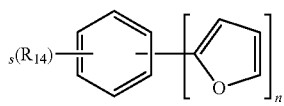

In Chemical Formulae 1-2 and 2-2,

R$_{11}$ to R$_{13}$ may each independently be C$_1$-C$_{10}$ alkyl or C$_6$-C$_{12}$ aryl;

n may be an integer of 1 to 3;

R$_{14}$ may be halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, or —OSi(R$_{21}$)(R$_{22}$)(R$_{23}$);

R$_{21}$ to R$_{23}$ may each independently be C$_1$-C$_{10}$ alkyl or C$_6$-C$_{12}$ aryl; and s may be an integer of 0 or 1 to 4 and n+ s≤6.

In Chemical Formulae 1-2 and 2-2, n may be an integer of 2 to 3;

R$_{14}$ may be halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, or C$_6$-C$_{12}$ aryloxy.

The present invention may provide a silane derivative of Chemical Formula 1 prepared via hydrosilylation of furan derivative in the presence of a borane catalyst.

In detail, a silane derivative of Chemical Formula 1 may be selected from the following compounds but is not limited thereto.

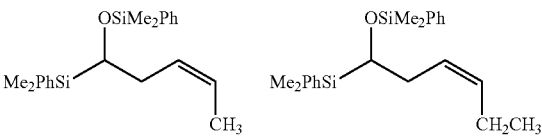

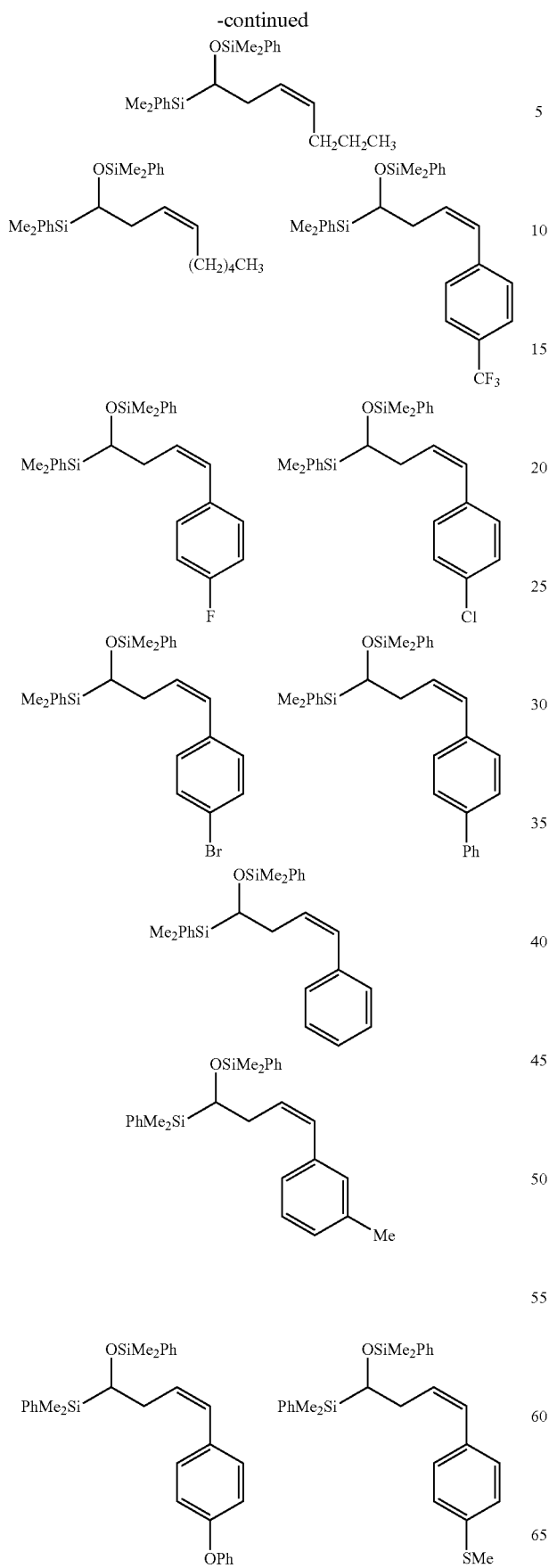
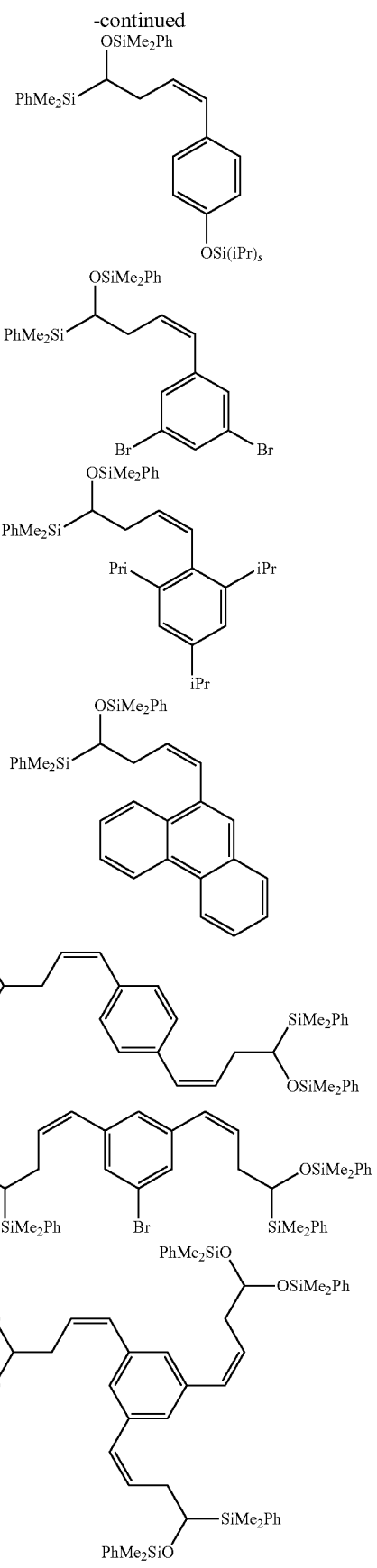

Second, (I-2) a method of preparing a silane derivative represented by Chemical Formula 4 according to the present invention may include preparing Chemical Formula 4 via a reaction between Chemical Formula 5 and Chemical Formula 3 in the presence of a borane catalyst.

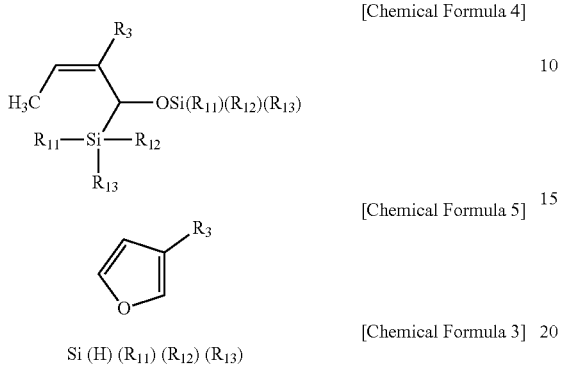

[Chemical Formula 4]

[Chemical Formula 5]

[Chemical Formula 3]

Si (H) ($R_{11}$) ($R_{12}$) ($R_{13}$)

In Chemical Formulae 3 to 5, $R_3$ may be hydrogen, $C_1$-$C_{10}$ alkyl, or $C_6$-$C_{12}$ aryl;

$R_{11}$ to $R_{13}$ may each independently be $C_1$-$C_{10}$ alkyl or $C_6$-$C_{12}$ aryl;

alkyl and aryl of $R_3$ may be further substituted with any one selected from halogen, $C_1$-$C_{10}$ alkyl, halo $C_1$-$C_{10}$ alkyl, thio $C_1$-$C_{10}$ alkyl, $C_1$-$C_{10}$ alkoxy, $C_6$-$C_{12}$ aryl, $C_6$-$C_{12}$ aryloxy, and —OSi($R_{21}$)($R_{22}$)($R_{23}$) and $R_{21}$ to $R_{23}$ may each independently be $C_1$-$C_{10}$ alkyl or $C_6$-$C_{12}$ aryl.

In Chemical Formulae 4 to 5, $R_3$ may be hydrogen or $C_6$-$C_{12}$ aryl.

The present invention may provide a silane derivative represented by Chemical Formula 4.

Third, (I-3) a method of preparing a silane derivative represented by Chemical Formula 6 according to the present invention may include preparing Chemical Formula 6 via a reaction between Chemical Formula 7 and Chemical Formula 3 in the presence of a borane catalyst.

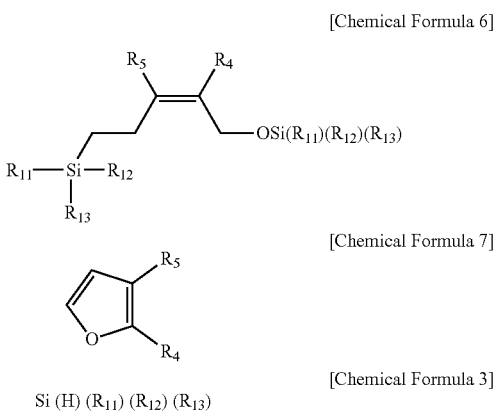

[Chemical Formula 6]

[Chemical Formula 7]

[Chemical Formula 3]

Si (H) ($R_{11}$) ($R_{12}$) ($R_{13}$)

In Chemical Formulae 3, 6, and 7, $R_4$ and $R_5$ may each independently be $C_1$-$C_{10}$ alkyl or $C_6$-$C_{12}$ aryl;

$R_{11}$ to $R_{13}$ may each independently be $C_1$-$C_{10}$ alkyl or $C_6$-$C_{12}$ aryl; and alkyl and aryl of $R_4$ and $R_5$ may be further substituted with any one selected from halogen, $C_1$-$C_{10}$ alkyl, halo $C_1$-$C_{10}$ alkyl, thio $C_1$-$C_{10}$ alkyl, $C_1$-$C_{10}$ alkoxy, $C_6$-$C_{12}$ aryl, $C_6$-$C_{12}$ aryloxy, and —OSi($R_{21}$)($R_{22}$)($R_{23}$), and $R_{21}$ to $R_{23}$ may each independently be $C_1$-$C_{10}$ alkyl or $C_6$-$C_{12}$ aryl.

In Chemical Formulae 6 and 7, $R_4$ and $R_5$ may each independently be $C_1$-$C_{10}$ alkyl, and alkyl of $R_4$ and $R_5$ may be further substituted with halogen, $C_1$-$C_{10}$ alkyl, or halo $C_1$-$C_{10}$ alkyl.

The present invention may provide a silane derivative represented by Chemical Formula 6.

Fourth, (I-4) a method of preparing a silane derivative represented by Chemical Formula 8 according to the present invention may include preparing Chemical Formula 8 via a reaction between Chemical Formula 9 and Chemical Formula 3-1 in the presence of a borane catalyst.

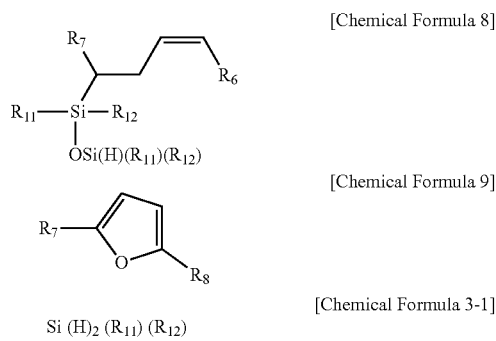

[Chemical Formula 8]

[Chemical Formula 9]

[Chemical Formula 3-1]

Si (H)$_2$ ($R_{11}$) ($R_{12}$)

In Chemical Formulae 3-1 and 8 to 9, $R_6$ and $R_7$ may each independently $C_1$-$C_{10}$ alkyl or $C_6$-$C_{12}$ aryl;

$R_{11}$ and $R_{12}$ may each be $C_6$-$C_{12}$ aryl in the same way; and alkyl and aryl of $R_6$ and $R_7$ may be further substituted with any one selected from halogen, $C_1$-$C_{10}$ alkyl, halo $C_1$-$C_{10}$ alkyl, thio $C_1$-$C_{10}$ alkyl, $C_1$-$C_{10}$ alkoxy, $C_6$-$C_{12}$ aryl, $C_6$-$C_{12}$ aryloxy, and —OSi($R_{21}$)($R_{22}$)($R_{23}$) and $R_{21}$ to $R_{23}$ may each independently $C_1$-$C_{10}$ alkyl or $C_6$-$C_{12}$ aryl.

In Chemical Formulae 8 and 9, $R_6$ and $R_7$ may each independently $C_1$-$C_{10}$ alkyl, and alkyl of $R_6$ and $R_7$ may be further substituted with any one selected from halogen, $C_1$-$C_{10}$ alkyl, halo $C_1$-$C_{10}$ alkyl, and $C_1$-$C_{10}$ alkoxy.

The present invention may provide a silane derivative of Chemical Formula 8.

Fifth, (I-5) a method of preparing a silane derivative represented by Chemical Formula 10 may include preparing Chemical Formula 10 via a reaction between Chemical Formula 11 and Chemical Formula 3 in the presence of a borane catalyst.

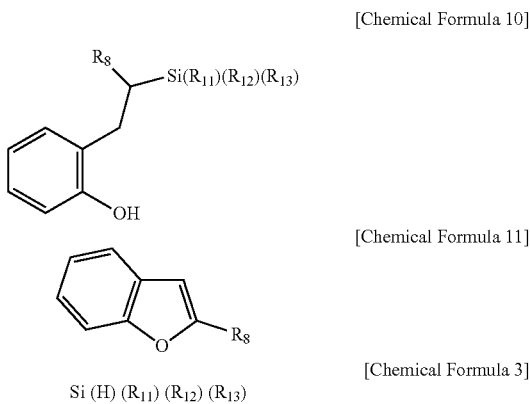

[Chemical Formula 10]

[Chemical Formula 11]

[Chemical Formula 3]

Si (H) ($R_{11}$) ($R_{12}$) ($R_{13}$)

In Chemical Formulae 3, 10, and 11, $R_8$ may be hydrogen, $C_1$-$C_{10}$ alkyl, or $C_6$-$C_{12}$ aryl;

$R_{11}$ to $R_{13}$ may each independently $C_1$-$C_{10}$ alkyl or $C_6$-$C_{12}$ aryl; and alkyl and aryl of $R_8$ may be further substituted with any one selected from halogen, $C_1$-$C_{10}$ alkyl, halo $C_1$-$C_{10}$ alkyl, thio $C_1$-$C_{10}$ alkyl, $C_1$-$C_{10}$ alkoxy, $C_6$-$C_{12}$ aryl, $C_6$-$C_{12}$ aryloxy, and —$OSi(R_{21})(R_{22})(R_{23})$, and $R_{21}$ to $R_{23}$ may each independently $C_1$-$C_{10}$ alkyl or $C_6$-$C_{12}$ aryl.

In detail, the silane derivative represented by Chemical Formula 10 according to the present invention may be prepared by preparing Chemical Formula 12 from Chemical Formula 11 and, then, preparing Chemical Formula 10 from Chemical Formula 12 under base.

[Chemical Formula 12]

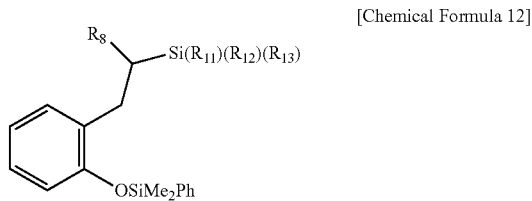

In Chemical Formula 12, $R_8$ may be hydrogen, $C_1$-$C_{10}$ alkyl, or $C_6$-$C_{12}$ aryl;

$R_{11}$ to $R_{13}$ may each independently $C_1$-$C_{10}$ alkyl or $C_6$-$C_{12}$ aryl; and alkyl and aryl of $R_8$ may be further substituted with any one selected from halogen, $C_1$-$C_{10}$ alkyl, halo $C_1$-$C_{10}$ alkyl, thio $C_1$-$C_{10}$ alkyl, $C_1$-$C_{10}$ alkoxy, $C_6$-$C_{12}$ aryl, $C_6$-$C_{12}$ aryloxy, and —$OSi(R_{21})(R_{22})(R_{23})$, and $R_{21}$ to $R_{23}$ may each independently $C_1$-$C_{10}$ alkyl or $C_6$-$C_{12}$ aryl.

The base according to an embodiment of the present invention may be any base that is recognizable by one of ordinary skill in the art but, for example, may be one or two or more selected from $K_2CO_3$, and tetra(n-butyl)ammoniumfluoride (TBAF) and may be used in 1.5 to 2.5 moles based on 1 mol of the furan derivative.

The present invention may provide a silane derivative represented by Chemical Formula 10.

In detail, the silane derivative represented by Chemical Formula 10 may be selected from the following compounds but is not limited thereto.

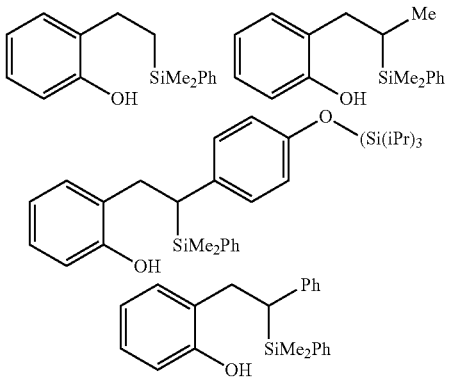

In the specification, the "alkyl", "alkoxy" and other substitution compounds including a part "alkyl" may include any linear or branched chain and may have $C_1$-$C_{10}$ atoms, in detail, $C_1$-$C_7$ atoms, in more detail, $C_1$-$C_5$ atoms.

An example thereof may include methyl, ethyl, propyl, isopropyl, butyl, isobutyl, t-butyl, pentyl, hexyl, octyl, and nonyl but is not limited thereto.

The "haloalkyl" stated in the specification may refer to substitution of one or more hydrogen coupled to a carbon atom of an alkyl group with halogen and, for example, may be trifluoromethyl.

The "aryl" stated in the specification may be an organic radical derived from aromatic hydrocarbon by removing one hydrogen, and each ring may appropriately include a single or fused ring system including 4 to 7 ring atoms, in detail, 5 or 6 ring atoms, and may also include a plurality of aryls connected via single bond. An example thereof may include phenyl, naphthyl, biphenyl, anthryl, indenyl, and fluorenyl but is not limited thereto.

The term "aryloxy" stated in the specification may refer to —O-aryl radical and, here, the 'aryl' is defined as described above. An example of the aryloxy radical may include phenoxy and naphthoxy but is not limited thereto.

The term "alkylthio" stated in the specification may refer to —S-alkyl radical and, here, the 'alkyl' is defined as described above. An example of the alkylthio radical may include methylthio and ethylthio but is not limited thereto.

The term "arylene" stated in the specification may be an organic radical derived from aromatic hydrocarbon by removing two hydrogen and may include phenylene, biphenylene, fluorenylene, naphthylene, anthracenylene, or the like but is not limited thereto.

The furan derivative stated in the specification may be a compound derived from crude oil, biomass, and so on and may be synthesized and used using a general synthesis method.

The borane catalyst according to an embodiment of the present invention may be one or two or more selected from $B(C_6F_5)_3$, $(C_6F_5CH_2CH_2)B(C_6F_5)_2$, $(CF_3(CF_2)_3(CH_2)_2B(C_6F_5)_2$, $HB(C_6F_5)_2$, $B(C_6H_5)_3$, and $ClB(C_6F_5)_2$, may be easily handled due to stability in the air, and may be one or two or more selected from $B(C_6F_5)_3$, $HB(C_6F_5)_2$, and $(C_6F_5CH_2CH_2)B(C_6F_5)_2$ in terms of reaction efficiency.

In the method of preparing the silane derivative according to an embodiment of the present invention, the borane catalyst may be used in 0.015 to 0.025 mol (1.5 to 2.5 mol %) based on 1 mol of a furan derivative, i.e., compound represented by Chemical Formula 2, Chemical Formula 5, Chemical Formula 7, Chemical Formula 9, or Chemical Formula 11 and, in detail, the borane catalyst may be used in 0.015 to 0.025 mol, in detail, 0.019 to 0.021 mmol (1.9 to 2.1 mol %) based on 1 mol of a furan derivative as a start material with respect to one furan functional group (e.g.,

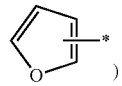

of the start material.

In the method of preparing the silane derivative according to an embodiment of the present invention, $R_{11}$ to $R_{13}$ in Chemical Formula 3 that is a silane compound may each independently $C_1$-$C_{10}$ alkyl or $C_6$-$C_{12}$ aryl but one or more of $R_{11}$ to $R_{13}$ may be alkyl. That is, $R_{11}$ to $R_{12}$ may each independently alkyl, $R_{13}$ may be aryl or $R_{11}$ may be alkyl, $R_{12}$ and $R_{13}$ may be aryl, $R_{11}$ to $R_{12}$ may each independently alkyl, and $R_{13}$ may be aryl in terms or reaction efficiency. An example of Chemical Formula 3 may be $Si(Ph)(Me)_2(H)$.

With regard to Chemical Formula 3 in the method of preparing the silane derivative according to the present invention, the silane derivative may be used with 2.0 to 2.5 moles, in detail, 2.0 to 2.2 moles based on 1 mol of a furan derivative, i.e., a compound represented by Chemical Formula 2, Formula 5, Chemical Formula 7, or Chemical Formula 11, in detail, based on 1 mol of a furan derivative with respect to one furan functional group of a furan derivative, i.e., a compound represented by Chemical Formula 2, Chemical Formula 5, Chemical Formula 7, or Chemical Formula 11.

For example,

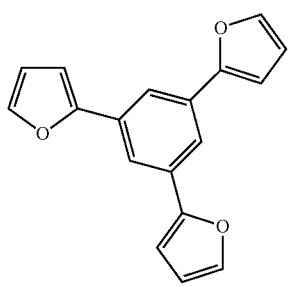 [SMILES: c1coc(-c2cc(-c3ccco3)cc(-c3ccco3)c2)c1]

that is the furan derivative according to the present invention has three furan functional groups and, thus, a borane catalyst may be used in 6 mol % based on 1 mol of

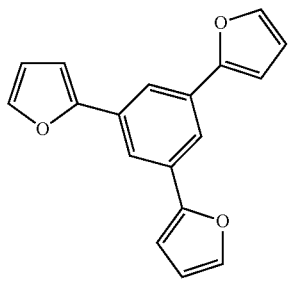 [SMILES: c1coc(-c2cc(-c3ccco3)cc(-c3ccco3)c2)c1]

and the silane derivative may be used in 6 moles.

In Chemical Formula 3-1 in the method of preparing the silane derivative according to an embodiment of the present invention, unlike in Chemical Formula 3, $R_{11}$ and $R_{12}$ may each independently $C_1$-$C_{10}$ alkyl or $C_6$-$C_{12}$ aryl and, in detail, $R_{11}$ and $R_{12}$ may each independently aryl.

For example, Chemical Formula 3-1 may be $Si(Ph)_2(H)_2$ and the furan derivative, i.e., a compound of Chemical Formula 3-1 may be used in 2.0 to 2.5 moles, in detail, 2.0 to 2.2 moles based on 1 mol of a furan derivative, i.e., a compound of Chemical Formula 9.

According to an embodiment of the method of preparing a silane derivative of the aspect I of the present invention, in the borane catalyst and the silane compound represented by Chemical Formula 3, the borane catalyst may be $B(C_6F_5)_3$ and Chemical Formula 3 may be $PhMe_2SiH$ as a combination in terms of reaction efficiency and, as an ideal combination of the borane catalyst and Chemical Formula 3-1, the borane catalyst may be $B(C_6F_5)_3$ and Chemical Formula 3 may be $Ph_2SiH_2$.

In the aspect I of the present invention, a reaction solvent in the method of preparing the silane derivative may be any solvent that is generally used in a general organic reaction and, for example, may be dichloromethane, chloroform, toluene, and chlorobenzene but, may be a dichloromethane in the combination of $B(C_6F_5)_3$ and $PhMe_2SiH$ or $B(C_6F_5)_3$ and $Ph_2SiH_2$.

In the aspect I of the present invention, reaction temperature and reaction time during preparation of a silane derivative are not limited but, a reaction may be performed at a reaction temperature, e.g., room temperature, at 15 to 35° C. for 1 hour to 12 hours, and at 18 to 30° C. for 1 hour to 5 hours in terms of reaction efficiency.

The second aspect (II) may provide a method of preparing a cyclopropyl silane derivative via a reaction between a silane compound and a furan compound from biomass.

As the second aspect, the method of preparing an anti-(2-alkyl)cyclopropyl silane derivative in presence of a borane catalyst may include four methods and will be described in detail.

First, as the first aspect (II-1), the present invention may include a method of preparing an anti-(2-alkyl) cyclopropyl silane derivative of Chemical Formula 21-1 via a reaction between a furan compound represented by Chemical Formula 22-1 and a silane compound represented by Chemical Formula 23 in the presence of a borane catalyst.

[Chemical Formula 21-1]

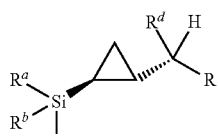

[Chemical Formula 22-1]

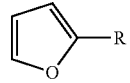

[Chemical Formula 23]

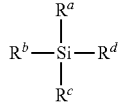

In Chemical Formulae 21-1, 22-1, and 23,

R may be $C_1$-$C_{20}$ alkyl, $C_6$-$C_{20}$ aryl, or $C_6$-$C_{20}$ aryl $C_1$-$C_{20}$ alkyl, and alkyl, aryl, or arylalkyl of R may be further substituted with one or more selected from the group consisting of halogen, $C_1$-$C_{20}$ alkyl, halo $C_1$-$C_{20}$ alkyl, $C_1$-$C_{20}$ alkoxy, $C_6$-$C_{20}$ aryl, $C_6$-$C_{20}$ aryloxy, and $C_1$-$C_{20}$ alkylthio;

$R^a$ to $R^c$ may each independently hydrogen, $C_1$-$C_{20}$ alkyl, or $C_6$-$C_{20}$ aryl;

$R^d$ may be hydrogen or heavy hydrogen; and $R^a$ to $R^c$ may not be simultaneously hydrogen.

The present invention may provide a method of preparing an anti-(2-alkyl) cyclopropyl silane derivative of Chemical Formula 21-1 via a reaction between an α-silyloxy-(Z)-alkenyl silane derivative of Chemical Formula 24 and a silane compound represented by Chemical Formula 23 in the presence of a borane catalyst.

[Chemical Formula 21-1]

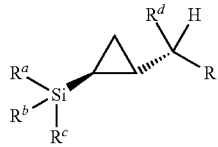

-continued

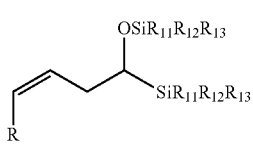
[Chemical Formula 24]

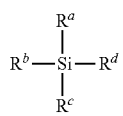
[Chemical Formula 23]

In Chemical Formulae 21-1, 23, and 24,

R may be alkyl, $C_1$-$C_{20}$ alkyl, $C_6$-$C_{20}$ aryl, or $C_6$-$C_{20}$ aryl $C_1$-$C_{20}$ alkyl, and alkyl, aryl, or arylalkyl of R may be further substituted with one or more selected from the group consisting of halogen, $C_1$-$C_{20}$ alkyl, halo $C_1$-$C_{20}$ alkyl, $C_1$-$C_{20}$ alkoxy, $C_6$-$C_{20}$ aryl, $C_6$-$C_{20}$ aryloxy, and $C_1$-$C_{20}$ alkylthio;

$R_{11}$ to $R_{13}$ may each independently $C_1$-$C_{20}$ alkyl or $C_6$-$C_{20}$ aryl;

$R^a$ to $R^c$ may each independently hydrogen, $C_1$-$C_{20}$ alkyl, or $C_6$-$C_{20}$ aryl;

$R^d$ may be hydrogen or heavy hydrogen; and $R^a$ to $R^c$ may not be simultaneously hydrogen.

The α-silyloxy-(Z)-alkenyl silane derivative of Chemical Formula 24 may be prepared via a reaction between a furan compound represented by Chemical Formula 22-1 and a silane compound of Chemical Formula A in the presence of a borane catalyst.

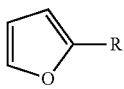
[Chemical Formula 22-1]

[Chemical Formula A]

In Chemical Formulae 22-1 and A,

R may be $C_1$-$C_{20}$ alkyl, $C_6$-$C_{20}$ aryl, or $C_6$-$C_{20}$ aryl $C_1$-$C_{20}$ alkyl, and alkyl, aryl, or arylalkyl of R may be further substituted with one or more selected from the group consisting of halogen, $C_1$-$C_{20}$ alkyl, halo $C_1$-$C_{20}$ alkyl, $C_1$-$C_{20}$ alkoxy, $C_6$-$C_{20}$ aryl, $C_6$-$C_{20}$ aryloxy, and $C_1$-$C_{20}$ alkylthio; and $R_{11}$ to $R_{13}$ may each independently $C_1$-$C_{20}$ alkyl or $C_6$-$C_{20}$ aryl.

The borane catalyst may be, for example, $B(C_6F_5)_3$, $(C_6F_5CH_2CH_2)B(C_6F_5)_2$, $(CF_3(CF_2)_3(CH_2)_2B(C_6F_5)_2$, and $HB(C_6F_5)_2$, and $B(C_6H_5)_3$ and may be used in 0.5 to 2.0 mol % based on 1 mol of a furan compound of Chemical Formula 2-1.

The α-silyloxy-(Z)-alkenyl silane derivative of Chemical Formula 24 may be, for example, the following compounds but is not limited thereto.

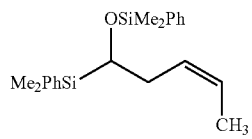
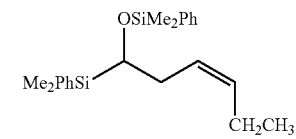

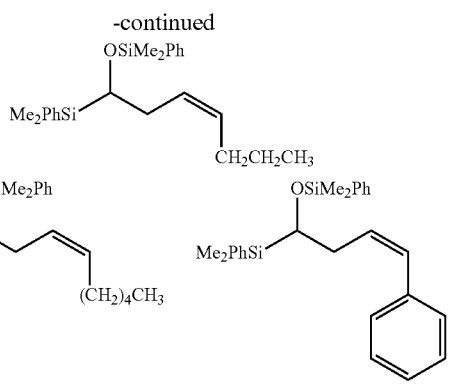
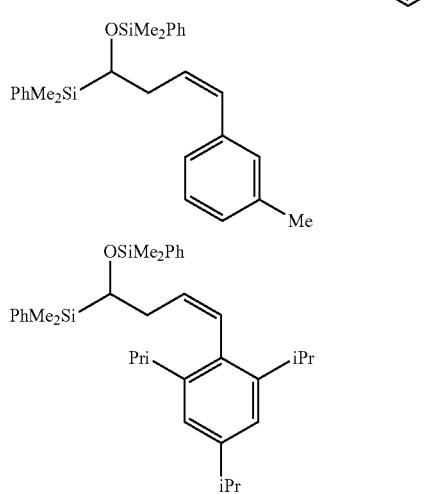
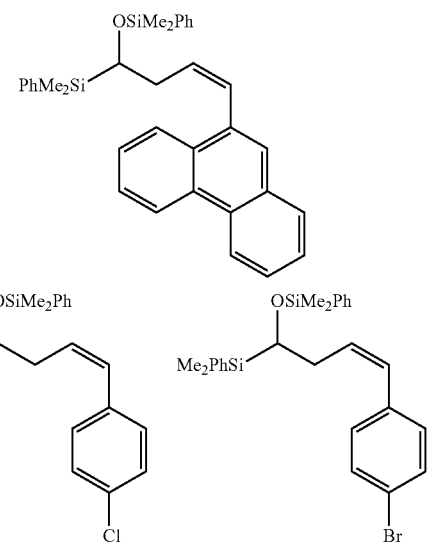
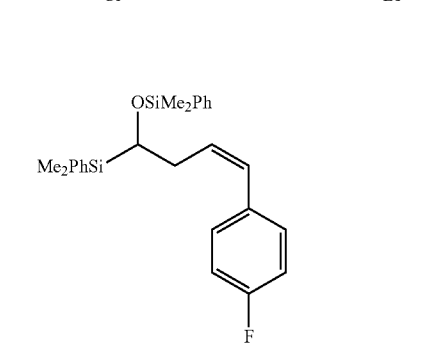

-continued

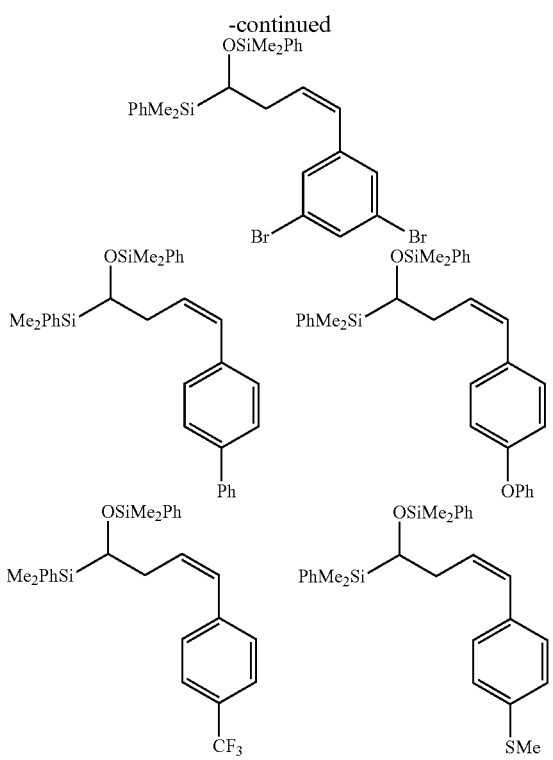

As the second aspect (II-2), the present invention may provide an anti-(2-alkyl)cyclopropyl silane derivative of Chemical Formula 21-2 via a reaction between a furan compound of Chemical Formula 22-2 and the silane compound of Chemical Formula 23 in the presence of a borane catalyst.

[Chemical Formula 21-2]

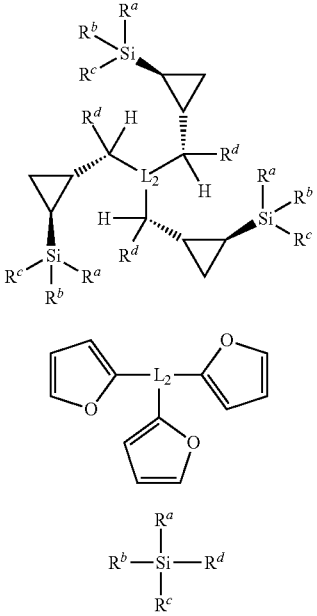

[Chemical Formula 22-2]

[Chemical Formula 23]

In Chemical Formulae 21-2, 22-2, and 23, $L^1$ may be $C_6$-$C_{20}$ arylene, and the arylene may be further substituted with one or more selected from the group consisting of halogen, $C_1$-$C_{20}$ alkyl, halo $C_1$-$C_{20}$ alkyl, $C_1$-$C_{20}$ alkoxy, $C_6$-$C_{20}$ aryl, $C_6$-$C_{20}$ aryloxy, and $C_1$-$C_{20}$ alkylthio;

$R^a$ to $R^c$ may each independently hydrogen, $C_1$-$C_{20}$ alkyl, or $C_6$-$C_{20}$ aryl;

$R^d$ may be hydrogen or heavy hydrogen; and $R^a$ to $R^c$ may not be simultaneously hydrogen.

As the third aspect (II-3), the present invention may provide a method of preparing an anti-(2-alkyl)cyclopropyl silane derivative of Chemical Formula 21-3 via a reaction between a furan compound of Chemical Formula 22-3 and a silane compound of Chemical Formula 23 in the presence of a borane catalyst.

[Chemical Formula 21-3]

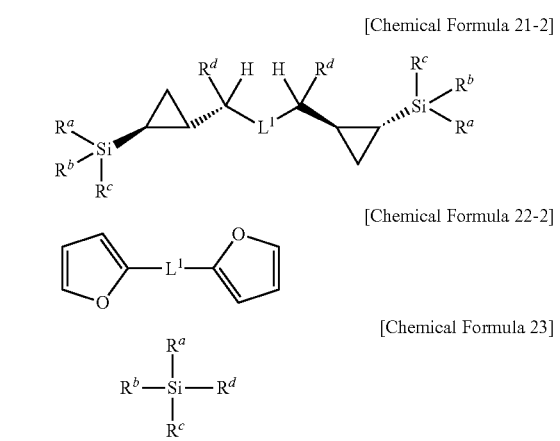

[Chemical Formula 22-3]

[Chemical Formula 23]

In Chemical Formulae 21-3, 22-3, and 23, $L^2$ may be $C_6$-$C_{20}$ arylene;

$R^a$ to $R^c$ may each independently hydrogen, $C_1$-$C_{20}$ alkyl, or $C_6$-$C_{20}$ aryl;

$R^d$ may be hydrogen or heavy hydrogen; and $R^a$ to $R^c$ may not be simultaneously hydrogen.

The method of preparing the anti-(2-alkyl)cyclopropyl silane derivative according to the present invention may be a very effective method to obtain an anti-(2-alkyl)cyclopropyl silane derivative represented by Chemical Formulae 21-1 to 21-3 in one pot with a high yield under a mild condition via a reaction between a furan derivative represented by Chemical Formulae 22-1 to 22-2 and a silane compound represented by Chemical Formula 23 in the presence of a borane catalyst. In addition, the method of preparing the anti-(2-alkyl)cyclopropyl silane derivative according to the present invention may prepare an anti-(2-alkyl)cyclopropyl silane derivative with a high yield via high stereoselectivity.

The method of preparing the anti-(2-alkyl)cyclopropyl silane derivative according to the present invention may include two operations of preparing an α-silyloxy-(Z)-alkenyl silane derivative of Chemical Formula 24 via a reaction between a furan compound of Chemical Formula 22-1 and a silane compound of Chemical Formula A in the presence of a borane catalyst; and preparing an anti-(2-alkyl)cyclopropyl silane derivative of Chemical Formula 21-1 via a reaction between an α-silyloxy-(Z)-alkenyl silane derivative of Chemical Formula 24 and a silane compound of Chemical Formula 23 in the presence of a borane catalyst and, in this case, the anti-(2-alkyl)cyclopropyl silane derivative may also be prepared with a high yield via high stereoselectivity.

The borane catalyst according to an embodiment of the aspect II of the present invention may be $B(C_6F_5)_3$ or $B(C_6F_5)_2R^{31}$, $R^{31}$ may be hydrogen, halogen, $C_1$-$C_{10}$ alkyl, or $C_1$-$C_{12}$ aryl, and alkyl or aryl of $R^{31}$ may be further substituted with halo $C_1$-$C_{10}$ alkyl or halo $C_6$-$C_{12}$ aryl. An example thereof may include $B(C_6F_5)_3$, $(C_6F_5CH_2CH_2)B(C_6F_5)_2$; $(CF_3(CF_2)_3(CH_2)_2B(C_6F_5)_2$, and $HB(C_6F_5)_2$, but may be easily handled due to stability in the air, and may be $B(C_6F_5)_3$ in terms of reaction efficiency.

The borane catalyst according to an embodiment of the aspect II of the present invention may be used in 3.0 to 7.0 mol %, in detail, 3.0 to 5.0 mol % based on 1 mol of furan compound of Chemical Formula 22-1 or an α-silyloxy-(Z)-alkenyl silane derivative of Chemical Formula 24 and, when the borane catalyst is used in this range, high product selectivity and a high yield may be obtained.

The borane catalyst according to an embodiment of the aspect II of the present invention may be used in 7.0 to 14.0 mol %, in detail, 9.5 to 10.5 mol % based on 1 mol of a furan compound of Chemical Formula 22-2 and, when the borane catalyst is used in this range, high product selectivity and a high yield may be obtained.

The borane catalyst according to an embodiment of the aspect II of the present invention may be used in 14.0 to 25.0 mol %, in detail, 19.0 to 21.0 mol % based on 1 mol of a furan compound of Chemical Formula 22-3 and, when the borane catalyst is used in this range, high product selectivity and a high yield may be obtained.

In the silane compound of Chemical Formula 23 according to an embodiment of the aspect II of the present invention, $R^a$ to $R^c$ may each independently hydrogen, $C_1$-$C_{20}$ alkyl, or $C_6$-$C_{20}$ aryl, but, in detail, one or more of $R^a$ to $R^c$ may be $C_1$-$C_{20}$ alkyl or aryl. That is, $R^a$ and $R^b$ may each independently $C_1$-$C_{20}$ alkyl, $R^c$ may be hydrogen, or $C_6$-$C_{20}$ aryl, or $R^a$ and $R^b$ may each independently $C_6$-$C_{20}$ aryl, and $R^c$ may be hydrogen in terms of reaction efficiency. For example, a silane compound of Chemical Formula 23 may be $PhMe_2SiH$, $Ph_2SiH_2$, $Et_2SiH_2$, or the like.

The silane compound according to an embodiment of the aspect II according to the present invention may be used in 1 to 5 moles based on 1 mol of a furan compound of Chemical Formula 22-1 or an α-silyloxy-(Z)-alkenyl silane derivative of Chemical Formula 24 and, in more detail, may be used in 3 to 4 moles based on 1 mol of a furan compound of Chemical Formula 22-1 and may be used in 1 to 2 moles based on 1 mol of an α-silyloxy-(Z)-alkenyl silane derivative of Chemical Formula 24. When the silane compound is used in this range, reaction speed may be high and a high yield may be obtained and, when the silane compound is out of the range, there may be a problem in that a yield of a product may be degraded or the remaining silane needs to be uneconomically discarded.

The silane compound according to an embodiment of the aspect II according to the present invention may be used in 2 to 10 moles, in detail, 6 to 10 moles, in more detail, 7 to 9 moles based on 1 mol of a furan compound of Chemical Formula 22-2 and, in this case, when the silane compound is used in this range, reaction speed may be high and a high yield may be obtained and, when the silane compound is outside the range, there may be a problem in that a yield of a product may be degraded or the remaining silane needs to be uneconomically discarded.

The silane compound according to an embodiment of the aspect II according to the present invention may be used in 3 to 15 moles, in detail, 10 to 15 moles, in more detail, 11 to 13 moles based on 1 mol of a furan compound of Chemical Formula 22-3 and, when the silane compound is outside the range, there may be a problem in that a yield of a product may be degraded or the remaining silane needs to be uneconomically discarded.

According to an embodiment of the aspect II of the present invention, the reaction may be performed in an organic solvent and, the organic solvent may not be necessarily limited as long as the organic solvent does not react with the borane catalyst and the silane compound. An example of the organic solvent may be chloroform, dichloromethane, toluene, chlorobenzene, benzene, hexane, dichloroethane, or a mixture solvent thereof and may be dichloromethane in consideration of reaction efficiency as well as solubility of a reactant and ease of reactant removal.

Reaction temperature of silylation reduction reaction according to an embodiment of the aspect II according to the present invention may be any general temperature used in organic synthesis, but may be changed depending on a reaction time, a reaction material, and the amount of a start material, and the reaction may be performed at a temperature range of −78° C. to 50° C. to prevent a reaction time from being excessively increased or to prevent a side reaction from occurring to prevent a reduction in a reaction yield. In detail, reactants may be mixed at −78° C. to 0° C. and, then, the reaction may be performed at 20 to 50° C.

The reaction time according to an embodiment of the aspect II according to the present invention may be changed depending on a reaction material, an amount of the reaction material, a type of a solvent, and an amount of the solvent, but a reaction may be performed for 4 to 24 hours. After the reaction time elapses, the reaction time may be excessively increased and a side reaction may occur to degrade a reaction yield.

When the reaction is completed, a solvent may be distilled in a reduced pressure and, then, a target material may be isolated and purified via a general method such as column chromatography and re-crystallization.

The method of preparing as anti-(2-alkyl)cyclopropyl silane derivative according to the present invention may be a very effective method that uses a simple and relatively inexpensive borane catalyst that does not include metal under a very mild condition and uses a commercially available silane compound as a reducer and, thus, may perform ring-opening, hydrosilylation, and ring-closing on various furan derivatives generated from biomass to effectively synthesize an anti-(2-alkyl)cyclopropyl silane derivative which is relatively difficult to synthesize with a short step as a basic synthesis unit of medicines and agricultural chemical products.

The present invention may provide an anti-(2-alkyl)cyclopropyl silane derivative represented by Chemical Formulae 21-1 to 21-3.

[Chemical Formula 21-1]

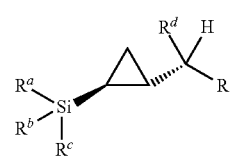

[Chemical Formula 21-2]

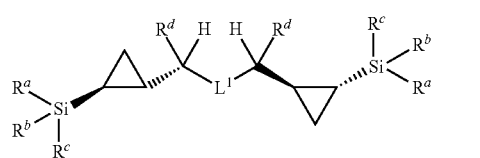

[Chemical Formula 21-3]

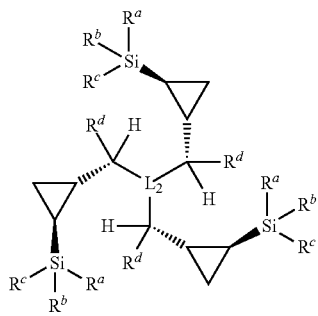

In Chemical Formulae 21-1 to 21-3,

R may be $C_1$-$C_{20}$ alkyl, $C_6$-$C_{20}$ aryl, or $C_6$-$C_{20}$ aryl $C_1$-$C_{20}$ alkyl, and alkyl, aryl, or arylalkyl of R may be further substituted with one or more selected from the group consisting of halogen, $C_1$-$C_{20}$ alkyl, halo $C_1$-$C_{20}$ alkyl, $C_1$-$C_{20}$ alkoxy, $C_6$-$C_{20}$ aryl, $C_6$-$C_{20}$ aryloxy, and $C_1$-$C_{20}$ alkylthio;

$L^1$ may be $C_6$-$C_{20}$ arylene, and the arylene may be further substituted with one or more selected from the group consisting of halogen, (C1-C20)alkyl, halo(C1-C20)alkyl, $C_1$-$C_{20}$ alkoxy, $C_6$-$C_{20}$ aryl, $C_6$-$C_{20}$ aryloxy, and $C_1$-$C_{20}$ alkylthio;

$L^2$ may be $C_6$-$C_{20}$ arylene;

$R^a$ to $R^c$ may each independently hydrogen, $C_1$-$C_{20}$ alkyl, or $C_6$-$C_{20}$ aryl;

$R^d$ may be hydrogen or heavy hydrogen; and $R^a$ to $R^c$ may not be simultaneously hydrogen.

The anti-(2-alkyl)cyclopropyl silane derivative prepared using the preparation method according to the present invention may be, in detail, the following compounds but is not limited thereto.

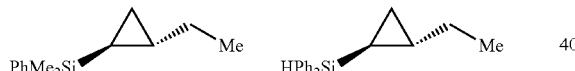
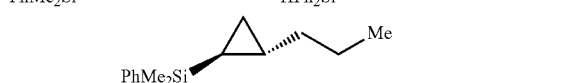
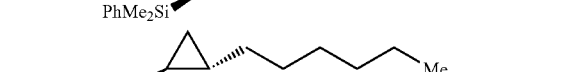
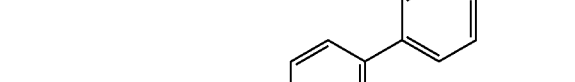
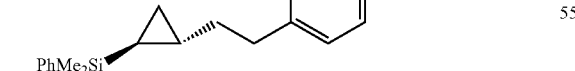
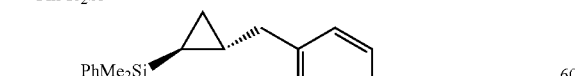
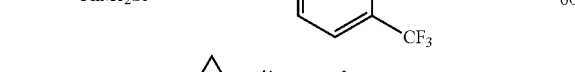

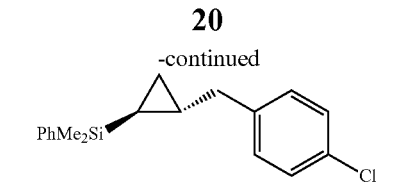
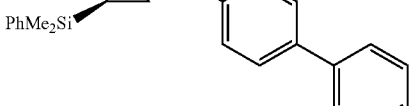
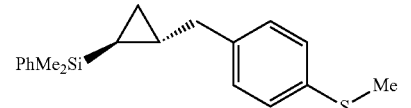
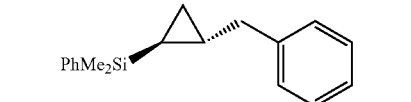
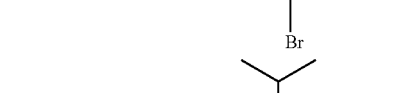
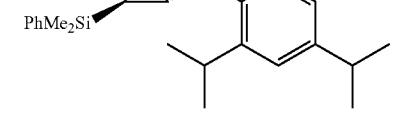
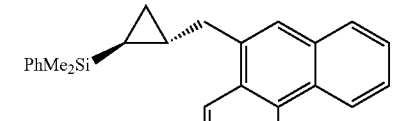
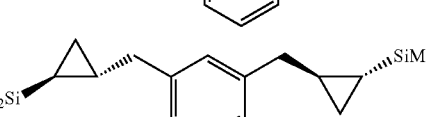
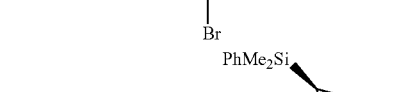
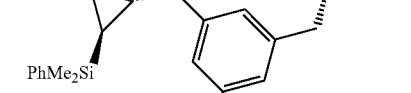

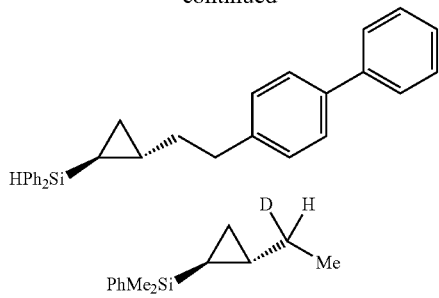

Advantageous Effects

A method of preparing a silane derivative according to the present invention may use a borane catalyst instead of a transition metallic catalyst and, thus, may be eco-friendly and, in particular, may easily prepare a raw material and an intermediate in various fields with a high added value due to use of a furan derivative derived from biomass as a start material and may be very economical.

The method of preparing a silane derivative according to the present invention may prepare a silane derivative with a high yield via high stereoselectivity under a mild condition and, thus, the silane derivative may be commercially mass-produced.

The silane derivative according to the present invention may be easily used as an intermediate and a raw material in various fields, such as medicines, industrial chemistry, and fine chemistry.

In detail, unlike a conventional method that requires use of tough reaction conditions and an expensive metallic catalyst, the method of preparing a silane derivative according to the present invention may use a simple and relatively inexpensive borane catalyst that does not include metal under a very mild condition and may use a commercially available silane compound as a reducer and, thus, may perform ring-opening, hydrosilylation, and ring-closing on various furan derivatives generated from biomass to effectively synthesize a silane derivative which is relatively difficult to synthesize with a short step as a basic synthesis unit of medicines and agricultural chemical products and may be mass-produced to achieve high probability of being commercially available.

The silane derivative obtained according to the present invent ion may have a silyl group and, thus, may be used to prepare a corresponding alcohol compound via an oxidation process and, in addition, the obtained corresponding alcohol compound may be further substituted with another functional group via a well known chemical reaction.

Accordingly, the silane derivative prepared using the preparation method according to the present invention may be very usefully applied as an intermediate and a synthon of various fields, such as alkaloid, medicines, and agricultural chemical products.

The method of preparing a silane derivative according to the present invention may prepare various silane derivatives that are available as a medial and commercial raw material and intermediate from a furan compound derived from biomass with a high yield via high stereoselectivity under a mild condition, thereby enhancing an added value of a biomass-derived material.

BEST MODE

Reference will now be made in detail to the exemplary embodiments of the present invention, but the following exemplary embodiments are given for better understanding of the present invention and the scope of the present invention is not limited thereto.

A furan derivative is synthesized and used using Preparation Examples 1 and 2 below.

Preparation Example 1 General Method of Preparing Furan Derivative

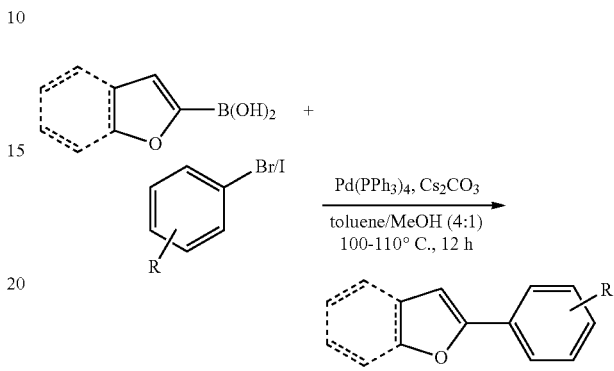

Aryl bromide or aryl iodide (1.0 equiv), boronic acid (1.1 to 1.5 equiv.), $Pd(PPh_3)_4$ (5 to 10 mol %), and $Cs_2CO_3$ (1.1 to 1.4 equiv.) were put in a round bottom flask, toluene (content corresponding to 0.086 M of arylhalide) and methanol (content corresponding to 0.33 M of arylhalide) were added thereto, and the resultant was subjected to a reaction at 100 to 110° C. for 12 hours. When the reaction was completed, the reaction mixture was cooled to 23° C., was quenched with a saturated $NH_4Cl$ solution, and was subjected to extraction with ethyl acetate (20 mL×3) and, then, an organic layer was washed with salt water (20 mL×1). The collected organic layers were dried with $MgSO_4$, were subjected to vacuum evaporation, and were isolated and purified via silica gel column chromatography to obtain a target compound.

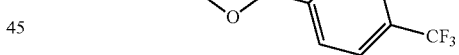

2-[4-(Trifluoromethyl)phenyl]furan 84%).

Prepared from 1-bromo-4-(trifluoromethyl)benzene; colorless solid; m.p. 90-92° C.; $^1H$ NMR (600 MHz, $CDCl_3$): δ 7.90-7.73 (m, 2H), 7.73-7.61 (m, 2H), 7.53 (s, 1H), 6.80 (s, 1H), 6.53 (s, 1H); $^{13}C$ NMR (100 MHz, $CDCl_3$): δ 152.7, 143.2, 134.1, 129.2 (q, J=32.3 Hz), 128.9, 128.6, 125.9, 124.3 (q, J=272 Hz), 122.9, 112.1, 107.1; $^{19}F$ NMR (3751 MHz, $CDCl_3$): δ −62.5; HRMS (EI): Calculated for C11H7F3O [M]+: 212.0449, Found: 212.0447.

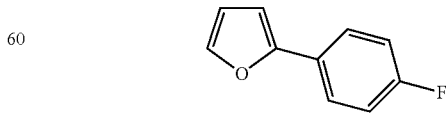

2-(4-Fluorophenyl)furan (84%).

Prepared from 1-bromo-4-fluorobenzene; colorless solid; m.p. 32-34° C.; $^1H$ NMR (600 MHz, $CDCl_3$): δ 7.73-7.58

(m, 2H), 7.54-77.40 (m, 1H), 7.09 (t, J=8.7 Hz, 2H), 6.59 (d, J=3.4 Hz, 1H), 6.48 (dd, J=3.3, 1.8 Hz, 1H); $^{13}$C NMR (150 MHz, CDCl$_3$): δ 162.3 (d, J=246.8 Hz), 153.3, 142.1, 127.4 (d, 3.2 Hz), 125.7 (d, J=8.0 Hz), 115.8 (d, J=21.9 Hz), 111.8, 104.8; $^{19}$F NMR (565 MHz, CDCl$_3$): δ −114.4; HRMS (EI): Calculated for C10H7FO [M]+: 162.0481, Found: 162.0483.

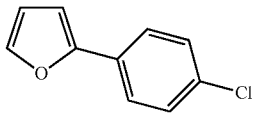 [SMILES: Clc1ccc(-c2ccco2)cc1]

2-(4-Chlorophenyl)furan (90%).

Prepared from 1-bromo-4-chlorobenzene; colorless solid; m.p. 64-66° C.; $^1$H NMR (600 MHz, CDCl$_3$): δ 7.65-7.58 (m, 2H), 7.47 (d, J=1.9 Hz, 1H), 7.41-7.27 (m, 2H), 6.64 (d, J=3.4 Hz, 1H), 6.48 (dd, J=3.5, 1.8 Hz, 1H); $^{13}$C NMR (150 MHz, CDCl$_3$): δ 153.1, 142.5, 133.1, 129.5, 129.0, 125.2, 111.9, 105.6; HRMS (EI): Calculated for C10H7ClO [M]+: 178.0185, Found: 178.0186.

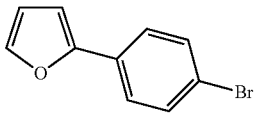 [SMILES: Brc1ccc(-c2ccco2)cc1]

2-(4-Bromophenyl)furan (52%).

Prepared from 1,4-dibromobenzene; colorless solid; m.p. 75-77° C.; $^1$H NMR (600 MHz, CDCl$_3$): δ 7.54 (d, J=8.5 Hz, 2H), 7.50 (d, J=8.5 Hz, 2H), 7.47 (s, 1H), 6.66 (s, 1H), 6.47 (s, 1H); $^{13}$C NMR (150 MHz, CDCl$_3$): δ 153.1, 142.5, 131.9, 129.9, 125.4, 121.2, 111.9, 105.7; HRMS (EI): Calculated for C10H7BrO [M]+: 221.9680, Found: 221.9678.

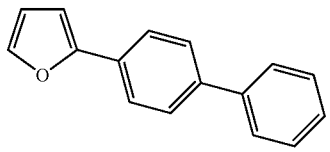 [SMILES: c1ccc(-c2ccc(-c3ccco3)cc2)cc1]

2-(1,1'-Biphenyl-4-yl)furan (85%).

Prepared from 4-bromo-1,1'-biphenyl; colorless solid; m.p. 156-158° C.; $^1$H NMR (600 MHz, CDCl$_3$): δ 7.86-7.79 (m, 2H), 7.73-7.70 (m, 2H), 7.71-7.68 (m, 2H), 7.57 (dd, J=1.8, 0.8 Hz, 1H), 7.55-7.49 (m, 2H), 7.47-7.39 (m, 1H), 6.76 (dd, J=3.3, 0.8 Hz, 1H), 6.57 (dd, J=3.4, 1.8 Hz, 1H); $^{13}$C NMR (150 MHz, CDCl$_3$): δ 153.8, 142.2, 140.6, 140.0, 129.9, 128.9, 127.42, 127.41, 126.9, 124.3, 111.8, 105.2; HRMS (EI): Calculated for C16H12O [M]+: 220.0888, Found: 220.0890.

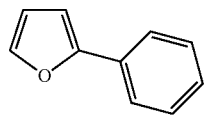 [SMILES: c1ccc(-c2ccco2)cc1]

2-Phenylfuran (92%).

Prepared from 1-bromobenzene; colorless liquid; $^1$H NMR (600 MHz, CDCl$_3$): δ 7.77-7.67 (m, 2H), 7.51 (d, J=1.8 Hz, 1H), 7.42 (t, J=7.8 Hz, 2H), 7.30 (t, J=7.2, Hz, 1H), 6.69 (d, J=3.3 Hz, 1H), 6.51 (dd, J=3.4, 1.8 Hz, 1H); $^{13}$C NMR (150 MHz, CDCl$_3$): δ 154.1, 142.2, 131.0, 128.8, 127.5, 123.9, 111.8, 105.1

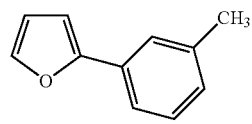

2-(m-Tolyl)furan (86%).

Prepared from 1-bromo-3-methylbenzene; colorless liquid; $^1$H NMR (600 MHz, CDCl$_3$): δ 7.57-7.45 (m, 3H), 7.29 (s, 1H), 7.09 (d, J=7.9 Hz, 1H), 6.65 (d, J=3.0 Hz, 1H), 6.48 (d, J=1.7 Hz, 1H), 2.40 (s, 3H); $^{13}$C NMR (150 MHz, CDCl$_3$): δ 154.1, 141.9, 138.2, 130.8, 128.5, 128.1, 124.4, 120.9, 111.5, 104.8, 21.5

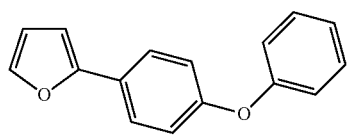 [SMILES: c1ccc(Oc2ccc(-c3ccco3)cc2)cc1]

2-(4-Phenoxyphenyl)furan (91%).

Prepared from 1-bromo-4-phenoxybenzene; colorless solid; m.p. 63-65° C.; $^1$H NMR (600 MHz, CDCl$_3$): δ 7.65 (d, J=8.4 Hz, 2H), 7.46 (s, 1H), 7.36 (t, J=7.7 Hz, 2H), 7.13 (t, J=7.4 Hz, 1H), 7.04 (dd, J=8.2, 5.8 Hz, 4H), 6.59 (s, 1H), 6.48 (s, 1H); $^{13}$C NMR (150 MHz, CDCl$_3$): δ 157.2, 156.8, 153.8, 141.9, 129.9, 126.5, 125.5, 123.5, 119.2, 119.1, 111.8, 104.4; HRMS (EI): Calculated for C16H12O2 [M]+: 236.0837, Found: 236.0835.

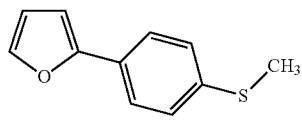

2-[4-(Methylthio)phenyl]furan 83%).

Prepared from (4-bromophenyl)(methyl)sulfane; brown color solid; m.p. 79-81° C.; $^1$H NMR (600 MHz, CDCl$_3$): δ 7.63 (d, J=8.2, Hz, 2H), 7.48-7.40 (m, 1H), 7.26 (d, J=8.4 Hz, 2H), 6.60 (t, J=3.3 Hz, 1H), 6.48-6.42 (m, 1H), 2.49 (s, 3H); $^{13}$C NMR (150 MHz, CDCl$_3$): δ 153.6, 141.8, 137.5, 127.9, 126.8, 124.2, 111.6, 104.6, 15.8; HRMS (EI): Calculated for C11H10OS [M]+: 190.0452, Found: 190.0452.

Preparation Example 2 General Method of Preparing Furanyl Alcohol Derivative Protected with Silyl Group

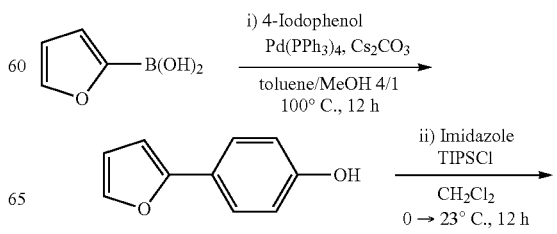

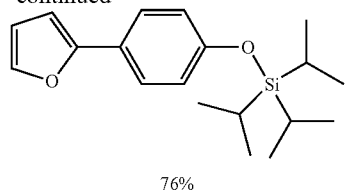

76%

CH$_2$Cl$_2$ (5 mL) was put in a dried flask, alcohol (1.0 equiv.) synthesized and prepared at 0° C. using the same way as in Preparation Example 1 was added thereto, imidazole (1.3 equiv.) was slowly added thereto at the same temperature and, then, was stirred for 10 minutes, silyl chloride (1.2 equiv.) melted in CH$_2$Cl$_2$ (10 mL) was added thereto, and the resultant was subjected to a reaction at 23° C. for 12 hours. The reaction mixture was quenched with a saturated NH$_4$Cl solution, and was subjected to extraction with ethyl acetate (20 mL×3) and, then, an organic layer was washed with salt water (10 mL×1). The collected organic layers were dried anhydrous Na$_2$SO$_4$, were subjected to vacuum evaporation, and were isolated and purified via column chromatography to obtain a target compound.

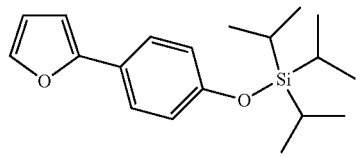 [SMILES: CC(C)[Si](Oc1ccc(-c2ccco2)cc1)(C(C)C)C(C)C]

[4-(Furan-2-yl)phenoxy]triisopropylsilane (76%)

Prepared from 4-iodophenol; colorless liquid; $^1$H NMR (600 MHz, CDCl$_3$): δ 7.61-7.52 (m, 2H), 7.43 (d, J=2.0 Hz, 1H), 7.01-6.88 (m, 2H), 6.52 (d, J=3.4 Hz, 1H.), 6.45 (dd, J=3.4, 1.8 Hz, 1H), 1.34-1.25 (m, 3H), 1.14 (d, J=7.4 Hz, 18H); $^{13}$C NMR (150 MHz, CDCl$_3$): δ 155.8, 154.3, 141.5, 125.3, 124.5, 120.3, 111.7, 103.5, 18.1, 12.9; 29Si NMR (120 MHz, CDCl3): δ 15.7; HRMS (EI): Calculated for C19H28O2Si [M]+: 316.1859, Found: 316.1858.

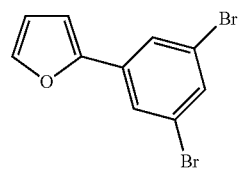 [SMILES: Brc1cc(Br)cc(-c2ccco2)c1]

2-(3,5-Dibromophenyl)furan (56%)

Prepared from 1,3,5-tribromobenzene; colorless solid; m.p. 44-46° C.; $^1$H NMR (600 MHz, CDCl$_3$): δ 7.72 (t, J=1.6 Hz, 2H), 7.52 (d, J=1.8 Hz, 1H), 7.47 (s, 1H), 6.68 (dd, J=3.2, 1.6 Hz, 1H), 6.52-6.42 (m, 1H); $^{13}$C NMR (150 MHz, CDCl$_3$): δ 150.8, 143.2, 133.9, 132.3, 125.3, 123.24, 111.9, 107.1; HRMS (EI): Calculated for C10H6Br2O [M]+: 299.8785, Found: 299.8786.

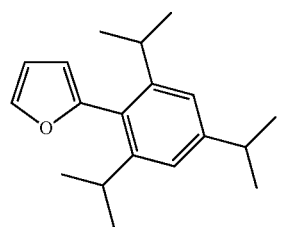 [SMILES: CC(C)c1cc(C(C)C)c(-c2ccco2)c(C(C)C)c1]

2-(2,4,6-Triisopropylphenyl)furan (28%)

Prepared from 2-bromo-1,3,5-triisopropylbenzene; colorless solid; m.p. 103-105° C.; $^1$H NMR (600 MHz, CDCl$_3$): δ 7.53 (d, J=1.9 Hz, 1H), 7.10 (s, 2H), 6.76-6.45 (m, 1H), 6.29 (d, J=3.2 Hz, 1H), 3.06-2.88 (m, 1H), 2.80-2.63 (m, 2H), 1.33 (d, J=6.9 Hz, 6H), 1.19 (d, J=6.9 Hz, 12H); $^{13}$C NMR (150 MHz, CDCl$_3$): δ 152.3, 150.2, 149.7, 141.6, 126.8, 120.8, 110.3, 109.4, 34.6, 30.9, 24.4, 24.2; HRMS (EI): Calculated for C19H26O [M]+: 270.1984, Found: 270.1982.

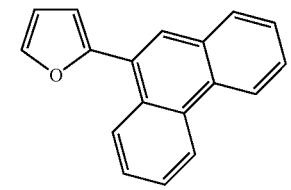 [SMILES: c1coc(-c2cc3ccccc3c3ccccc23)c1]

2-(Phenanthren-9-yl)furan (79%)

Prepared from 9-bromophenanthrene; colorless solid; m.p. 86-88° C.; $^1$H NMR (600 MHz, CDCl$_3$): δ 8.87-8.78 (m, 1H), 8.76-8.70 (m, 1H), 8.66-857 (m, 1H), 8.15 (d, J=3.4 Hz, 1H), 8.00 (dd, J=7.9, 3.4 Hz, 1H), 7.82-7.65 (m, 5H), 6.91 (s, 1H), 6.73 (s, 1H); $^{13}$C NMR (150 MHz, CDCl$_3$): δ 153.5, 142.5, 131.4, 130.9, 130.3, 129.7, 129.0, 127.5, 127.4, 127.1, 126.9, 126.9, 126.7, 126.4, 123.1, 122.6, 111.5, 109.7; HRMS (EI): Calculated for C8H12O [M]+: 244.0888, Found: 244.0887.

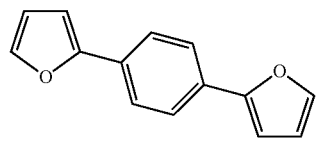 [SMILES: c1coc(-c2ccc(-c3ccco3)cc2)c1]

1,4-Di(furan-2-yl)benzene (13%).

Prepared from 1,4-dibromobenzene; yellow color solid; m.p. 135-140° C.; $^1$H NMR (600 MHz, CDCl$_3$): δ 7.83-7.61 (m, 4H), 7.47 (d, J=1.8 Hz, 2H), 6.66 (d, J=3.3 Hz, 2H), 6.48 (dd, J=3.4, 1.8 Hz, 2H); $^{13}$C NMR (150 MHz, CDCl$_3$): δ 153.9, 142.3, 129.9, 124.2, 111.9, 105.3; HRMS (EI): Calculated for C14H10O2 [M]+: 210.0681, Found: 210.0677.

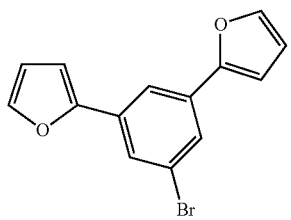 [SMILES: Brc1cc(-c2ccco2)cc(-c2ccco2)c1]

2,2'-(5-Bromo-1,3-phenylene)difuran (8%)

Prepared from 1,3,5-tribromobenzene; colorless solid; m.p. 77-79° C.; $^1$H NMR (600 MHz, CDCl$_3$): δ 7.86 (d, J=2.0 Hz, 1H), 7.67 (t, J=1.7 Hz, 2H), 7.49 (d, J=2.6 Hz, 2H), 6.71 (t, J=2.7 Hz, 2H), 6.49 (dt, J=3.4, 1.8 Hz, 2H); 13C NMR (150 MHz, CDCl3): δ 152.1, 142.7, 132.9, 125.2, 123.1, 117.5, 111.8, 106.4.

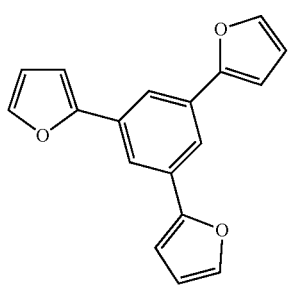 [SMILES: c1coc(-c2cc(-c3ccco3)cc(-c3ccco3)c2)c1]

1,3,5-Tri(furan-2-yl)benzene (81%)

Prepared from 1,3,5-tribromo-benzene; colorless solid; m.p. 138-140° C.; $^1$H NMR (600 MHz, CDCl$_3$): δ 7.90 (s, 3H), 7.53 (d, J=2.3 Hz, 3H), 6.78 (d, J=3.2 Hz, 3H), 6.52 (dd, J=3.5, 1.8 Hz, 3H); $^{13}$C NMR (150 MHz, CDCl$_3$): δ 153.4, 142.3, 131.6, 118.0, 111.7, 105.7; HRMS (EI): Calculated for C18H12O3 [M]+: 276.0786, Found: 276.0787.

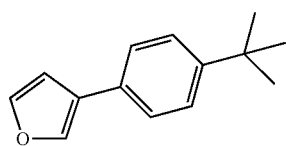

3-[4-(tert-Butyl)phenyl]furan (68%)

Prepared from 3-bromofuran; colorless solid; m.p. 59-61° C.; $^1$H NMR (600 MHz, CDCl$_3$): δ 7.73 (s, 1H), 7.49 (s, 1H), 7.44 (q, J=7.9 Hz, 4H), 6.72 (s, 1H), 1.37 (s, 9H); $^{13}$C NMR (150 MHz, CDCl$_3$): δ 150.1, 143.6, 138.4, 129.7, 126.4, 125.8, 125.8, 109.1, 34.7, 31.5; HRMS (EI): Calculated for C14H16O [M]+: 200.1201, Found: 200.1199.

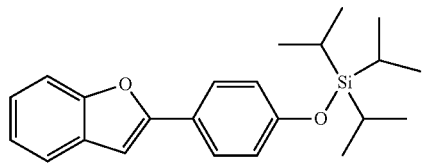 [SMILES: CC(C)[Si](Oc1ccc(-c2cc3ccccc3o2)cc1)(C(C)C)C(C)C]

[4-(Benzofuran-2-yl)phenoxy]triisopropylsilane (83%).

Prepared from 4-iodophenol; colorless solid; m.p. 46-48° C.; $^1$H NMR (600 MHz, CDCl$_3$): δ 7.74 (d, J=8.7 Hz, 2H), 7.55 (d, J=6.9 Hz, 1H), 7.50 (d, J=8.1 Hz, 1H), 7.33-7.17 (m, 2H), 6.96 (d, J=8.7 Hz, 2H), 6.88 (s, 1H), 1.41-1.20 (m, 3H), 1.14 (d, 9H), 1.14 (d, 9H); $^{13}$C NMR (150 MHz, CDCl$_3$): δ 156.9, 156.3, 154.9, 129.7, 126.5, 123.8, 123.8, 122.9, 120.7, 120.4, 111.1, 99.8, 18.1, 12.9; $^{29}$Si NMR (120 MHz, CDCl$_3$): δ 16.1; HRMS (EI): Calculated for C23H30O2Si [M]+: 366.2015, Found: 366.2018.

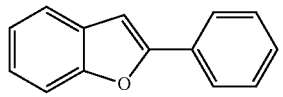

2-Phenylbenzofuran (89%)

Prepared from 1-bromobenzene; colorless liquid; $^1$H NMR (600 MHz, CDCl$_3$): δ 7.97 (d, J=7.2 Hz, 2H), 7.68 (d, J=8.1 Hz, 1H), 7.63 (d, J=8.7 Hz, 1H), 7.55 (t, J=7.7 Hz, 2H), 7.45 (t, J=6.3 Hz, 1H), 7.38 (t, J=7.7 Hz, 1H), 7.36-7.30 (m, 1H), 7.12 (s, 1H); $^{13}$C NMR (150 MHz, CDCl$_3$): δ 156.1, 155.1, 130.7, 129.4, 128.9, 128.7, 125.1, 124.4, 123.1, 121.0, 111.3, 101.5; HRMS (EI): Calculated for C14H10O [M]+: 194.0732, Found: 194.0730.

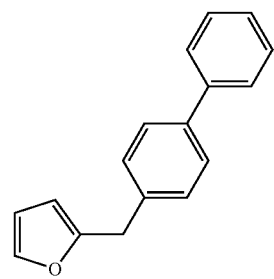 [SMILES: c1ccc(-c2ccc(Cc3ccco3)cc2)cc1]

2-[(1,1'-Biphenyl)-4-ylmethyl]furan (92%)

Prepared from 4-(bromomethyl)-1,1'-biphenyl; colorless solid; m.p. 81-83° C.; $^1$H NMR (600 MHz, CDCl$_3$) δ 7.60 (d, J=7.8 Hz, 2H), 7.56 (d, J=8.0 Hz, 2H), 7.45 (t, J=7.6 Hz, 2H), 7.37 (s, 1H), 7.36-7.31 (m, 3H), 6.34 (s, 1H), 6.08 (s, 1H), 4.04 (s, 2H); $^{13}$C NMR (150 MHz, CDCl$_3$) δ 154.6, 141.7, 141.1, 139.6, 137.4, 129.2, 128.9, 127.4, 127.3, 127.2, 110.4, 106.5, 34.3; HRMS (EST): Calculated for C17H14ONa [M+Na]+: 257.0942, Found: 257.0911.

A silane derivative was synthesized according to the following exemplary embodiments using the furan derivatives prepared in Preparation Examples 1 and 2 above.

I. Preparation of Silyloxyalkenyl Silane Derivative

Inventive Example 1 General Preparation of (Z)-α-silyloxyalkenylsilane (Derivative Silyloxyalkenylsilanes)

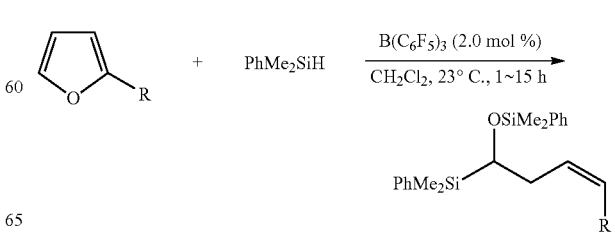

CH$_2$Cl$_2$ (0.4-0.8 mL) and B(C$_6$F$_5$)$_3$ (0.01 to 0.02 mmol, 2.0 mol %) were put in a dried flask, a silane compound (PhMe$_2$SiH, 1.025 to 2.050 mmol) was added thereto and was well stirred and, then, a furan derivative (0.50 to 1.0 mmol) was again added thereto and, then, was stirred at 23° C. for 1 to 5 hours. The reaction mixture was quenched with Et3N (5.0 to 10.0 mol %), was subjected to vacuum evaporation, and was isolated and purified (to nucleic acid or hexane and ethyl acetate) via silica gel column chromatography to obtain a target product (Z/E>99/1).

The following compound was prepared using the same method as the above.

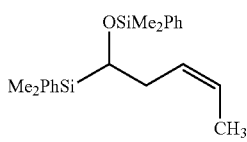

(Z)-[1-(Dimethylphenylsilyloxy)pent-3-en-1-yl]dimethylphenylsilane (95%). The compound was prepared by stirring 2-methylfuran (3.284 g, 40 mmol) and dimethylphenylsilane (11.18 g, 82 mmol) at 23° C. for 12 hours in the presence of B(C$_6$F$_5$)$_3$ (409.6 mg, 2.0 mol %) melted in CH$_2$C$_{12}$ (8 mL) under argon gas, and had a conversion yield of >95% from analysis via $^1$H NMR. Yield of 91% (12.88 g);

colorless liquid; $^1$H NMR (600 MHz, CDCl3): δ 7.66-7.57 (m, 4H), 7.50-67.38 (m, 6H), 5.52-5.40 (m, 2H), 3.75 (t, J=6.9 Hz, 1H), 2.44-2.30 (m, 2H), 1.56 (dd, J=6.6, 1.6 Hz, 3H), 0.39 (s, 6H), 0.36 (s, 3H), 0.35 (s, 3H); $^{13}$C NMR (100 MHz, CDCl$_3$): δ 138.8, 137.8, 134.4, 133.8, 129.4, 129.1, 128.4, 127.7 (2C), 125.1, 66.9, 32.0, 13.0, −0.8, −0.9, −4.5, −4.7; $^{29}$Si NMR (120 MHz, CDCl$_3$): δ 6.0, −4.2; HRMS (EI): Calculated for C21H30OSi2 [M]+: 354.1835, Found: 354.1831.

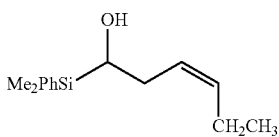

(Z)-1-(Dimethylphenylsilyl)hex-3-en-1-ol (86%). (i) Preparation was performed via a reaction between dimethylphenylsilane (279 mg, 2.1 mmol) and 2-ethylfuran (96 mg, 1.0 mmol) at 23° C. for 1.5 hours in the presence of B(C$_6$F$_5$)$_3$ (10.2 mg, 2.0 mol %) melted in CH$_2$Cl$_2$ (0.8 ml) under argon gas. After the reaction was completed, K$_2$CO$_3$ (276 mg, 2.00 mmol) obtained by melting the reaction mixture in MeOH (2 mL) was added and was subjected to a reaction at 23° C. for 4 hours (201.5 mg, 86% for two steps).

colorless liquid; $^1$H NMR (600 MHz, CDCl$_3$): δ 7.70-7.57 (m, 2H), 7.48-7.30 (m, 3H), 5.97-5.57 (m, 1H), 5.45-5.10 (m, 1H), 3.50 (d, J=10.6 Hz, 1H), 2.40 (q, J=12 Hz, 1H), 2.28-2.17 (m, 1H), 2.07 (d, J=6.7 Hz, 2H), 1.56 (brs, 1H), 0.99 (t, J=6.7 Hz, 3H), 0.42 (s, 3H), 0.41 (s, 3H); $^{13}$C NMR (150 MHz, CDCl$_3$): δ 136.9, 135.3, 134.2, 129.3, 127.9, 125.9, 64.5, 31.4, 20.7, 14.4, −5.3, 5.5; $^{29}$Si NMR (120 MHz, CDCl$_3$): δ −3.8; HRMS (EI): Calculated for C14H22OSi [M]+: 234.1440, Found 234.1440.

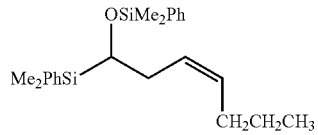

(Z)-[1-(Dimethylphenylsilyloxy)hept-3-en-1-yl]dimethylphenylsilane (92%). The compound was prepared from 2-propylfuran.

colorless liquid; $^1$H NMR (600 MHz, CDCl$_3$): δ 7.60-7.51 (m, 4H), 7.32-7.42 (m, 6H), 5.56-5.17 (m, 2H), 3.66 (t, J=6.9 Hz, 1H), 2.67-2.23 (m, 2H), 1.87 (q, J=6.6 Hz, 2H), 1.37-1.26 (m, 2H), 0.87 (t, J=7.4 Hz, 3H), 0.32 (s, 6H), 0.29 (s, 3H), 0.28 (s, 3H); $^{13}$C NMR (150 MHz, CDCl$_3$): δ 138.8, 137.8, 134.4, 133.8, 131.0, 129.4, 129.1, 127.7 (2C), 127.5, 67.1, 32.4, 29.5, 22.9, 13.9, −0.7, −0.9, −4.5, −4.7; $^{29}$Si NMR (120 MHz, CDCl$_3$): δ 5.9, −4.3; HRMS (EI): Calculated for C23H34OSi2 [M]+: 383.2148, Found: 382.2144.

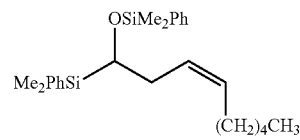

(Z)-1-[(Dimethylphenylsilyloxy)-non-3-en-1-yl]dimethylphenylsilane (reaction time: 1 h, 86%). The compound was prepared from 2-pentylfuran.

colorless liquid; $^1$H NMR (600 MHz, CDCl$_3$): δ 7.57-7.48 (m, 4H), 7.42-7.31 (m, 6H), 5.41-5.12 (m, 2H), 3.65 (t, J=6.9 Hz, 1H), 2.34-2.23 (m, 2H), 1.94-1.82 (m, 2H), 1.33-1.26 (m, 4H), 1.26-1.17 (m, 2H), 0.90 (t, J=7.1 Hz, 3H), 0.31 (s, 6H), 0.28 (s, 3H), 0.27 (s, 3H); $^{13}$C NMR (150 MHz, CDCl$_3$): δ 138.8, 137.8, 134.4, 133.79, 131.3, 129.4, 129.1, 127.7 (2C), 127.3, 67.1, 32.4, 31.70, 29.4, 27.5, 22.7, 14.2, −0.7, −0.9, −4.5, −4.7; $^{29}$Si NMR (120 MHz, CDCl$_3$): δ 5.9, −4.3; HRMS (ESI): Calculated for C25H38ONaSi2 [M+Na]+: 433.2359, Found: 433.2368.

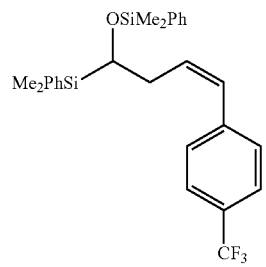

(Z)-1-[(Dimethylphenylsilyloxy)-4-(4-trifluoromethylphenyl)but-3-en-1-yl]dimethylphenylsilane (reaction time: 4 h, 90%). The compound was prepared from 2-[4-(trifluoromethyl)phenyl]furan.

colorless liquid; $^1$H NMR (600 MHz, CDCl$_3$): δ 7.62-7.57 (m, 1H), 7.54 (d, J=6.8 Hz, 2H), 7.52-7.46 (m, 3H), 7.41-7.34 (m, 5H), 7.33-7.27 (m, 3H), 6.39 (d, J=11.7 Hz, 1H), 5.75 (dt, J=11.7, 7.4 Hz, 1H), 3.77 (dd, J=8.0, 5.2 Hz, 1H), 2.65-2.55 (m, 1H), 2.50-2.41 (m, 1H), 0.38 (s, 3H), 0.31 (s, 6H), 0.30 (s, 3H); $^{13}$C NMR (150 MHz, CDCl$_3$): δ 141.1, 138.4, 137.2, 134.3, 133.8, 133.1, 129.6, 129.3, 129.0, 128.9, 127.8 (2C), 126.2, 125.1 (q, J=4.5 Hz), 124.5 (q, J=273 Hz), 66.8, 33.2, −0.8, −0.9, −4.7, −4.9; $^{29}$Si NMR (120 MHz, CDCl₃): δ 6.6, −4.0; ¹⁹F NMR (565 MHz, CDCl3) δ −1114.4; HRMS (ESI): Calculated for C27H31F3NaOSi2 [M+Na]+: 507.1763, Found: 507.1771.

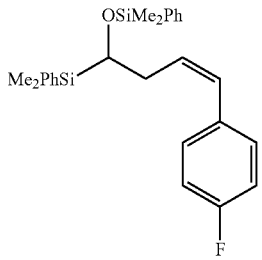

(Z)-1-[(Dimethylphenylsilyloxy)-4-(4-fluorophenyl)but-3-en-1-yl]dimethylphenylsilane (reaction time: 1.5 h, 85%). The compound was prepared from 2-(4-fluorophenyl)furan.

colorless liquid; ¹H NMR (600 MHz, CDCl₃): δ 7.53 (d, J=6.7 Hz, 2H), 7.47 (d, J=7.2 Hz, 2H), 7.41-7.30 (m, 6H), 7.18-7.12 (m, 2H), 6.99-6.90 (m, 2H), 6.33 (d, J=11.6 Hz, 1H), 5.62 (dt, J=11.3, 7.3 Hz, 1H), 3.74 (dd, J=7.9, 5.5 Hz, 1H), 2.58 (dt, J=15.6, 8.0 Hz, 1H), 2.45 (dt, J=15.1, 6.0 Hz, 1H), 0.30 (s, 3H), 0.29 (s, 6H), 0.28 (s, 3H); ¹³C NMR (150 MHz, CDCl₃): δ 161.6 (d, J=246.0 Hz) 138.5, 137.4, 134.4, 133.8, 133.6 (d, J=3.0 Hz), 133.1, 130.7, 130.4 (d, J=8.0 Hz), 129.5, 129.2, 128.9, 127.8, 115.0 (d, J=21.0 Hz), 66.9, 33.1, −0.8, −0.9, −4.7, −4.9; ²⁹Si NMR (120 MHz, CDCl3): δ 6.5, −4.1; ¹⁹F NMR (375 MHz, CD₂Cl₂): δ −115.9; HRMS (EI): Calculated for C26H31FOSi2 [M]+: 434.1897, Found: 434.1901.

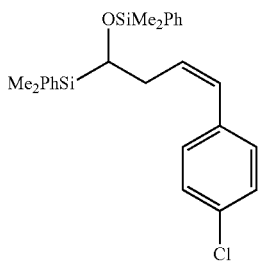

(Z)-1-[(Dimethylphenylsilyloxy)-4-(4-chlorophenyl)but-3-en-1-yl]dimethylphenylsilane (reaction time: 2 h, 86%). The compound was prepared from 2-(4-chlorophenyl)furan.

colorless liquid; ¹H NMR (600 MHz, CDCl₃): δ 7.56-7.52 (m, 2H), 7.47 (d, J=7.2 Hz, 2H), 7.42-7.30 (m, 6H), 7.23 (d, J=8.1 Hz, 2H), 7.12 (d, J=8.2 Hz, 2H), 6.32 (d, J=11.6 Hz, 1H), 5.65 (dt, J=11.7, 7.5 Hz, 1H), 3.75 (dd, J=8.0, 5.5 Hz, 1H), 2.69-2.53 (m, 1H), 2.48-2.29 (m, 1H), 0.30 (s, 9H), 0.29 (s, 3H); ¹³C NMR (150 MHz, CDCl₃): δ 138.5, 137.3, 136.0, 134.4, 133.8, 132.3, 131.5, 130.1, 129.5, 129.3, 128.9, 128.3, 127.80, 127.78, 66.8, 33.2, −0.8, −0.9, −4.7, −4.9; ²⁹Si NMR (120 MHz, CDCl₃): δ 6.5, −4.1; HRMS (EI): Calculated for C26H31ClOSi2 [M]+: 450.1602, Found: 450.1600.

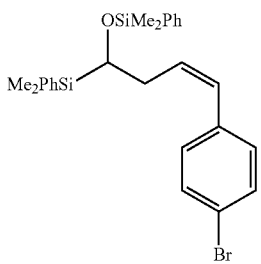

(Z)-1-[(Dimethylphenylsilyloxy)-4-(4-bromophenyl)but-3-en-1-yl]dimethylphenylsilane (reaction time: 2 h, 91%). The compound was prepared from 2-(4-bromophenyl)furan.

Colorless liquid; ¹H NMR (600 MHz, CDCl₃): δ 7.53 (d, J=9.2 Hz, 2H), 7.47 (d, J=7.9 Hz, 2H), 7.42-7.30 (m, 8H), 7.06 (d, J=8.3 Hz, 2H), 6.30 (d, J=11.7 Hz, 1H), 5.89-5.56 (m, 1H), 3.79-3.70 (m, 1H), 2.58 (dd, J=15.7, 7.5 Hz, 1H), 2.51-2.36 (m, 1H), 0.30 (s, 6H), 0.30 (s, 3H), 0.29 (s, 3H); ¹³C NMR (150 MHz, CDCl₃): δ 138.5, 137.3, 136.4, 134.3, 133.8, 131.6, 131.2, 130.4, 129.5, 129.3, 128.9, 127.80, 127.78, 120.4, 66.8, 33.1, −0.8, −0.9, −4.7, −4.9; ²⁹Si NMR (120 MHz, CDCl₃): δ 6.5, −4.1; HRMS (EI): Calculated for C26H31BrOSi2 [M]+: 494.1097, Found: 494.1092.

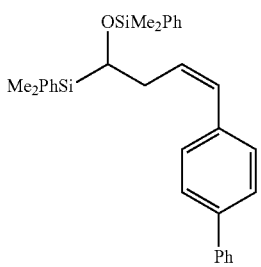

(Z)-{4-[(1,1'-Biphenyl)-4-yl]-1-(dimethylphenylsilyloxy) but-3-en-1-yl dimethylphenylsilane (reaction time: 3 h, 92%). The compound was prepared from 2-(1,1'-biphenyl-4-yl)furan.

colorless liquid; ¹H NMR (400 MHz, CDCl₃): δ 7.86-7.79 (m, 2H), 7.79-7.74 (m, 2H), 7.73-7.67 (m, 4H), 7.64 (t, J=7.6 Hz, 2H), 7.58-7.46 (m, 9H), 6.63 (d, J=11.7 Hz, 1H), 5.95-5.81 (m, 1H), 4.00 (dd, J=7.8, 5.6 Hz, 1H), 2.98-2.84 (m, 1H), 2.84-2.70 (m, 1H), 0.53 (s, 3H), 0.52 (s, 6H), 0.51 (s, 3H); ¹³C NMR (100 MHz, CDCl₃): δ 141.1, 139.36, 138.6, 137.4, 136.7, 134.5, 133.9, 131.1, 129.7, 129.6, 129.4, 129.3, 128.9, 127.9 (2C), 127.4, 127.1, 126.9, 67.1, 33.4, −0.6, −0.7, −4.6, −4.7; ²⁹Si NMR (80 MHz, CDCl₃): δ 6.6, −3.9; HRMS (ESI): Calculated for C32H36NaOSi2 [M+Na]+: 515.2202, Found: 515.2200.

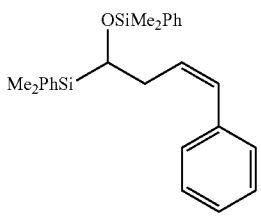

(Z)-1-[(Dimethylphenylsilyloxy)-4-phenylbut-3-en-1-yl] dimethylphenylsilane (reaction time: 2 h, 91%). The compound was prepared from 2-phenylfuran.

colorless liquid; ¹H NMR (600 MHz, CDCl₃): δ 7.57 (d, J=9.2 Hz, 2H), 7.51 (d, J=7.9 Hz, 2H), 7.43-7.48 (m, 4H), 7.37-7.29 (m, 4H), 7.26 (d, 3H), 6.43 (d, J=11.7 Hz, 1H), 5.78-5.56 (m, 1H), 3.93-3.53 (m, 1H), 2.66 (t, J=7.1 Hz, 1H), 2.61-2.39 (m, 1H), 0.34 (s, 3H), 0.33 (s, 6H), 0.32 (s, 3H); ¹³C NMR (150 MHz, CDCl₃): δ 138.6, 137.6, 137.5, 134.4, 133.8, 133.1, 130.8, 130.1, 129.5, 129.2, 128.9, 128.2, 127.8, 126.6, 67.0, 33.3, −0.8, −0.8, −4.8, −4.8; ²⁹Si NMR (120 MHz, CDCl₃): δ 6.5, −4.1.

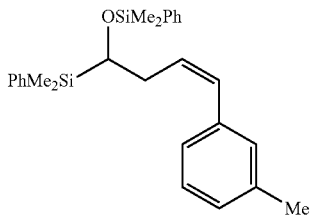

(Z)-[1-(Dimethylphenylsilyloxy)-4-(m-tolyl)but-3-en-1-yl]dimethylphenylsilane (reaction time: 2 h, 83%). The compound was prepared from 2-(m-tolyl)furan.

colorless liquid; ¹H NMR (600 MHz, CDCl₃): δ 7.59-7.46 (m, 4H), 7.47-7.29 (m, 6H), 7.19 (t, J=7.6 Hz, 1H), 7.14-7.00 (m, 3H), 6.39 (d, J=11.6 Hz, 1H), 5.75-5.54 (m, 1H), 3.78 (t, J=6.8 Hz, 1H), 2.73-2.59 (m, 1H), 2.59-2.47 (m, 1H), 2.35 (s, 3H), 0.31 (s, 12H); ¹³C NMR (150 MHz, CDCl₃): δ 138.5, 137.5, 137.4, 137.3, 134.3, 133.6, 130.5, 130.0, 129.5, 129.3, 129.0, 127.9, 127.6 (2C), 127.2, 125.8, 66.9, 33.1, 21.4, −0.9 (2C), −4.8, −4.9; ²⁹Si NMR (120 MHz, CDCl₃): δ=6.3, −4.1; HRMS (ESI): Calculated for C27H34NaOSi2 [M+Na]+: 453.2046, Found: 453.2040.

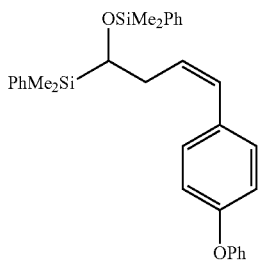

(Z)-1-[(Dimethylphenylsilyloxy)-4-(4-phenoxyphenyl)-but-3-en-1-yl]dimethylphenylsilane (reaction time: 1.5 h, 61%). The compound was prepared from 2-(4-phenoxyphenyl)furan.

colorless liquid; ¹H NMR (600 MHz, CDCl₃): δ 7.62 (d, J=6.4 Hz, 2H), 7.57 (d, J=6.4 Hz, 2H), 7.48-7.37 (m, 8H), 7.25 (d, J=8.3 Hz, 2H), 7.20 (t, J=7.4 Hz, 1H), 7.12 (d, J=8.5 Hz, 2H), 7.00 (d, J=8.4 Hz, 2H), 6.44 (d, J=11.5 Hz, 1H), 5.71 (dt, J=11.5, 7.1 Hz, 1H), 3.85 (t, J=6.7 Hz, 1H), 2.76-2.67 (m, 1H), 2.65-2.53 (m, 1H), 0.38 (s, 12H); ¹³C NMR (150 MHz, CDCl₃): δ 157.4, 155.8, 138.5, 137.4, 134.4, 133.8, 132.8, 130.3, 130.1, 129.8, 129.5, 129.3, 129.2, 127.8 (2C), 123.3, 118.9, 118.6, 67.0, 33.2, −0.7, −0.8, −4.7, −4.8; ²⁹Si NMR (120 MHz, CDCl₃): δ 6.5, −4.1; HRMS (EI): Calculated for C32H36O2Si2 [M]+: 508.2254, Found: 508.2256.

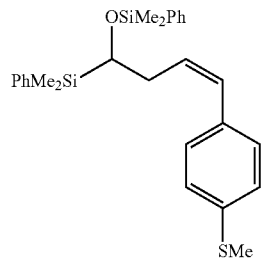

(Z)-1-[(Dimethylphenylsilyloxy)-4-(4-methylthiophenyl)-but-3-en-1-yl]dimethylphenylsilane (reaction time: 1.5 h, 91%).

colorless liquid; ¹H NMR (600 MHz, CDCl₃): δ 7.51 (d, J=7.6 Hz, 2H), 7.46 (d, J=7.0 Hz, 2H), 7.40-7.27 (m, 6H), 7.19-7.09 (m, 4H), 6.30 (d, J=11.6 Hz, 1H), 5.59 (dt, J=12.1, 7.5 Hz, 1H), 3.73 (t, J=6.6 Hz, 1H), 2.73-2.55 (m, 1H), 2.49 (s, 3H), 2.48-2.43 (m, 1H), 0.27 (s, 12H); ¹³C NMR (150 MHz, CDCl₃): δ 138.6, 137.4, 136.4, 134.6, 134.4, 133.8, 130.7, 129.5, 129.4, 129.3, 129.2, 127.8 (2C), 126.5, 66.9, 33.3, 16.1, −0.8, −0.9, −4.8, −4.8; ²⁹Si NMR (120 MHz, CDCl₃): δ 6.4, −4.1; HRMS (EI): Calculated for C27H34OSSi2 [M]+: 462.1869, Found: 462.1871.

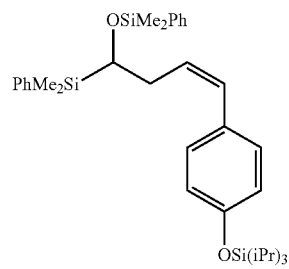

(Z)-{1-[(Dimethylphenylsilyl)-4-(dimethylphenylsilyloxy)-but-1-en-1-yl]phenoxy}triisopropylsilane (reaction time: 3 h, 95%).

colorless liquid; ¹H NMR (600 MHz, CDCl₃): δ 7.54 (d, J=6.5 Hz, 2H), 7.50 (d, J=6.5 Hz, 2H), 7.41-7.30 (m, 6H), 7.08 (d, J=8.4 Hz, 2H), 6.80 (d, J=8.5 Hz, 2H), 6.32 (d, J=11.6 Hz, 1H), 5.61-5.45 (m, 1H), 3.79-3.73 (m, 1H), 2.66-2.51 (m, 2H), 1.36-1.25 (m, 3H), 1.15 (d, J=7.4 Hz, 18H), 0.29 (s, 12H); ¹³C NMR (150 MHz, CDCl₃): δ 154.8, 138.7, 137.6, 134.4, 133.8, 130.6, 130.0, 129.6, 129.4, 129.2, 128.9, 127.7 (2C), 119.6, 67.1, 33.3, 18.1, 12.9, −0.7, −0.8, −4.8, −4.8; ²⁹Si NMR (120 MHz, CDCl₃): δ 15.2, 6.3, −4.2; HRMS (EI): Calculated for C35H52O2Si3 [M]+: 588.3275, Found: 588.3279.

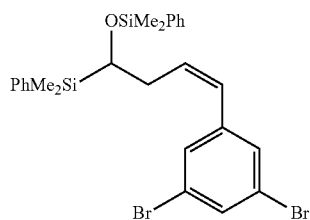

(Z)-[4-(3,5-Dibromophenyl)-1-(dimethylphenylsilyloxy)but-3-en-1-yl]dimethylphenylsilane (reaction time: 15 h, 79%). The compound was prepared from 2-(3,5-dibromophenyl)furan.

colorless liquid; $^1$H NMR (600 MHz, CDCl$_3$): δ 7.54-7.49 (m, 3H), 7.49-7.44 (m, 2H), 7.43-7.28 (m, 8H), 6.21 (d, J=11.7 Hz, 1H), 5.72-5.67 (m, 1H), 3.75 (dd, J=8.6, 4.9 Hz, 1H), 2.62-2.52 (m, 1H), 2.37-2.27 (m, 1H), 0.29 (s, 6H), 0.28 (s, 6H); $^{13}$C NMR (150 MHz, CDCl$_3$): δ 140.8, 138.1, 136.9, 134.1, 133.6, 133.6, 131.8, 130.3, 129.4, 129.2, 127.7, 127.6, 127.5, 122.5, 66.4, 32.8, −1.0 (2C), −4.9, −5.0; $^{29}$Si NMR (120 MHz, CDCl$_3$): δ 6.7, −3.9; HRMS (ESI): Calculated C26H30Br2NaOSi2 [M+Na]+: 595.0100, Found: 595.0095.

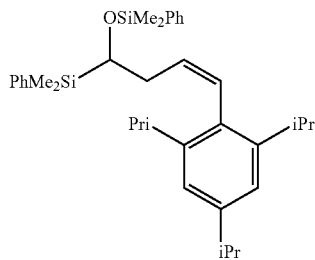

(Z)-1-[(Dimethylphenylsilyloxy)-4-(2,4,6-triisopropylphenyl)but-3-en-1-yl]dimethylPhenylsilane (reaction time: 6 h, 80%). The compound was prepared from 2-(2,4,6-triisopropylphenyl)furan.

colorless liquid; $^1$H NMR (600 MHz, CDCl$_3$): δ 7.51-7.46 (m, 2H), 7.46-7.41 (m, 2H), 7.40-7.31 (m, 4H), 7.29 (t, J=7.3 Hz, 2H), 7.05-6.90 (m, 2H), 6.28 (d, J=11.6 Hz, 1H), 5.81-5.71 (m, 1H), 3.57 (dd, J=8.9, 5.6 Hz, 1H), 3.12-2.98 (m, 2H), 2.95-2.85 (m, 1H), 2.17-2.09 (m, 1H), 2.08-1.90 (m, 1H), 1.29 (d, J=6.8 Hz, 6H), 1.24-1.13 (m, 4H), 1.13-1.07 (m, 8H), 0.23 (s, 3H), 0.21 (s, 3H), 0.19 (s, 6H); $^{13}$C NMR (150 MHz, CDCl$_3$): δ 147.4, 138.7, 137.5, 134.3, 133.8, 131.6, 131.1, 129.4, 129.1, 128.2, 127.7, 127.7, 120.3, 120.3, 66.6, 34.4, 33.5, 30.2, 24.5, 24.3, 23.2, −0.9, −1.1, −4.8, −5.0; $^{29}$Si NMR (120 MHz, CDCl$_3$): δ 5.9, −4.5; HRMS (EI): Calculated for C35H50OSi2 [M]+: 542.3400, Found: 542.3396.

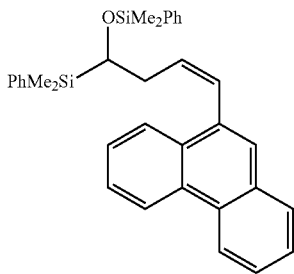

(Z)-1-[(Dimethylphenylsilyloxy)-4-(phenanthren-9-yl)but-3-en-1-yl]dimethylphenylsilane (reaction time: 3 h, 82%). The compound was prepared from 2-(phenanthren-9-yl)furan.

colorless liquid; $^1$H NMR (600 MHz, CDCl$_3$): δ 8.84-8.64 (m, 2H), 8.11 (d, 8.0 Hz, 1H), 7.84 (d, J=7.7 Hz, 1H), 7.79-7.66 (m, 4H), 7.66-7.56 (m, 2H), 7.52-7.38 (m, 6H), 7.34 (t, J=6.7 Hz, 1H), 7.26 (t, J=7.3 Hz, 2H), 6.98 (d, J=11.8 Hz, 1H), 6.08 (dt, J=11.6, 7.3 Hz, 1H), 3.87 (dd, J=8.0, 5.3 Hz, 1H), 2.70 (dt, J=15.5, 7.7 Hz, 1H), 2.58-2.49 (m, 1H), 0.4 (s, 6H), 0.34 (s, 3H), 0.31 (s, 3H); $^{13}$C NMR (150 MHz, CDCl$_3$): δ 138.5, 137.4, 134.3, 133.8, 132.8, 132.7, 131.7, 131.4, 130.5, 130.0, 129.5, 129.1, 128.7, 128.3, 127.8, 127.7, 127.2, 126.7, 126.6, 126.5, 126.4, 125.7, 123.0, 122.5, 67.0, 33.5, −0.8, −0.9, −4.7, −4.8; $^{29}$Si NMR (120 MHz, CDCl$_3$): δ 6.4, −4.3; HRMS (EI): Calculated for C34H36OSi2 [M]+: 516.2305, Found: 516.2307.

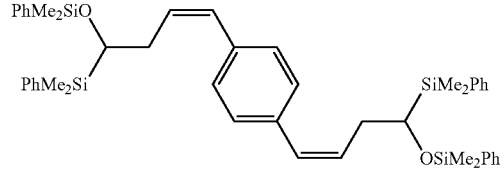

(Z)-1,4-Bis[4-(dimethylphenylsilyl)-4-(dimethylphenylsilyloxy)but-1-en-1-yl]benzene (reaction time: 2 h, 72%). The compound was prepared from 1,4-di(furan-2-yl) benzene using dimethylphenylsilane (4.0 equiv.).

colorless liquid; $^1$H NMR (600 MHz, CDCl$_3$): δ 7.54 (d, J=6.4 Hz, 4H), 7.49 (d, J=7.8 Hz, 4H), 7.41-7.35 (m, 8H), 7.33-7.28 (m, 4H), 6.36 (d, J=11.7 Hz, 2H), 5.84-5.53 (m, 2H), 3.86-3.71 (m, 2H), 2.76-2.61 (m, 2H), 2.58-2.49 (m, 2H), 0.30 (s, 24H); $^{13}$C NMR (150 MHz, CDCl$_3$): δ 138.6, 137.5, 135.8, 134.4, 133.8, 130.6, 129.8, 129.5, 129.2, 128.6, 127.8, 67.0, 33.4, −0.7, −0.8, −4.8, −4.8; $^{29}$Si NMR (120 MHz, CDCl$_3$): δ 6.4, −4.1; HRMS (EI): Calculated for C46H58O2Si4 [M]+: 754.3514, Found: 754.3517.

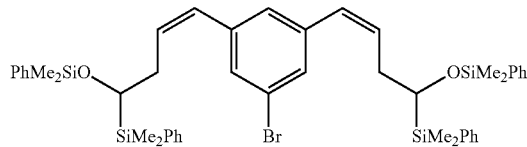

(3Z,3'Z-{[(5-Bromo-1,3-phenylene)bis1-(dimethylphenylsilyloxy)but-3-ene-4,1-diyl]bis(dimethylphenylsilane) (reaction time: 8 h, 81%). The compound was prepared from 2,2'-(5-bromo-1,3-phenylene)difuran. B(C6F5)3(4.0 mol %) and dimethylphenylsilane (4.0 equiv.) were used.

colorless liquid; $^1$H NMR (600 MHz, CDCl$_3$): δ 7.53 (d, J=7.2 Hz, 4H), 7.48 (d, J=7.1 Hz, 4H), 7.42-7.29 (m, 14H), 6.95 (s, 1H), 6.26 (d, J=11.7 Hz, 2H), 5.76-5.55 (m, 2H), 3.76 (t, J=6.7 Hz, 2H), 2.71-2.53 (m, 2H), 2.46-2.38 (m, 2H), 0.29 (s, 24H); $^{13}$C NMR (150 MHz, CDCl$_3$): δ 139.1, 138.3, 137.1, 134.2, 133.6, 132.0, 129.5, 129.4, 129.1, 128.7, 127.9, 127.7, 127.6, 121.8, 66.6, 33.0, −0.94, −0.97, −4.8, −4.9; $^{29}$Si NMR (120 MHz, CDCl$_3$): δ 6.5, −4.1; HRMS (ESI): Calculated for C46H57BrNaO2Si4 [M+Na]+: 855.2517, Found: 855.2498.

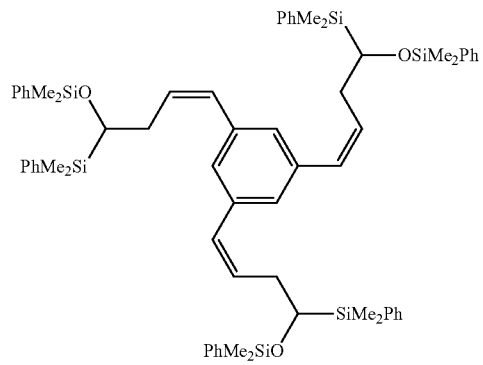

(Z)-1,3,5-Tris[4-(dimethylphenylsilyl)-4-(dimethylphenylsilyloxy)but-1-en-1-yl]benzene (reaction time: 2.5 h, 87%). The compound was prepared from 1,3,5-tri(furan-2-yl)benzene. B(C6F5)3(6.0 mol %) and dimethylphenylsilane(6.0 equiv.) were used.

colorless liquid; $^1$H NMR (600 MHz, CDCl$_3$): δ 7.58-7.52 (m, 6H), 7.52-7.45 (m, 6H), 7.42-7.28 (m, 18H), 7.01 (s, 3H), 6.33 (d, J=12.5 Hz, 3H), 5.74-5.61 (m, 3H), 3.78 (d, J=6.5 Hz, 3H), 2.72-2.61 (m, 3H), 2.61-2.50 (m, 3H), 0.35-0.25 (m, 36H); $^{13}$C NMR (150 MHz, CDCl$_3$): δ 138.4, 137.4, 137.1, 134.2, 133.6, 130.5, 129.9, 129.3, 129.1, 127.6, 127.4, 66.8, 33.2, −0.8, −4.6, −4.9; $^{29}$Si NMR (120 MHz, CDCl$_3$): δ 6.4, −4.2; HRMS (ESI): Calculated for C66H84NaO3Si6 [M+Na]+: 1115.4934, Found: 1115.4914.

Comparative Example 1

Comparative Example 1 was performed in the same way as in Inventive Example 1 above except that 2-methylfuran, PhMe$_2$SiH, and CD$_2$Cl$_2$ were used during a reaction but a catalyst was not used, but an this case, no product was obtained on a $^1$H NMR (1,1,2,2-tetrachloroethane (TCE)) spectrum.

Comparative Example 2

Comparative Example 2 was performed in the same way as in Inventive Example 1 above except that 2-methylfuran, PhMe$_2$SiH, and CD$_2$Cl$_2$ were used during a reaction like in Comparative Example 1 above but AlCl$_3$ was used instead of a borane catalyst as a catalyst, but in this case, a product was obtained with a conversion yield of 10% and a yield of <1% (1% or less) on a $^1$H NMR(1,1,2,2-tetrachloroethane (TCE)) spectrum.

Comparative Example 3

Comparative Example 3 was performed in the same way as in Inventive Example 1 above except that 2-methylfuran, PhMe$_2$SiH, and CD$_2$Cl$_2$ were used during a reaction in Comparative Example 1 above but [Ir(COH)Cl]$_2$ was used instead of a borane catalyst as a catalyst, but in this case, a product was obtained with a conversion yield of 10% and a yield of <1% on a $^1$H NMR(1,1,2,2-tetrachloroethane (TCE)) spectrum.

Comparative Example 4

Comparative Example 4 was performed in the same way as in Inventive Example 1 above except that 2-methylfuran, PhMe$_2$SiH, and CD$_2$Cl$_2$ were used during a reaction like in Comparative Example 1 above but [Rh(COD)Cl]$_2$ was used instead of a borane catalyst as a catalyst, but in this case, a product was obtained with a conversion yield of 10% and a yield of <1% on a $^1$H NMR(1,1,2,2-tetrachloroethane (TCE)) spectrum.

Comparative Example 5

Comparative Example 5 was performed in the same way as in Inventive Example 1 above except that 2-methylfuran, PhMe$_2$SiH, and CD$_2$Cl$_2$ were used during a reaction like in Comparative Example 1 above but Pt(0)-1,3-divinyl-1,1,3,3-tetramethyl-disiloxane was used instead of a borane catalyst as catalyst, but in this case, a product was obtained with a conversion yield of 12% and a yield of <1% on a $^1$H NMR(1,1,2,2-tetrachloroethane (TCE)) spectrum.

Inventive Example 2 General Preparation of (Z)-α-silyloxyalkenylsilane Derivative (Silyloxyalkenylsilanes)

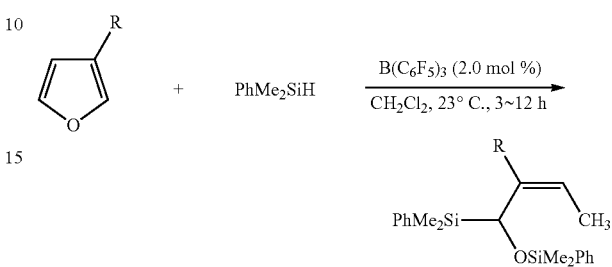

CH$_2$Cl$_2$ (0.4-0.8 mL) and B(C$_6$F$_5$)$_3$ (0.01 to 0.02 mmol, 2.0 mol %) were put in a dried flask, a silane compound (PhMe$_2$SiH, 1.025-2.050 mmol) was added thereto and was well stirred and, then, a furan derivative (0.50 to 1.0 mmol) was again added thereto and, then, was stirred at 23° C. for 3 to 12 hours. The reaction mixture was quenched with Et$_3$N (5.0 to 10.0 mol %), was subjected to vacuum evaporation, and was isolated and purified (to nucleic acid or hexane and ethyl acetate) via silica gel column chromatography to obtain a target product (Z/E>99/1).

The following compound was prepared using the same method as the above.

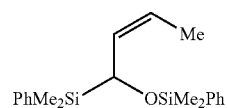

(Z)-1-[(Dimethylphenylsilyloxy)but-2-en-1-yl]dimethylphenylsilane (reaction time: 12 h): The compound was prepared via a reaction between furan (204 mg, 3.00 mmol) and dimethylphenylsilane (838 mg, 6.15 mmol) in the presence of B(C$_6$F$_5$)$_3$ (30.6 mg, 2.0 mol %) melted in CH$_2$Cl$_2$ (4.0 mL) (746 mg, 73%).

colorless liquid; $^1$H NMR (600 MHz, CDCl$_3$): δ 7.66-67.62 (m, 2H), 7.60-7.52 (m, 2H), 7.45-7.35 (m, 6H), 5.56 (t, J=11.2 Hz, 1H), 5.43-5.32 (m, 1H), 4.52 (d, J=9.9 Hz, 1H), 1.38 (d, J=8.4 Hz, 3H), 0.41 (s, 3H), 0.36 (s, 9H); $^{13}$C NMR (150 MHz, CDCl$_3$): δ 138.8, 137.2, 134.5, 133.7, 132.3, 129.4, 129.2, 127.7, 127.6, 121.8, 64.5, 13.5, −0.8, −1.0, −5.5, −5.7; $^{29}$Si NMR (120 MHz, CDCl$_3$): δ 8.2, 4.8; HRMS (EI): Calculated for C20H28OSi2 [M]+: 340.1679, Found: 340.1676.

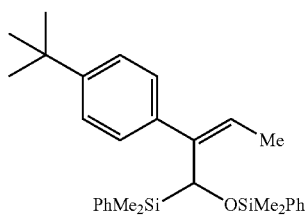

(Z)-[2-(4-tert-Butyl-phenyl)-1-(dimethylphenylsilyloxy)but-2-en-1-yl]dimethylphenylsilane (reaction time: 3 h, 84%). The compound was prepared from 3-[4-(tert-butyl)phenyl]-furan.

colorless liquid; $^1$H NMR (600 MHz, CDCl$_3$): δ 7.53 (d, J=7.2 Hz, 2H), 7.48-7.40 (m, 3H), 7.39-3.34 (m, 3H), 7.30 (t, J=7.3 Hz, 3H), 7.22 (d, J=7.3 Hz, 3H), 5.57 (q, J=7.1 Hz, 1H), 4.79 (s, 1H), 1.88-1.53 (m, 3H), 1.34 (s, 9H), 0.35 (s, 3H), 0.31 (s, 3H), 0.19 (s, 3H), 0.13 (s, 3H); $^{13}$C NMR (150 MHz, CDCl$_3$): δ 149.3, 141.4, 140.6, 138.2, 137.8, 134.4, 133.9, 129.5, 129.0, 127.9, 127.8, 127.5, 124.6, 124.2, 67.6, 34.5, 31.5, 14.9, −1.0, −1.4, −4.4, −4.6; $^{29}$Si NMR (120 MHz, CDCl$_3$): δ 8.4, −3.8; HRMS (EI): Calculated for C30H40OSi2 [M]+: 472.2618, Found: 472.2616.

Inventive Example 3 General Preparation of γ-Silylated Ketone Derivative (γ-Silylated Ketone)

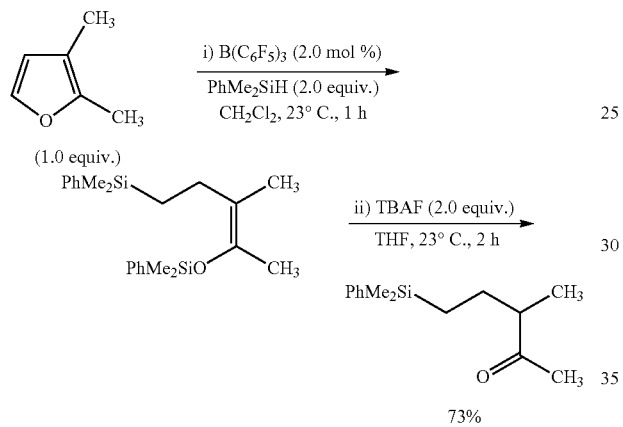

Preparation of 5-(Dimethylphenylsilyl)-3-methylpentan-2-one

1) CH$_2$Cl$_2$ (8.0 mL) and B(C$_6$F$_5$)$_3$ (0.102 g, 2.0 mol %) were put in a well dried flask at 0° C., dimethylphenylsilane (2.79 g, 20.5 mmol) was added thereto and was stirred for 2 minutes, 2,3-dimethylfuran (0.96 g, 10.0 mmol) was added again and, then, current temperature was increased, and the resultant was stirred for 1 hour at 23° C. The reaction mixture was quenched with Et$_3$N (50 mg, 0.5 mmol), was subjected to vacuum evaporation and, then, was used in the following reaction.

2) THF (5 mL) was added to the reaction mixture in the above step, tetrabutylammonium fluoride (TBAF) (1 M in THF, 20 ml, 20.0 mmol) was slowly added thereto at 0° C., current temperature was increased again, and the resultant was stirred at 23° C. for 2 hours. Water (20 mL) was added to the reaction mixture and the resultant was subject to extraction with ethyl acetate (15 mL×3). The collected organic layers were dried with anhydrous Na$_2$SO$_4$, were subjected to vacuum evaporation, and were isolated and purified via silica gel column chromatography (ethyl acetate/hexane 1/9) to obtain a target compound (1.71 g, 73% for two steps).

colorless liquid; $^1$H NMR (600 MHz, CDCl$_3$): δ 7.54-7.47 (m, 2H), 7.40-7.30 (m, 3H), 2.53-2.40 (m, 1H), 2.07 (s, 3H), 1.73-1.58 (m, 1H), 1.45-1.32 (m, 1H), 1.06 (d, J=6.9 Hz, 3H), 0.78-0.62 (m, 2H), 0.28 (s, 6H); $^{13}$C NMR (150 MHz, CDCl$_3$): δ 212.6, 138.8, 133.5, 128.9, 127.8, 49.8, 28.1, 27.2, 15.7, 13.0, −3.19, −3.27; $^{29}$Si NMR (120 MHz, CDCl$_3$): δ −2.8; HRMS (ESI): Calculated for C14H22NaOSi [M+Na]+: 257.1338, Found: 257.1330.

Inventive Example 4 General Preparation of (Z)-Homoallylsilane Derivative ((Z)-Homoallylsilane)

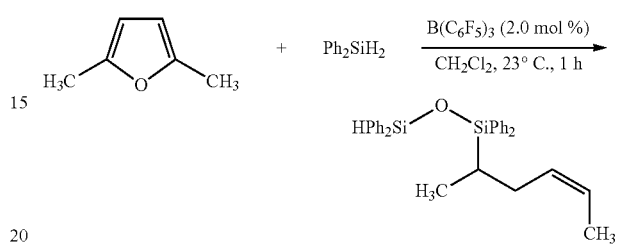

CH$_2$Cl$_2$ (0.8 mL) and B(C$_6$F$_5$)$_3$ (0.02 mmol, 2.0 mol %) were put in a well dried flask, diphenylsilane (2.0 mmol) was added thereto and was well stirred, furan derivative (1.0 mmol) was added again, current temperature was increased and, then, the resultant was stirred at 23° C. for 1 hour. The reaction mixture was quenched with Et$_3$N (5 mmol %), was subjected to vacuum evaporation and, then, was isolated and purified (to hexane) via silica gel column chromatography to obtain a target compound (Z/E>99/1).

The following compound was prepared using the same method as the above.

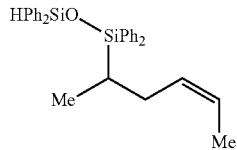

(Z)-1-(Hex-4-en-2-yl)-1,1,3,3-tetraphenyldisiloxane (reaction time: 1 h, 81%). The compound was prepared from 2,5-dimethylfuran.

colorless liquid; $^1$H NMR (600 MHz, CDCl$_3$): δ7.71-7.56 (m, 8H), 7.50-7.30 (m, 12H), 5.73 (s, 1H), 5.55-5.43 (m, 1H), 5.42-5.32 (m, 1H), 2.34 (d, J=11.2 Hz, 1H), 2.00 (d, J=10.1 Hz, 1H), 1.48 (d, J=5.8 Hz, 3H), 1.45-1.33 (m, 1H), 1.05 (d, J=7.2 Hz, 3H); $^{13}$C NMR (150 MHz, CDCl$_3$): δ 135.6, 135.4, 134.8, 134.5, 130.5, 130.3, 129.8, 128.05, 127.9, 124.5, 28.2, 20.2, 13.5, 12.9; $^{29}$Si NMR (120 MHz, CDCl$^3$): δ −8.4, −20.6; HRMS (EI): Calculated for C30H32OSi2 [M]+: 464.1992, Found: 464.1994.

Inventive Example 5 General Preparation of Ortho-(β-Silylethyl)-Phenol Derivative (Ortho-(β-Silylethyl)-Phenols)

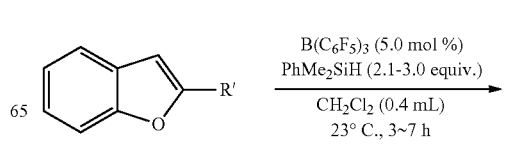

-continued

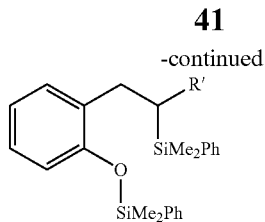 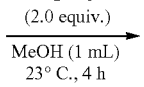

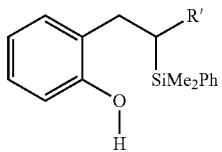

CH$_2$Cl$_2$ (0.4 mL) and B(C$_6$F$_5$)$_3$ (0.025 mmol, 5.0 mol %) were put in a well dried flask, dimethylphenylsilane (1.05 to 1.5 mmol) was added thereto and was well stirred and, then, a benzofuran derivative (0.5 mmol) was added again, current temperature was increased, and the resultant was stirred at 23° C. for 3 to 7 hours. K$_2$CO$_3$ (138 mg, 1.00 mmol) melted in methanol (2 mL) was added to the reaction mixture and was stirred at 23° C. for 5 to 7 hours. The resultant was filtered with celite to remove a solid, was subjected to vacuum evaporation and, then, was isolated and purified (to hexane/ethyl acetate) via silica gel column chromatography to prepare a target compound.

The following compound was prepared using the same method as the above.

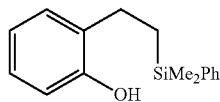

2-[2-(Dimethylphenylsilyl)ethyl]phenol (reaction time: 5 h, 90%).

colorless liquid; $^1$H NMR (600 MHz, CDCl$_3$): δ 7.64-7.52 (m, 2H), 7.45-7.31 (m, 3H), 7.14 (d, J=7.3 Hz, 1H), 7.07 (t, J=8.3 Hz, 1H), 6.88 (t, J=7.7 Hz, 1H), 6.73 (d, J=7.9 Hz, 1H), 4.69 (s, 1H), 2.97-2.41 (m, 2H), 1.29-0.96 (m, 2H), 0.33 (s, 6H); $^{13}$C NMR (150 MHz, CDCl$_3$): δ 153.3, 139.2, 133.7, 130.9, 129.4, 129.1, 127.9, 127.0, 120.9, 115.3, 24.2, 15.9, -2.9; $^{29}$Si NMR (120 MHz, CDCl$_3$): δ -2.7; HRMS (EI): Calculated for C16H20OSi [M]+: 256.1283, Found: 256.1286.

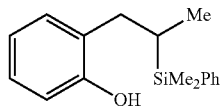

2-[2-(Dimethylphenylsilyl)propyl]phenol (reaction time: 3 h, 88%). The compound was prepared from 2-methylbenzofuran.

colorless liquid; $^1$H NMR (600 MHz, CDCl$_3$): δ 7.77-77.56 (m, 2H), 7.51-7.32 (m, 3H), 7.16-7.02 (m, 2H), 6.87 (t, J=6.0 Hz, 1H), 6.75 (d, J=6.0 Hz, 1H), 4.60 (s, 1H), 2.88 (dd, J=12.0, 6.0 Hz, 1H), 2.19 (d, J=12.0 Hz, 1H), 1.56-1.21 (m, 1H), 0.94 (d, J=7.3 Hz, 3H), 0.37 (s, 6H); $^{13}$C NMR (150 MHz, CDCl$_3$): δ 153.7, 138.4, 134.1, 130.9, 129.1, 127.9, 127.1, 120.5, 115.4, 32.0, 20.3, 13.9, -4.7, -5.2; $^{29}$Si NMR (120 MHz, CDCl$_3$): δ 0.55; HRMS (EI): Calculated for C17H22OSi [M]+: 270.1440, Found: 270.1440.

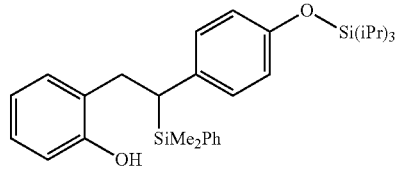

2-{2-(Dimethylphenylsilyl)-2-[4-(triisopropylsilyloxy) phenyl]ethyl} phenol (reaction time: 7 h, 70%). The compound was prepared from 2-(naphthalen-1-yl)benzofuran.

colorless liquid; $^1$H NMR (600 MHz, CDCl$_3$): δ 7.53-7.44 (m, 2H), 7.41-7.31 (m, 3H), 6.98-6.89 (m, 1H), 6.82-6.75 (m, 3H), 6.74-4 6.68 (m, 2H), 6.66-6.56 (m, 2H), 4.55-4.27 (m, 1H), 3.07 (dd, J=14.7, 3.2 Hz, 1H), 2.96-2.85 (m, 1H), 2.49 (dd, J=11.7, 3.2 Hz, 1H), 1.27-1.18 (m, 3H), 1.14-0.89 (m, 18H), 0.34 (s, 3H), 0.24 (s, 3H); $^{13}$C NMR (150 MHz, CDCl$_3$): δ 153.5, 137.7, 135.1, 134.3, 130.5, 129.4, 129.3, 129.1, 128.5, 127.8, 127.0, 120.6, 120.1, 115.6, 36.5, 31.0, 18.0, 12.7, -3.8, -4.9; $^{29}$Si NMR (120 MHz, CDCl$_3$): δ 15.2, -1.8; HRMS (EI): Calculated for C31H44O2Si2 [M]+: 504.2880, Found: 504.2879.

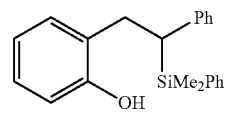

2-[2-(Dimethylphenylsilyl)-2-phenylethyl]phenol (reaction time: 4 h, 79%). The compound was prepared from 2-phenylbenzofuran.

colorless liquid; $^1$H NMR (600 MHz, CDCl$_3$): δ 7.57-7.49 (m, 2H), 7.47-7.32 (m, 3H), 7.19 (t, J=6.7 Hz, 2H), 7.09 (t, J=7.3 Hz, 1H), 7.04-7.90 (m, 3H), 6.85 (d, J=7.4 Hz, 1H), 6.69 (t, J=6.9 Hz, 1H), 6.62 (d, J=7.9 Hz, 1H), 4.47 (s, 1H), 3.11 (d, J=14.4 Hz, 1H), 3.03 (t, J=13.0 Hz, 1H), 2.66 (d, J=10.6 Hz, 1H), 0.37 (s, 3H), 0.26 (s, 3H); $^{13}$C NMR (150 MHz, CDCl$_3$): δ 153.5, 142.7, 137.5, 134.3, 130.4, 129.3, 128.3, 128.3, 128.2, 127.9, 127.1, 125.0, 120.6, 115.5, 37.2, 30.5, -3.7, -5.1; $^{29}$Si NMR (120 MHz, CDCl$_3$): δ -1.3; HRMS (EI): Calculated for C22H24OSi [M]+: 332.1596, Found: 332.159.

Inventive Example 6 Example 1 of Application of the Silane Derivative According to the Present Invention

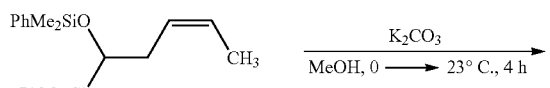

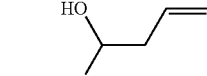

Preparation of (Z)-1-(Dimethylphenylsilyl)pent-3-en-1-ol (reaction time: 4 h, 90%). The compound was prepared from K2CO3 (2.76 g, 20 mmol), MeOH (40 mL), and Z-2 (3.54 g, 10.0 mmol).

colorless liquid; $^1$H NMR (600 MHz, CDCl$_3$): δ 7.65-7.55 (m, 2H), 7.43-7.34 (m, 3H), 5.75-5.57 (m, 1H), 5.49-5.31 (m, 1H), 3.49 (dd, J=12, 6.0 Hz, 1H), 2.49-2.33 (m, 1H), 2.26-2.07 (d, J=14.4 Hz, 1H), 1.61 (d, J=6.7 Hz, 3H), 1.53-1.33 (m, S1 31H), 0.39 (s, 3H), 0.37 (s, 3H); $^{13}$C NMR (150 MHz, CDCl$_3$): δ 136.9, 134.2, 129.4, 127.9, 127.6, 127.5, 64.6, 31.1, 13.1, −5.3, −5.3; $^{29}$Si NMR (120 MHz, CDCl$_3$): δ −3.8; HRMS (EI): Calculated for C13H20OSi [M]+: 220.1283, Found: 220.1279.

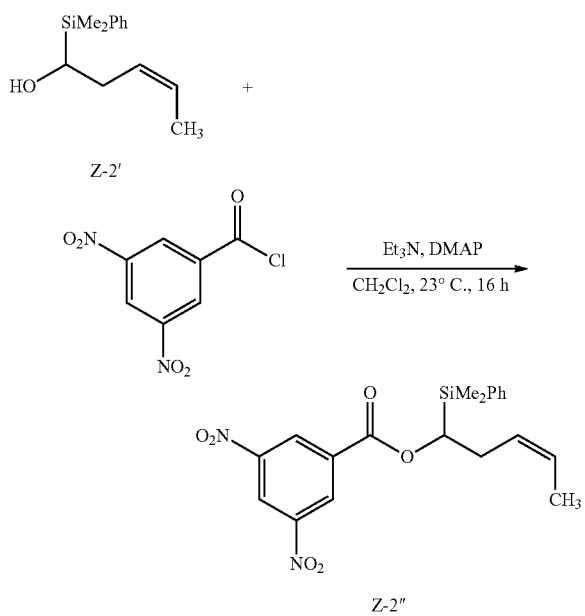

Preparation of (Z)-1-[(Dimethylphenylsilyl)(pent-3-en-1-yl)]-3,5-dinitrobenzoate (Z-2", 83%). Z-2' (1.00 g, 4.54 mmol) and CH$_2$Cl$_2$ (40 mL) were put in a well dried flask, triethylamine (Et$_3$N) (2.3 g, 22.7 mmol), dimethylaminopyridine (DMAP) (0.910 mmol, 111 mg, 20.0 mol %), and 3,5-dinitrobenzoylchloride (1.36 g, 5.9 mmol) were slowly added thereto at 0° C., and were stirred at 23° C. for 16 hours. The reaction mixture was diluted with CH$_2$Cl$_2$, was quenched with water (5 mL), was extracted with CH$_2$Cl$_2$ and, then, was washed with salt water. An organic layer was dried with Mg$_2$SO$_4$, was subjected to vacuum evaporation and, then, was isolated and purified (to ethyl acetate/hexane 1/10) via silica gel column chromatography to obtain a target compound Z-2" (1.553 g, 83%). The resultant was re-crystallized with CH$_2$Cl$_2$ and n-pentane to obtain a compound of yellow crystals.

m.p. 79-81° C.; $^1$H NMR (600 MHz, CDCl$_3$): δ 9.19 (s, 1H), 9.02 (s, 2H), 7.57 (s, 2H), 7.38 (s, 3H), 5.53-5.44 (m, 1H), 5.37-5.32 (m, 1H), 5.31-5.26 (m, 1H), 2.71-2.55 (m, 1H), 2.46-2.28 (m, 1H), 1.54 (d, J=6.6 Hz, 3H), 0.45 (s, 6H); $^{13}$C NMR (100 MHz, CDCl$_3$): δ 162.7, 148.8, 135.0, 134.5, 134.1, 130.0, 129.3, 128.2, 126.9, 126.3, 122.2, 71.6, 28.8, 13.0, −4.7, −4.8; $^{29}$Si NMR (120 MHz, CDCl$_3$): δ −2.6; HRMS (EI): Calculated for C20H22N2O6Si [M]+: 414.1247, Found: 414.1244.

Inventive Example 7 Example 2 of Application of Silane Derivative According to the Present Invention

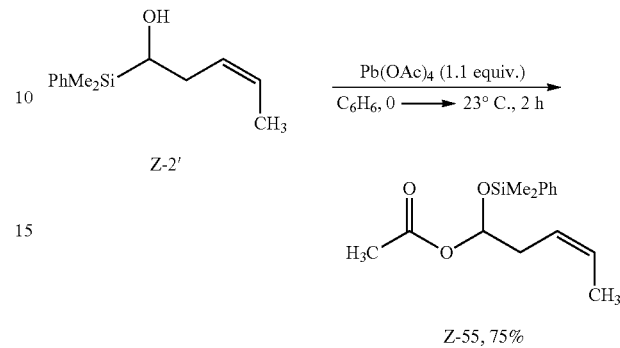

In a light-blocked container, (dimethylphenylsilyl)pent-3-en-1-ol (Z-2', 0.22 g, 1.0 mmol) was melted in benzene (14 mL) and Pb(OAc)$_4$ (0.488 g, 1.1 mmol) was added at 0° C. and under nitrogen gas. The resultant was filtered after a reaction at 23° C. for 2 hours to remove a solid, was subjected to vacuum evaporation, and was isolated and purified (to hexane/ethylacetate 9/1) via silica gel column chromatography to obtain a colorless liquid compound (Z-55).

colorless liquid (0.209 g, 75%); $^1$H NMR (600 MHz, CDCl$_3$): δ 7.59 (d, J=1.6 Hz, 1H), 7.58 (d, J=1.7 Hz, 1H), 7.40-7.34 (m, 3H), 6.00 (t, J=5.3 Hz, 1H), 5.64-5.54 (m, 1H), 5.40-5.30 (m, 1H), 2.48-2.34 (m, 2H), 1.91 (s, 3H), 1.58 (d, J=6.9 Hz, 3H), 0.44 (s, 3H), 0.43 (s, 3H); $^{13}$C NMR (150 MHz, CDCl$_3$): δ 169.9, 137.0, 133.5, 129.7, 127.7, 127.5, 123.2, 92.1, 34.4, 21.1, 12.9, −1.4; $^{29}$Si NMR (120 MHz, CDCl$_3$): δ 8.8; IR (cm$^1$): 2958, 1737, 1590, 1427, 1370, 1238, 1117, 1007, 935, 823, 699; HRMS (ESI): Calculated for C15H22NaO3Si [M+Na]+: 301.1236, Found: 301.1230

Inventive Example 8 Example 3 of Application of Silane Derivative According to the Present Invention

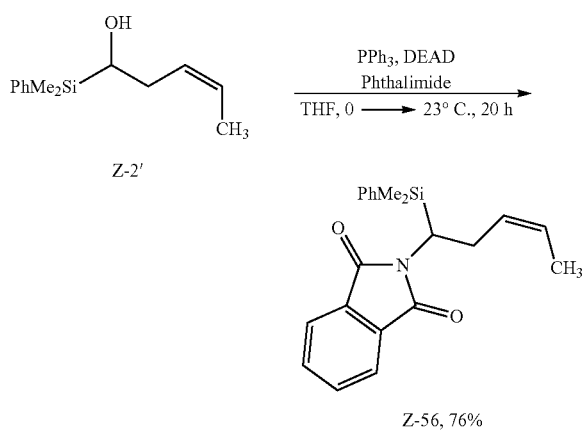

Preparation of (Z)-2-[1-(Dimethylphenylsilyl)pent-3-en-1-yl]isoindoline-1,3-dione (Z-56)

(Z)-1-(dimethylphenylsilyl)pent-3-en-1-ol (Z-2', 0.22 g, 1.0 mmol), triphenylphosphine (TPP, 0.34 g, 1.3 mmol), and phthalimide (0.191 g, 1.3 mmol) were melted in THF (2.0 mL), diethyl azodicarboxylate (DEAD, 226 g, 1.3 mmol) was slowly added thereto at 0° C. under nitrogen gas, and was stirred at 23° C. for 20 hours. The reaction mixture was subjected to vacuum evaporation and was isolated and purified (to hexane/ethyl acetate 9/1) via silica gel column chromatography to obtain a colorless and viscous liquid Z-56.

colorless viscous oil (0.265 g, 76%). $^1$H NMR (600 MHz, CDCl$_3$): δ 7.79-7.72 (m, 2H), 7.68-7.61 (m, 2H), 7.60-7.53 (m, 2H), 7.35-7.29 (m, 3H), 5.49-5.34 (m, 1H), 5.34-5.18 (m, 1H), 4.03 (dd, J=11.6, 4.5 Hz, 1H), 2.99-2.83 (m, 1H), 2.41-2.25 (m, 1H), 1.6 (d, J=6.7 Hz, 3H), 0.59 (s, 3H), 0.45 (s, 3H); $^{13}$C NMR (100 MHz, CDCl$_3$): δ 168.9, 136.8, 133.8, 133.6, 131.9, 129.3, 127.8, 127.5, 126.6, 122.8, 41.1, 26.0, 12.6, −3.3, −3.8; $^{29}$Si NMR (80 MHz, CDCl$_3$): δ −0.3; IR (cm$^1$): 2954, 1770, 1705, 1466, 1427, 1385, 1249, 1172, 1078, 985, 882, 717; HRMS (ESI): Calculated for C21H23NNaO2Si [M+Na]+: 372.1396, Found: 372.1383

Inventive Example 9 Example 4 of Application of Silane Derivative According to the Present Invention

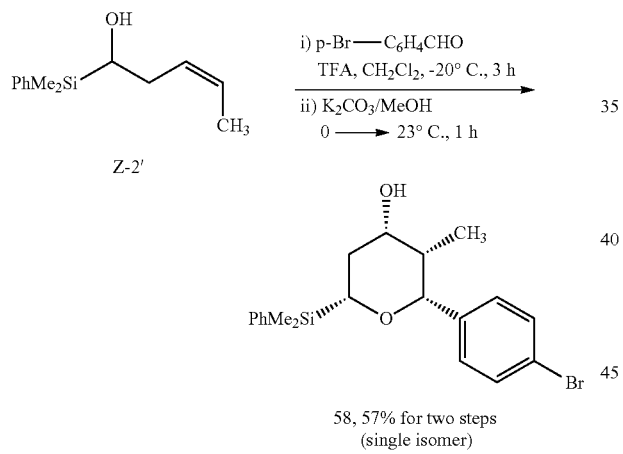

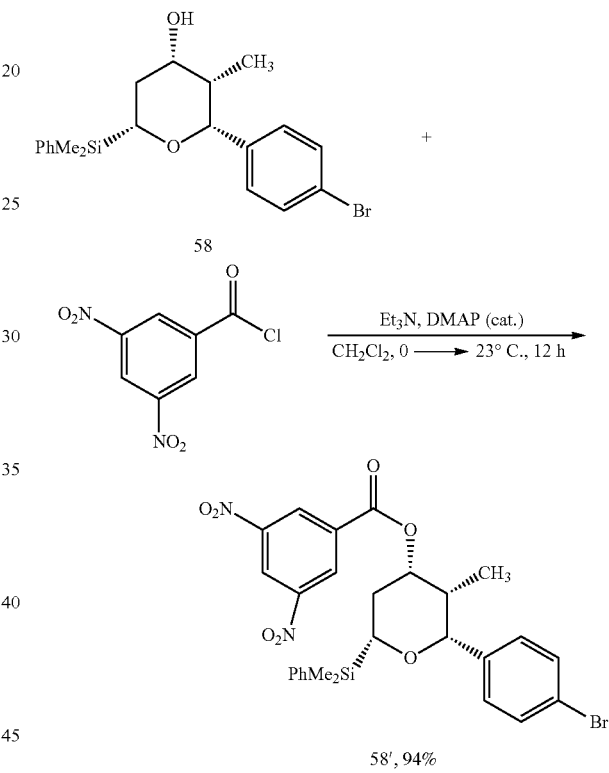

Preparation of 2-[(4-Bromophenyl)-6-(dimethylphenylsilyl)]-3-methyltetrahydro-2H-pyran-4-ol (Z)-1-(dimethylphenylsilyl)pent-3-en-1-ol (Z-2', 0.22 g, 1.0 mmol) and 4-bromobenzaldehyde (0.221 g, 1.2 mmol) were melted in CH$_2$Cl$_2$ (5 mL), trifluoroacetic acid (0.285 g, 2.25 mmol) was slowly added thereto at −20° C. under nitrogen gas and then, a reaction was performed at the same temperature for 3 hours. The resultant was quenched with 5 mL of a saturated sodium hydrogen carbonate (NaHCO$_3$) solution and, then, triethylamine was added thereto to satisfy pH>7. Organic layers collected via extraction with CH$_2$Cl$_2$ (3×5 mL) were dried with anhydrous Na$_2$SO$_4$ and were subjected to vacuum evaporation. MeOH (6 mL) was added thereto, K$_2$CO$_3$ (0.276 g, 2.0 mmol) was added at 0° C., and a reaction was performed for 2 hours. When the reaction was completed, the resultant was filtered with celite, and was subjected to vacuum evaporation, and was isolated and purified (to hexane/ethyl acetate 7/3) via silica gel column chromatography to obtain a colorless liquid compound 58 (0.230 g, 57% for two steps).

colorless liquid with single diastereomer. $^1$H NMR (600 MHz, CDCl$_3$): δ 7.69-7.58 (m, 2H), 7.47 (d, J=4.9 Hz, 2H), 7.42-7.33 (m, 3H), 7.17 (d, J=5.1 Hz, 2H), 4.41 (d, J=3.4 Hz, 1H), 4.07-4.00 (m, 1H), 3.46 (d, J=13.2 Hz, 1H), 2.21-2.12 (m, 1H), 1.80-1.71 (m, 1H), 1.67 (q, J=13.0 Hz, 1H), 1.60-1.52 (m, 1H), 0.57 (d, J=3.5 Hz, 3H), 0.42 (s, 6H); $^{13}$C NMR (150 MHz, CDCl$_3$): δ 140.8, 136.4, 134.1, 131.1, 129.3, 127.8, 127.1, 120.2, 81.8, 72.2, 70.0, 40.7, 30.0, 4.9, −5.4, −5.6; $^{29}$Si NMR (120 MHz, CDCl$_3$): δ −4.7; IR (cm$^1$): 3369, 2968, 1707, 1589, 1488, 1361, 1247, 1114, 1009, 817, 699; HRMS (ESI): Calculated for C20H25BrNaO2Si [M+Na]+: 427.0705, Found: 427.0688.

Preparation of [(4-Bromophenyl)-6-(dimethylphenylsilyl)]-3-methyltetrahydro-2H-pyran-4-yl-3,5-dinitrobenzoate (Compound 58')

Compound 58 (40.4 mg, 0.1 mmol) prepared as described above was melted in CH$_2$Cl$_2$ (2 mL), triethylamine (51 mg, 0.3 mmol) and 4-dimethylaminopyridine (DMAP, 0.1 mg, 0.001 mmol, 1 mol %) were added thereto and, then, 3,5-dinitrobenzoyl chloride (28 mg, 0.12 mmol) was slowly added again at 0° C. The reaction mixture was stirred at 23° C. for 12 hours. Water (3 mL) was added to the reaction mixture and was subjected to extraction with CH$_2$Cl$_2$ (3 mL×3). The collected organic layers were dried with anhydrous Na$_2$SO$_4$, were subjected to vacuum evaporation, and were isolated and purified (to hexane/ethyl acetate 8/2) via silica gel chromatography to obtain a single stereoisomer compound 58' (56 mg, 94%). The resultant was re-crystallized with ethyl acetate and hexane to obtain a yellow color solid.

Yellow color solid; m.p. 145-147° C.; $^1$H NMR (600 MHz, CDCl$_3$): δ 9.21 (t, J=2.1 Hz, 1H), 9.11 (d, J=2.1 Hz, 2H), 7.67-7.55 (m, 2H), 7.47 (d, J=8.5 Hz, 2H), 7.43-7.33 (m, 3H), 7.18 (d, J=8.1 Hz, 2H), 5.56-5.46 (m, 1H), 4.59 (d, J=1.4 Hz, 1H), 3.60 (dd, J=13.3, 2.4 Hz, 1H), 2.50-2.44 (m, 1H), 1.99 (td, J=13.0, 11.6 Hz, 1H), 1.79-1.71 (m, 1H), 0.70 (d, J=6.9 Hz, 3H), 0.45 (s, 3H), 0.44 (s, 3H); $^{13}$C NMR (150 MHz, CDCl$_3$): δ 161.7, 148.6, 139.7, 135.8, 134.1, 134.06, 131.2, 129.5, 129.3, 127.9, 127.0, 122.4, 120.6, 81.6, 77.6, 70.0, 37.9, 26.7, 6.0, −5.4, −5.6; $^{29}$Si NMR (120 MHz, CDCl$_3$): δ −4.2; IR (cm$^1$): 3099, 1728, 1628, 1546, 1487, 1343, 1277, 1168, 1047, 906, 783; HRMS (ESI): Calculated for C27H27BrN2NaO7Si [M+Na]+: 621.0669, Found: 621.0684.

The method of preparing a silane derivative via a reaction between a furan derivative and a silane compound in the presence of a borane catalyst according to the present invention may not use transition metal as a catalyst and, thus, may synthesize a silane derivative with a high yield via high stereoselectivity even under an eco-friendly and mild condition, in detail, using low temperature and short reaction time.

Accordingly, the method of preparing a silane derivative according to the present invention may be easily and commercially applied to be mass-produced.

In addition, the silane derivative prepared using the method of preparing a silane derivative according to the present invention may be used as an intermediate of various compounds as described in Inventive Examples 6 to 9 according to the present invention and, thus, may be used as an intermediate or raw material in various ways such as synthesis of medicines and natural products.

II. Preparation of Anti-Cyclopropyl Silane Compound from Furan Compound

Inventive Example 10

Preparation of anti-(2-Ethylcyclopropyl)dimethylphenylsilane (Anti-33)

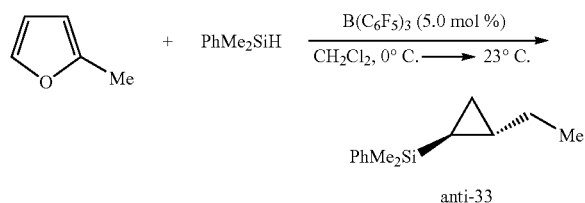

B(C$_6$F$_5$)$_3$ (0.025 mmol, 5.0 mol %) was dissolved in CH$_2$Cl$_2$ (0.2 mL), dimethylphenylsilane (2.0 mmol) was added thereto and, then, the resultant was stirred. 2-methylfuran (0.50 mmol) was added at 0° C. and the reaction mixture was stirred at 23° C. for 6 hours. Et$_3$N (5 eq based on B(C$_6$F$_5$)$_3$) was added to complete a reaction and, then, was subjected to vacuum evaporation. The evaporated crude product was purified via silica gel flash column chromatography (eluant: hexane or mixture of hexane and ethyl acetate) to obtain anti-(2-Ethylcyclopropyl)dimethylphenylsilane (anti-33) (yield of 83%, dr.>99/1).

Colorless liquid; $^1$H NMR (600 MHz, CDCl$_3$): δ 7.82-7.76 (m, 2H), 7.56-7.52 (m, 3H), 1.69-1.59 (m, 1H), 1.48-1.38 (m, 1H), 1.19 (t, J=7.3 Hz, 3H), 0.92-0.83 (m, 1H), 0.69-0.59 (m, 2H), 0.43 (s, 3H), 0.41 (s, 3H), −0.17-−0.30 (m, 1H); $^{13}$C NMR (150 MHz, CDCl$_3$): δ 139.6, 133.9, 128.9, 127.8, 29.1, 17.8, 14.13, 9.1, 3.4, −3.4, −3.7; $^{29}$Si NMR (120 MHz, CDCl$_3$): δ −2.9; HRMS (EI): Calculated for C$_{13}$H$_{20}$Si [M]$^+$: 204.1334, Found: 204.1333.

Inventive Example 11 Preparation of anti-(2-Ethylcyclopropyl)diphenylsilane (Anti-36)

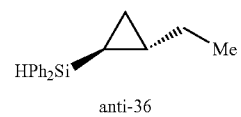

Anti-(2-Ethylcyclopropyl)diphenylsilane (anti-36) (yield of 81%, dr.>99/1) was obtained via a reaction between 2-methylfuran (164 mg, 2.0 mmol) and diphenylsilane (1.11 g, 6.0 mmol) for 4 hours using B(C$_6$F$_5$)$_3$ (51 mg, 5.0 mol %) dissolved in CH$_2$Cl$_2$ (1.0 mL) in the same method as Inventive Example 10.

colorless liquid; $^1$H NMR (600 MHz, CDCl$_3$): δ 7.69 (d, J=6.9 Hz, 4H), 7.51-7.39 (m, 6H), 4.79 (d, J=3.8 Hz, 1H), 1.50-1.27 (m, 2H), 1.07 (t, J=7.3 Hz, 3H), 0.91-0.80 (m, 1H), 0.71-0.49 (m, 2H), −0.03-−0.18 (m, 1H); $^{13}$C NMR (150 MHz, CDCl$_3$): δ 135.5, 134.6, 129.7, 127.9, 28.8, 18.6, 13.9, 9.7, 0.12; $^{29}$Si NMR (120 MHz, CDCl$_3$): δ −10.7; HRMS (EI): Calculated for C$_{17}$H$_{20}$Si [M]$^+$: 252.1334, Found 252.1336.

Inventive Example 12 Preparation of Anti-(2-Propylcyclopropyl)dimethylphenylsilane (Anti-37)

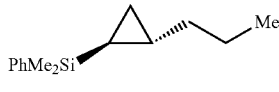

Anti-(2-Propylcyclopropyl)dimethylphenylsilane (anti-37) (yield of 77%, dr.>99/1) was obtained via a reaction for 5 hours using the same method as Inventive Example 10 above except that 2-ethylfuran was used instead of 2-methylfuran.

colorless liquid; $^1$H NMR (600 MHz, CDCl$_3$): δ 7.72-7.62 (m, 2H), 7.49-7.40 (m, 3H), 1.57-1.41 (m, 3H), 1.35-1.20 (m, 1H), 1.07-0.94 (m, 3H), 0.84-0.73 (m, 1H), 0.58-0.43 (m, 2H), 0.30 (s, 3H), 0.28 (s, 3H), −0.30-−0.41 (m, 1H); $^{13}$C NMR (150 MHz, CDCl$_3$): δ 139.7, 133.9, 128.9, 127.8, 38.3, 23.1, 15.7, 14.2, 9.2, 3.4, −3.4, −3.7; $^{29}$Si NMR (120 MHz, CDCl$_3$): δ −2.9; HRMS (EI): Calculated for C$_{14}$H$_{22}$Si [M]$^+$: 218.1491, Found 218.1495.

Inventive Example 13 Preparation of anti-(2-Butylcyclopropyl)dimethylphenylsilane (Anti-38)

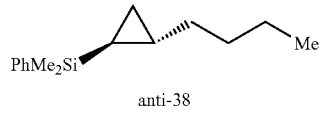

Anti-(2-Butylcyclopropyl)dimethylphenylsilane (anti-38) (yield of 66%, dr.>99/1) was obtained via a reaction for 5 hours using the same method as Inventive Example 10 except that 2-propylfuran was used instead of 2-methylfuran.

colorless liquid; $^1$H NMR (600 MHz, CDCl$_3$): δ 7.67-7.56 (m, 2H), 7.48-7.29 (m, 3H), 1.47-1.31 (m, 5H), 1.28-1.17 (m, 1H), 0.97-0.90 (m, 3H), 0.79-0.59 (m, 1H), 0.52-0.38 (m, 2H), 0.25 (s, 3H), 0.22 (s, 3H), −0.33-0.49 (m, 1H); $^{13}$C NMR (150 MHz, CDCl$_3$): δ 139.7, 133.9, 128.9, 127.8, 35.8, 32.3, 22.7, 15.9, 14.3, 9.3, 3.5, −3.5, −3.7; $^{29}$Si NMR (120 MHz, CDCl$_3$): δ −2.9; HRMS (EI): Calculated for C$_{15}$H$_{24}$Si [M]+: 232.1647, Found: 232.1646.

Inventive Example 14 Preparation of anti-(2-Hexcyclopropyl)dimethylphenylsilane (Anti-39)

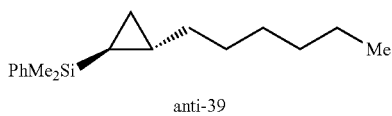

anti-39

Anti-(2-Hexcyclopropyl)dimethylphenylsilane (anti-39) (yield of 83%, dr.>99/1) was obtained via a reaction using the same method as Inventive Example 10 above except that 2-pentylfuran was used instead of 2-methylfuran.

colorless liquid; $^1$H NMR (600 MHz, CDCl$_3$): δ 7.73-7.53 (m, 2H), 7.36-7.01 (m, 3H), 1.42-1.04 (m, 10H), 0.91-0.77 (m, 3H), 0.70-0.58 (m, 1H), 0.49-0.29 (m, 2H), 0.16 (s, 3H), 0.14 (s, 3H), −0.45--0.55 (m, 1H); $^{13}$C NMR (150 MHz, CDCl$_3$): δ 139.3, 133.5, 128.5, 127.4, 76.8, 35.7, 31.8, 29.6, 29.0, 22.5, 15.6, 13.9, 8.9, 3.1, −3.8, −4.1; $^{29}$Si NMR (120 MHz, CDCl$_3$): δ −2.9; HRMS (EI): Calculated for C$_{17}$H$_{23}$Si [M]$^+$: 260.1960, Found: 260.1962.

Inventive Example 15 Preparation of anti-2-{2-[(1,1'-Biphenyl-4-yl)ethyl]cyclopropyl}dimethylphenylsilane (Anti-40)

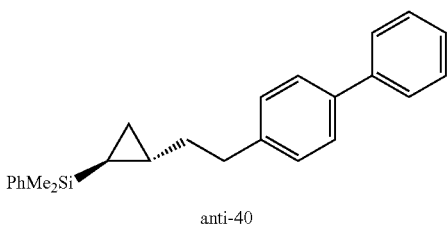

anti-40

B(C$_6$F$_5$)$_3$ (0.025 mmol, 5.0 mol %) was dissolved in CH$_2$Cl$_2$ (0.2 mL), dimethylphenylsilane (2.0 mmol) was added thereto, and the resultant was stirred. 2-[(1,1'-biphenyl)-4-ylmethyl]furan (1ac, 0.50 mmol) was added at 0° C. and the reaction mixture was stirred at 23° C. for 6 hours. Et$_3$N (5 eq based on B(C$_6$F$_5$)$_3$) was added thereto to complete a reaction.

Then, the resultant was subjected to vacuum evaporation, was diluted with THF (0.5 ml) and, then, was cooled to 0° C., and tetrabutylammonium fluoride (TBAF) (1 M in THF, 3.0 mL) was slowly applied thereto and, then, was stirred at 55° C. After 12 hours elapsed, the resultant was cooled to 23° C., water (5 mL) was added thereto to complete a reaction and, then, the resultant was subjected to extraction with ethyl acetate (5 mL×3). The obtained organic layer was subjected to vacuum evaporation. The evaporated crude product was purified via silica gel flash column chromatography (eluant: hexane or mixture of hexane and ethyl acetate) to obtain anti-2-{2-[(1,1'-Biphenyl-4-yl)ethyl]cyclopropyl}dimethylphenylsilane (anti-40) (yield of 74%, dr.>99/1).

colorless liquid; $^1$H NMR (600 MHz, CDCl$_3$): δ 7.71 (t, J=7.0 Hz, 4H), 7.63 (d, J=8.0 Hz, 2H), 7.54 (t, J=7.6 Hz, 2H), 7.50-7.46 (m, 3H), 7.44 (t, J=6.9 Hz, 1H), 7.35 (d, J=7.9 Hz, 2H), 2.92-2.81 (m, 2H), 1.93-1.84 (m, 1H), 1.73-1.62 (m, 1H), 0.94-0.82 (m, 1H), 0.67-0.52 (m, 2H), 0.35 (s, 3H), 0.33 (s, 3H), −0.19--0.28 (m, 1H); $^{13}$C NMR (150 MHz, CDCl$_3$): δ 141.8, 141.3, 139.4, 138.7, 133.9, 128.9, 128.9, 128.8, 127.8, 127.1, 38.0, 35.9, 15.9, 9.3, 3.9, −3.5, −3.6; $^{29}$Si NMR (120 MHz, CDCl$_3$): δ −2.9; HRMS (ESI): Calculated for C$_{25}$H$_{28}$NaSi [M+Na]$^+$: 379.1858, Found: 379.1852.

Inventive Example 16 Preparation of anti-{2-[4-(Trifluoromethyl)benzyl]cyclopropyl}dimethylphenylsilane (Anti-41)

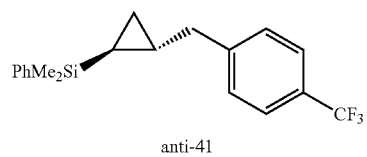

anti-41

Anti-{2-[4-(Trifluoromethyl)benzyl]cyclopropyl}dimethylphenylsilane (anti-41) (yield of 80%, dr.>99/1) was obtained via a reaction using the same method as Inventive Example 15 except that 2-[4-(trifluoromethyl)phenyl]-furan (1e) was used instead of 2-[(1,1'-biphenyl)-4-ylmethyl]furan (1ac).

colorless liquid; $^1$H NMR (600 MHz, CDCl$_3$): δ 7.54 (d, J=7.8 Hz, 2H), 7.48 (d, J=6.9 Hz, 2H), 7.39 (d, J=9.9 Hz, 1H), 7.34 (t, J=7.1 Hz, 4H), 2.82 (dd, J=14.7, 6.3 Hz, 1H), 2.59 (dd, J=14.6, 7.1 Hz, 1H), 1.04-0.94 (m, 1H), 0.68-0.56 (m, 2H), 0.22 (s, 3H), 0.17 (s, 3H), −0.13--0.31 (m, 1H); $^{13}$C NMR (150 MHz, CDCl$_3$): δ 146.2, 139.0, 133.8, 129.1, 128.8, 127.8, 126.2, 125.3 (q, J=3.7 Hz), 124. (q, J=273 Hz), 41.5, 16.8, 9.3, 3.9, −3.6, −3.9; $^{29}$Si NMR (120 MHz, CDCl$_3$): δ −2.9; $^{19}$F NMR (CDCl$_3$, 375 MHz): −62.3; HRMS (EI): Calculated for (C$_{19}$H$_{21}$F$_3$Si [M]$^+$: 334.1365, Found: 334.1367.

Inventive Example 17 Preparation of anti-[(4-Fluorobenzyl)cyclopropyl]dimethylphenylsilane (Anti-42)

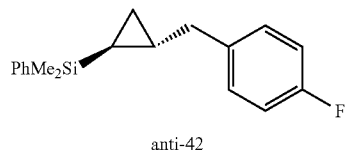

anti-42

Anti-[(4-Fluorobenzyl)cyclopropyl]dimethylphenylsilane (anti-42) (yield of 64%, dr.>99/1) was obtained using the same method as Inventive Example 15 except that 2-(4-fluorophenyl) furan (1f) was used instead of 2-[(1,1'-biphenyl)-4-ylmethyl]furan (1ac).

Colorless liquid; $^1$H NMR (600 MHz, CDCl$_3$): δ 7.44 (d, J=6.0 Hz, 2H), 7.39-7.30 (m, 3H), 7.22-7.13 (m, 2H), 7.02-6.92 (m, 2H), 2.70 (dd, J=14.3, 6.7 Hz, 1H), 2.50 (dd, J=14.4, 7.0 Hz, 1H), 0.98-0.91 (m, 1H), 0.64-0.52 (m, 2H), 0.17 (s, 3H), 0.14 (s, 3H), −0.12--−0.32 (m, 1H); $^{13}$C NMR (150 MHz, CDCl$_3$): δ 161.5 (d, J=243.2 Hz), 139.18, 137.79-137.62 (d J=3.0 Hz), 133.86, 129.01, 129.82 (d, J=7.8 Hz), 127.81, 115.05 (d, J=21.0 Hz), 40.87, 17.15, 9.26, 3.73, −3.64, −3.76; $^{29}$Si NMR (120 MHz, CDCl$_3$): δ −2.9; $^{19}$F NMR (CDCl$_3$, 375 MHz): δ −117.9; HRMS (EI): Calculated for C$_{13}$H$_{21}$FSi [M]$^+$: 284.1397, Found: 284.1399.

Inventive Example 18 Preparation of anti-2-[(4-Chlorobenzyl)cyclopropyl]dimethylphenylsilane (Anti-43)

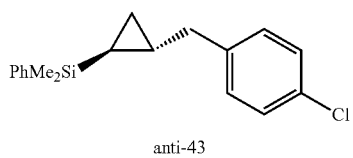

anti-43

Anti-2-[(4-Chlorobenzyl)cyclopropyl]dimethylphenylsilane (anti-43) (yield of 80%, dr.>99/1) was obtained via a reaction using the same method as Inventive Example 15 except that 2-(4-chlorophenyl)furan (1g) was used instead of 2-[(1,1'-biphenyl)-4-ylmethyl]furan (1ac).

Colorless liquid; $^1$H NMR (600 MHz, CDCl$_3$): δ 7.48 (d, J=7.5 Hz, 2H), 7.41-7.30 (m, 3H), 7.24 (d, J=7.5 Hz, 2H), 7.15 (d, J=7.9 Hz, 2H), 2.72 (dd, J=14.5, 6.3 Hz, 1H), 2.51 (dd, J=14.5, 7.0 Hz, 1H), 1.00-0.91 (m, 1H), 0.66-0.53 (m, 2H), 0.20 (s, 3H), 0.16 (s, 3H), −0.17--−0.29 (m, 1H); $^{13}$C NMR (150 MHz, CDCl$_3$): δ 140.5, 139.1, 133.8, 131.7, 129.9, 129.0, 128.4, 127.8, 41.0, 16.9, 9.3, 3.8, −3.6, −3.8; $^{29}$Si NMR (120 MHz, CDCl$_3$): δ −2.9; HRMS (EI): Calculated for C$_{18}$H$_{21}$ClSi [M]$^+$: 300.1101, Found: 300.1097.

Inventive Example 19 Preparation of anti-2-[(4-Bromobenzyl)cyclopropyl]dimethylphenylsilane (Anti-44)

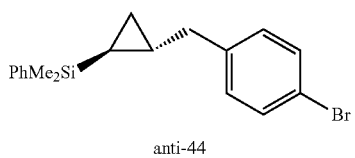

anti-44

Anti-2-[(4-Bromobenzyl)cyclopropyl]dimethylphenylsilane (anti-44) (yield of 71%, dr.>99/1) was obtained via a reaction using the same method as Inventive Example 15 except that 2-(4-bromophenyl)-furan (1h) was used instead of 2-[(1,1'-biphenyl)-4-ylmethyl]furan (1ac).

Colorless liquid; $^1$H NMR (600 MHz, CDCl$_3$): δ 7.49 (d, J=6.4 Hz, 2H), 7.43-7.38 (m, 3H), 7.35 (t, J=7.0 Hz, 2H), 7.11 (d, J=8.3 Hz, 2H), 2.71 (dd, J=14.6, 6.4 Hz, 1H), 2.50 (dd, J=14.6, 7.0 Hz, 1H), 1.07-0.89 (m, 1H), 0.68-0.54 (m, 2H), 0.21 (s, 3H), 0.17 (s, 3H), −0.15--−0.31 (m, 1H); $^{13}$C NMR (150 MHz, CDCl$_3$): δ 141.0, 139.1, 133.8, 131.4, 130.3, 129.0, 127.8, 119.8, 41.1, 16.9, 9.3, 3.8, −3.6, −3.8; $^{29}$Si NMR (120 MHz, CDCl$_3$): δ −2.9; HRMS (EI): Calculated for C$_{18}$H$_{21}$BrSi [M]$^+$: 344.0596, Found: 344.0592.

Inventive Example 20 Preparation of anti-2-{[(1,1'-Biphenyl)-4-ylmethyl]cyclopropyl}dimethylphenylsilane (Anti-45)

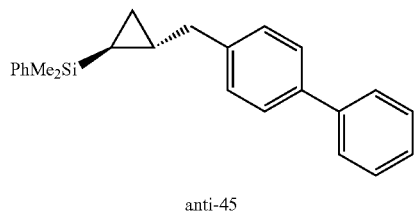

anti-45

Anti-2-{[(1,1'-Biphenyl)-4-ylmethyl]cyclopropyl}dimethylphenylsilane (anti-45) (yield of 85%, dr.>99/1) was obtained using the same method as Inventive Example 10 except that 2-(1,1'-biphenyl-4-yl)furan (1i) was added instead of 2-methylfuran at −78° C. and was subjected to a reaction at 40° C. for 10 hours.

Colorless liquid; $^1$H NMR (600 MHz, CDCl$_3$): δ 7.65 (d, J=7.6 Hz, 2H), 7.58-7.51 (m, 4H), 7.49 (t, J=7.8 Hz, 2H), 7.43-7.28 (m, 6H), 2.85-2.73 (m, 1H), 2.70-2.58 (m, 1H), 1.07 (q, J=5.8 Hz, 1H), 0.71-0.58 (m, 2H), 0.24 (s, 3H), 0.21 (s, 3H), −0.11--−0.29 (m, 1H)); $^{13}$C NMR (150 MHz, CDCl$_3$): δ 141.2, 141.1, 139.1, 138.8, 133.8, 128.8, 128.7, 127.7, 127.04, 127.02, 41.2, 16.9, 9.2, 3.6, −3.6, −3.7; $^{29}$Si NMR (120 MHz, CDCl$_3$): δ −2.8; HRMS (EI): Calculated for C$_{24}$H$_{26}$Si [M]$^+$: 342.1804, Found: 342.1801.

Inventive Example 21 Preparation of anti-2-{[(4-Methylthio)benzyl]cyclopropyl}dimethylphenylsilane (Anti-46)

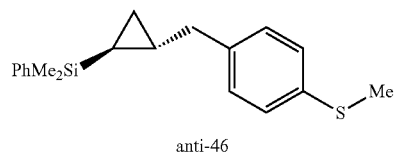

anti-46

Anti-2-{[(4-Methylthio)benzyl]cyclopropyl}dimethylphenylsilane (anti-46) (yield of 90%, dr.>99/1) was obtained via a reaction using the same method as Inventive Example 10 except that 2-[4-(methylthio)phenyl]furan (1 m) was used instead of 2-methylfuran.

Colorless liquid; $^1$H NMR (600 MHz, CDCl$_3$): δ 7.53 (d, J=7.0 Hz, 2H), 7.41-7.36 (m, 3H), 7.25 (d, J=8.0 Hz, 2H), 7.20 (d, J=8.1 Hz, 2H), 2.74 (dd, J=14.5, 6.4 Hz, 1H), 2.58 (dd, J=14.5, 6.9 Hz, 1H), 2.53 (s, 3H), 1.07-0.99 (m, 1H), 0.66-0.58 (m, 2H), 0.24 (s, 3H), 0.21 (s, 3H), −0.14--−0.24 (m, 1H); $^{13}$C NMR (150 MHz, CDCl$_3$): δ 139.3, 135.5, 133.9, 129.1, 127.3, 127.3, 41.1, 17.0, 16.54, 9.2, 3.7, −3.6, −3.7; $^{29}$Si NMR (120 MHz, CDCl$_3$): δ −2.9; HRMS (EI): Calculated for C$_{19}$H$_{24}$SSi [M]$^+$: 312.1368, Found: 312.1366.

Inventive Example 22 Preparation of anti-[2-(3-Methylbenzyl)cyclopropyl]dimethylphenylsilane (Anti-47)

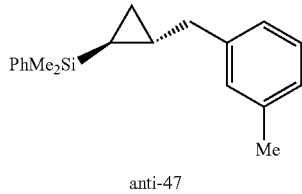

anti-47

Anti-[2-(3-Methylbenzyl)cyclopropyl]dimethylphenylsilane (anti-47) (yield of 83%, dr.>99/1) was obtained using the same method as Inventive Example 15 except that 2-(m-tolyl)furan (1k) was added instead of 2-[(1,1'-biphenyl)-4-ylmethyl]furan (1ac) at −78° C.

Colorless liquid; $^1$H NMR (600 MHz, CDCl$_3$): δ 7.50 (d, J=7.8 Hz, 2H), 7.39-7.30 (m, 3H), 7.18 (t, J=7.5 Hz, 1H), 7.06 (s, 1H), 7.05-7.01 (m, 2H), 2.69-2.63 (m, 1H), 2.61-2.49 (m, 1H), 2.34 (s, 3H), 1.05-0.89 (m, 1H), 0.61-0.52 (m, 2H), 0.18 (s, 3H), 0.16 (s, 3H), −0.16-−0.30 (m1H); $^{13}$C NMR (150 MHz, CDCl$_3$): δ 141.9, 139.2, 137.7, 133.7, 129.1, 128.8, 128.1, 127.6, 126.6, 125.4, 41.5, 21.4, 16.8, 9.1, 3.5, −3.7, −3.8; $^{29}$Si NMR (120 MHz, CDCl$_3$): δ −2.9; HRMS (EI): Calculated for C$_{19}$H$_{24}$Si [M]$^+$: 280.1647, Found: 280.1648.

Inventive Example 23 Preparation of anti-[2-(3,5-Dibromobenzyl)cyclopropyl]dimethylphenylsilane (Anti-48)

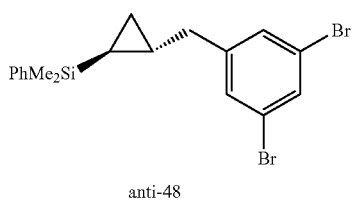

anti-48

Anti-[2-(3,5-Dibromobenzyl)cyclopropyl]dimethylphenylsilane (anti-48) (yield of 81%, dr.>99/1) was obtained using the same method as Inventive Example 10 except that 2-(3,5-dibromophenyl)furan (1o) was added instead of 2-methylfuran at −78° C. and was subjected to a reaction at 40° C. for 22 hours.

Colorless liquid; $^1$H NMR (600 MHz, CDCl$_3$): δ 7.58-7.47 (m, 3H), 7.43-7.36 (m, 3H), 7.34 (s, 2H), 2.72-2.64 (m, 1H), 2.52-2.43 (m, 1H), 1.00-0.87 (m, 1H), 0.64-0.54 (m, 2H), 0.22 (s, 3H), 0.21 (s, 3H), −0.18-−0.27 (m, 1H); $^{13}$C NMR (150 MHz, CDCl$_3$): δ 146.0, 138.6, 133.7, 131.6, 130.1, 129.0, 127.7, 122.7, 40.9, 16.4, 9.3, 3.9, −3.6, −3.8; $^{29}$Si NMR (120 MHz, CDCl$_3$): δ −2.9.

Inventive Example 24 Preparation of anti-[2-(2,4,6-Triisopropylbenzyl)cyclopropyl]dimethylphenylsilane (Anti-49)

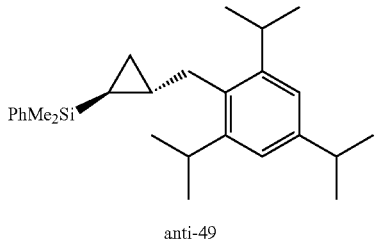

anti-49

Anti-[2-(2,4,6-Triisopropylbenzyl)cyclopropyl]dimethylphenylsilane (anti-49) (yield of 77%, dr.>99/1) was obtained via a reaction using the same method as Inventive Example 15 except that 2-(2,4,6-triisopropylphenyl)furan (1p) was used instead of 2-[(1,1'-biphenyl)-4-ylmethyl]furan (1ac).

colorless liquid; $^1$H NMR (600 MHz, CDCl$_3$): δ 7.57 (d, J=7.3 Hz, 2H), 7.45-7.33 (m, 3H), 7.06 (s, 2H), 3.35-3.26 (m, 2H), 3.02 (dd, J=14.5, 4.2 Hz, 1H), 2.99-2.91 (m, 1H), 2.77 (dd, J=14.5, 6.3 Hz, 1H), 1.35 (s, 3H), 1.34 (s, 3H), 1.30 (s, 6H), 1.29 (s, 6H), 0.96-0.87 (m, 1H), 0.67-0.60 (m, 1H), 0.57-0.51 (m, 1H), 0.27 (s, 3H), 0.23 (s, 3H), −0.17-−0.29 (m, 1H); $^{13}$C NMR (150 MHz, CDCl$_3$): δ 147.0, 146.4, 139.3, 133.9, 131.9, 128.9, 127.8, 120.9, 34.3, 30.9, 29.5, 24.7, 24.4, 24.3, 16.8, 9.4, 2.6, −3.7; $^{29}$Si NMR (120 MHz, CDCl$_3$): δ −2.7; HRMS (EI): Calculated for C$_{27}$H$_{40}$Si [M]$^+$: 392.2899, Found: 392.2898.

Inventive Example 25 Preparation of anti-[2-(Phenanthren-9-ylmethyl)cyclopropyl]dimethylphenylsilane (anti-50)

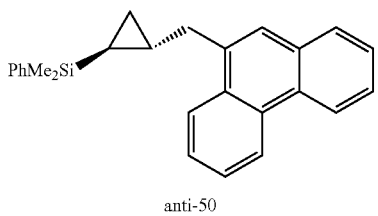

anti-50

Anti-[2-(Phenanthren-9-ylmethyl)cyclopropyl]dimethylphenylsilane (anti-50) (yield of 81%, dr.>99/1) was obtained via a reaction for 10 hours using the same method as Inventive Example 10 except that 2-(phenanthren-9-yl)furan (1q) was used instead of 2-methylfuran.

Colorless liquid; $^1$H NMR (600 MHz, CDCl$_3$): δ 8.78 (d, J=7.9 Hz, 1H), 8.71 (d, J=8.0 Hz, 1H), 8.16 (d, J=7.9 Hz, 1H), 7.82 (d, J=7.6 Hz, 1H), 7.75-7.57 (m, 5H), 7.51 (d, J=7.0 Hz, 2H), 7.35 (t, J=7.1 Hz, 1H), 7.28 (t, J=7.4 Hz, 2H), 3.32 (dd, J=15.3, 5.9 Hz, 1H), 3.08 (dd, J=15.3, 6.7 Hz, 1H), 1.41-1.25 (m, 1H), 0.79-0.67 (m, 2H), 0.25 (s, 3H), 0.21 (s, 3H), −0.08-−0.11 (m, 1H); $^{13}$C NMR (150 MHz, CDCl$_3$): δ 139.2, 136.0, 133.9, 132.1, 131.6, 130.7, 129.8, 128.9, 128.3, 127.8, 126.7, 126.6, 126.2, 126.1, 125.9, 124.5, 123.3, 122.5, 38.7, 15.5, 9.7, 4.2, −3.5, −3.7; $^{29}$Si NMR (120 MHz, CDCl$_3$): δ −2.8; HRMS (EI): Calculated for C$_{26}$H$_{26}$Si [M]$^+$: 366.1804, Found: 366.1803.

Inventive Example 26 Preparation of anti-{[(5-Bromo-1,3-phenylene)bis(methylene)]bis(cyclopropane-2,1-diyl)bis(dimethylphenylsilane)} (Anti-51)

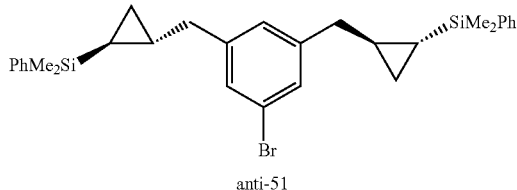

anti-51

Anti-{[(5-Bromo-1,3-phenylene)bis(methylene)]bis(cyclopropane-2,1-diyl)bis(dimethylphenylsilane)} (anti-51) (yield of 75%, dr.>99/1) was obtained via a reaction at 23° C. for 12 hours using the same method as Inventive Example 10 by adding 2,2'-(5-bromo-1,3-phenylene)difuran (1s) instead of 2-methylfuran at −78° C. using 10.0 mol % $B(C_6F_5)_3$ and dimethylphenylsilane (8.0 eq.).

Colorless liquid; $^1H$ NMR (600 MHz, $CDCl_3$): δ 7.48 (d, J=6.2 Hz, 4H), 7.39-7.29 (m, 6H), 7.24 (s, 2H), 6.97 (s, 1H), 2.61 (dd, J=14.7, 6.5 Hz, 2H), 2.48 (dd, J=14.7, 6.8 Hz, 2H), 0.92 (q, J=6.7 Hz, 2H), 0.59-0.51 (m, 4H), 0.17 (s, 12H), −0.26 (q, J=7.8 Hz, 2H); $^{13}C$ NMR (150 MHz, $CDCl_3$): δ 144.1, 138.9, 133.7, 128.86, 128.84, 127.6, 127.2, 122.1, 41.1, 16.6, 16.6, 9.16, 9.15, 3.7, −3.6, −3.8; $^{29}Si$ NMR (120 MHz, $CDCl_3$): δ −2.9; HRMS (EI): Calculated for $C_{30}H_{37}BrSi_2$ $[M]^+$: 532.1617, Found: 532.1616.

Inventive Example 27 Preparation of anti-1,3,5-Tris{[2-(dimethylphenylsilyl)cyclopropyl]methyl}benzene (Anti-52)

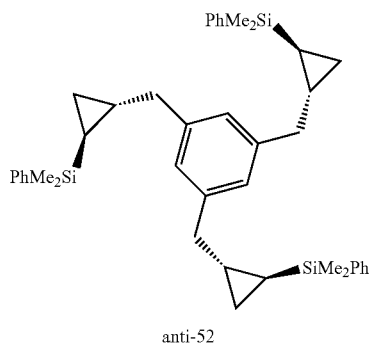

anti-52

Anti-1,3,5-Tris{[2-(dimethylphenylsilyl)cyclopropyl]methyl}benzene (anti-52) (yield of 86%, dr.>99/1) was obtained via a reaction at 23° C. for 8 hours using the same method as Inventive Example 10 by adding 1,3,5-tri(furan-2-yl)benzene (1t) instead of 2-methylfuran at −78° C. using 20.0 mol % $B(C_6F_5)_3$ and dimethylphenylsilane (12.0 eq.).

Colorless liquid; $^1H$ NMR (400 MHz, $CDCl_3$): δ 7.69-7.61 (m, 6H), 7.50-7.42 (m, 9H), 7.11 (s, 3H), 2.82-2.61 (m, 6H), 1.21-1.00 (m, 3H), 0.82-0.56 (m, 6H), 0.32 (s, 9H), 0.31 (s, 9H), 0.00-−0.23 (m, 3H); $^{13}C$ NMR (150 MHz, $CDCl_3$): δ 141.8, 139.3, 133.8, 128.9, 127.7, 126.2, 41.6, 17.0 (t, J=4.5 Hz, 3C), 9.2 (t, J=3.0 Hz, 3C), 3.6, −3.4, −3.6; $^{29}Si$ NMR (120 MHz, $CDCl_3$): δ −2.8; HRMS (PSI): Calculated for $C_{42}H_{54}NaSi_3$ $[M+Na]^+$: 665.3431, Found: 665.3432.

Inventive Example 28 Preparation of ((1S,2S)-2-(2-([1,1'-biphenyl]-4-yl)ethyl)cyclopropyl)dimethyl(phenyl)silane (Anti-40)

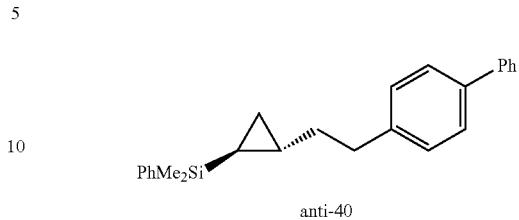

anti-40

((1S,2S)-2-(2-([1,1'-biphenyl]-4-yl)ethyl)cyclopropyl)dimethyl(phenyl)silane (anti-40) (yield of 71%, dr.>99/1) was obtained via a reaction for 10 hours using the same method as Inventive Example 10 except that 2-([1,1'-biphenyl]-4-ylmethyl)furan (1ac) was used instead of 2-methylfuran.

$^1H$ NMR (600 MHz, $CDCl_3$): δ 7.71 (t, J=7.0 Hz, 4H), 7.63 (d, J=8.0 Hz, 2H), 7.54 (t, J=7.6 Hz, 2H), 7.50-7.46 (m, 3H), 7.44 (t, J=6.9 Hz, 1H), 7.35 (d, J=7.9 Hz, 2H), 2.92-2.81 (m, 2H), 1.93-1.84 (m, 1H), 1.73-1.62 (m, 1H), 0.94-0.82 (m, 1H), 0.67-0.52 (m, 2H), 0.35 (s, 3H), 0.33 (s, 3H), −0.19-−0.28 (m, 1H); $^{13}C$ NMR (150 MHz, $CDCl_3$): δ 141.8, 141.3, 139.4, 138.7, 133.9, 128.9, 128.9, 128.8, 127.8, 127.1, 38.0, 35.9, 15.9, 9.3, 3.9, −3.5, −3.6; $^{29}Si$ NMR (120 MHz, $CDCl_3$): δ −2.9; HRMS (ESI): Calculated for $C_{25}H_{23}NaSi$ $[M+Na]^+$: 379.1858, Found: 379.1852.

III. Preparation of Anti-Cyclopropyl Silane Derivative from α-silyloxy-(Z)-alkenyl Silane Compound

Inventive Example 29 Preparation of anti-(2-Ethylcyclopropyl)dimethylphenylsilane (Anti-33)

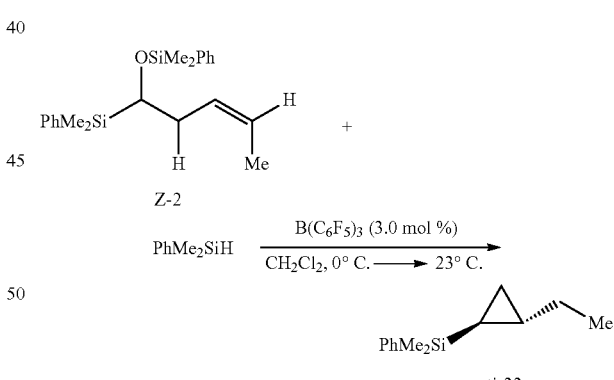

anti-33

$B(C_6F_5)_3$ (154 mg, 3.0 mol %) was dissolved in $CH_2Cl_2$ (0.2 mL), Z-2 (3.54 g, 10 mmol) and dimethylphenylsilane (2.0 g, 15 mmol) were sequentially added thereto at 0° C. and, then, the reaction mixture was stirred under argon gas at 23° C. for 12 hours. A conversion yield of 83% was verified via $^1H$ NMR analysis. After the reaction mixture was completely stirred, the reaction mixture was subjected to vacuum evaporation and was purified via silica gel flash column chromatography (eluant: hexane or mixture of hexane and ethyl acetate) to obtain anti-(2-Ethylcyclopropyl)dimethylphenylsilane (anti-33) as a colorless liquid (1.57 g, yield of 77%, dr.>99/1).

Inventive Example 30 Preparation of anti-(2-Ethylcyclopropyl)dimethylphenylsilane-d (Anti-35-d)

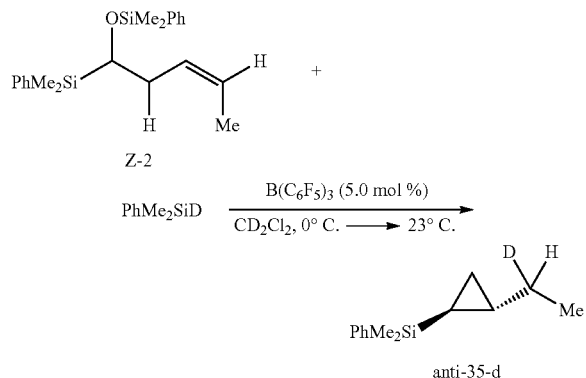

Anti-(2-Ethylcyclopropyl)dimethylphenylsilane-d (anti-35-d) (yield of 66%, dr.>99/1) was obtained via a reaction for 14 hours using the same method as Inventive Example 29 except that $CD_2Cl_2$ was used instead of $CH_2Cl_2$, $PhMe_2SiD$ was used instead of dimethylphenylsilane, and $B(C_6F_5)_3$ was used in 5.0 mol %.

Colorless liquid; $^1H$ NMR (600 MHz, $CD_2Cl_2$): δ 7.66-7.59 (m, 2H), 7.43-7.35 (m, 3H), 1.45-1.40 (m, 0.6H), 1.30-1.21 (m, 0.4H), 1.02 (d, J=7.5 Hz, 3H), 0.75-0.67 (m, 1H), 0.51-0.42 (m, 2H), 0.26 (s, 3H), 0.24 (s, 3H), −0.33-−0.46 (m, 1H); $^{13}C$ NMR (150 MHz, $CD_2Cl_2$): δ 140.1, 134.3, 129.2, 128.1, 29.0 (t=19.6 Hz), 18.1, 14.1, 9.2, 3.6, −3.4, −3.7; $^{29}Si$ NMR (120 MHz, $CD_2Cl_2$): δ −3.1; $^2H$ NMR (60 MHz, $CD_2Cl_2$): δ 1.58-1.36 (s, 0.4D), 1.36-1.12 (s, 0.6D); HRMS (ESI): Calculated for $C_{13}H_{20}DSi$ $[M+H]^+$: 206.1475, Found: 206.1428.

Inventive Example 31 Preparation of 2-{2-[(1,1'-Biphenyl)-4-yl]ethyl}cyclopropyl methanesulfonate (Anti-63)

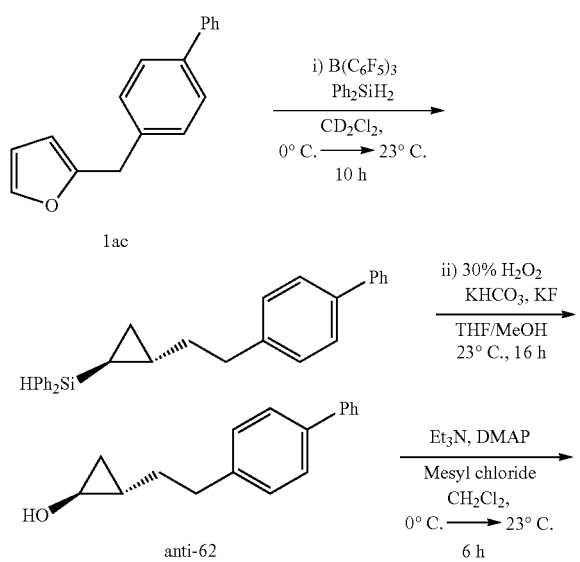

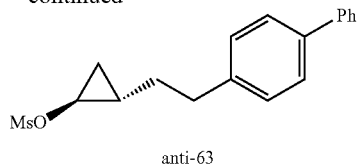

anti-63

Preparation of anti-2-{2-[(1,1'-Biphenyl)-4-yl]ethyl}cyclopropanol (Anti-62)

$B(C_6F_5)_3$ (52 mg, 5.0 mol %) was dissolved in $CH_2Cl_2$ (1.0 mL), $Ph_2SiH_2$ (2.21 g, 12.0 mmol) was added thereto and, then, the resultant was stirred. 2-[(1,1'-biphenyl)-4-ylmethyl]furan (1ac, 234 mg, 4.0 mmol) was added thereto at 0° C. and the reaction mixture was stirred at 23° C. for 10 hours. $Et_3N$ (5 eq based on $B(C_6F_5)_3$) was added to complete the reaction and, then, was subjected to vacuum evaporation. The evaporated remaining material was immediately used in Tamao oxidation. The evaporated remaining material was dissolved in THF/MeOH (20/20 mL), KF (2.32 g, 40 mmol), $KHCO_3$ (4.04 g, 40 mmol), and 30% of hydrogen peroxide aqueous solution (130 mmol, 16 mL) were added and, then, the resultant was stirred at 23° C. for 16 hours.

10% of $NaHSO_3$ aqueous solution (20 mL) was added to the reaction mixture at 0° C. to extract a water layer with diethyl ether (20 mL×3). The obtained organic layer was washed with a saturated $Na_2CO_3$ aqueous solution (20 mL×2), was dried with anhydrous $MgSO_4$, was filtered, and was subjected to vacuum evaporation and, then, the remaining material was purified (to hexane/ethyl acetate 1/1) via silica gel column chromatography (hexane/ethyl acetate 1/1) to obtain anti-2-{2-[(1,1'-Biphenyl)-4-yl]ethyl}cyclopropanol (anti-62) (621 g, 65% for two steps, dr.>99/1).

Colorless solid; m.p. 91-92° C.; $^1H$ NMR (600 MHz, $CDCl_3$): δ 7.67-7.59 (m, 2H), 7.58-7.53 (m, 2H), 7.46 (t, J=7.7 Hz, 2H), 7.41-7.34 (m, 1H), 7.29 (d, J=7.9 Hz, 2H), 3.21 (dt, J=6.2, 2.6 Hz, 1H), 2.88-2.67 (m, 2H), 2.15 (s, 1H), 1.67-1.56 (m, 1H), 1.54-1.45 (m, 1H), 1.10-0.94 (m, 1H), 0.83-0.63 (m, 1H), 0.38 (q, J=6.0 Hz, 1H); $^{13}C$ NMR (150 MHz, $CDCl_3$): δ 141.4, 141.2, 138.8, 128.9, 128.81, 127.11 (2C), 127.07, 52.9, 35.0, 33.6, 20.7, 14.5; HRMS (ESI): Calculated for $C_{17}H_{17}ONa$ $[M+Na]^+$: 260.1177, Found 260.1179.

Preparation of 2-{2-[(1,1'-Biphenyl)-4-yl]ethyl}cyclopropyl methanesulfonate (Anti-63)

Triethylamine ($Et_3N$) (152 mg, 1.5 mmol), 4-dimethylaminopyridine (DMAP) (0.6 mg, 1 mol %), anti-62 (119 mg, 0.5 mmol), mesyl chloride (69 mg, 0.6 mmol), and $CH_2Cl_2$ (1.0 mL) were mixed at 0° C. and, then, were stirred at 23° C. for 6 hours. Water (3 mL) was added to complete a reaction and the reaction mixture was subjected to extraction with $CH_2Cl_2$ (3 mL×3). An organic layer was dried with $Na_2SO_4$, was filtered, and was subjected to vacuum evaporation and, then, the remaining material was purified via silica gel column chromatography (hexane/ethyl acetate 7/3) to obtain 2-{2-[(1,1'-Biphenyl)-4-yl]ethyl}cyclopropyl methanesulfonate (anti-63) (137 mg, 87%, dr.>99/1).

Brown solid; m.p. 63-65° C.; $^1H$ NMR (600 MHz, $CDCl_3$): δ 7.59 (d, J=7.8 Hz, 2H), 7.53 (d, J=8.2 Hz, 2H), 7.44 (t, J=7.7 Hz, 2H), 7.36-7.31 (m, 1H), 7.27 (d, J=7.8 Hz, 2H), 4.08-3.72 (m, 1H), 2.98 (s, 3H), 2.79 (t, J=7.6 Hz, 2H), 1.71-1.53 (m, 2H), 1.42-1.31 (m, 1H), 1.16-1.06 (m, 1H), 0.66 (q, J=6.7 Hz, 1H); $^{13}$C NMR (150 MHz, CDCl$_3$): δ 140.9, 140.4, 138.9, 128.8, 128.7, 127.1, 127.1, 126.9, 58.7, 37.6, 34.3, 32.7, 18.1, 12.1; HRMS (ESI): Calculated for C$_{18}$H$_{20}$NaO$_3$S [M+Na]$^+$: 339.1031, Found: 339.1024.

The invention claimed is:

1. A method of preparing a silane derivative represented by Chemical Formula 1, the method comprising preparing Chemical Formula 1 via a reaction between Chemical Formula 2 and Chemical Formula 3 in the presence of a borane catalyst:

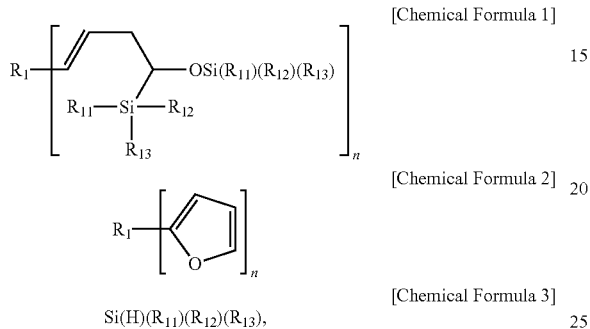

[Chemical Formula 1]

[Chemical Formula 2]

Si(H)(R$_{11}$)(R$_{12}$)(R$_{13}$), [Chemical Formula 3]

wherein, in Chemical Formulae 1 to 3,

R$_1$ is C$_1$-C$_{10}$ alkyl or C$_6$-C$_{20}$ aryl with a radical number depending on n;

R$_{11}$ to R$_{13}$ are each independently C$_1$-C$_{10}$ alkyl or C$_6$-C$_{12}$ aryl;

n is an integer of 1 to 3 and, when n is equal to or greater than 2, R$_1$ is aryl; and alkyl and aryl of R$_1$ are further substituted with any one selected from halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, and —OSi(R$_{21}$)(R$_{22}$)(R$_{23}$) and R$_{21}$ to R$_{23}$ are each independently C$_1$-C$_{10}$ alkyl or C$_6$-C$_{12}$ aryl.

2. The method of claim 1, wherein Chemical Formula 1 is represented by Chemical Formula 1-1 and Chemical Formula 2 is represented by Chemical Formula 2-1:

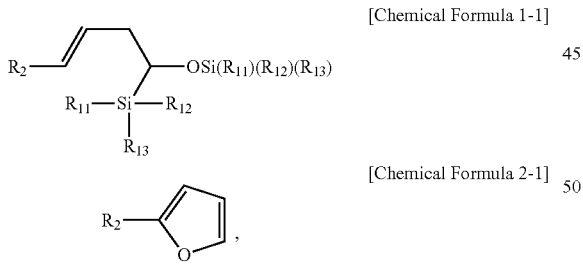

[Chemical Formula 1-1]

[Chemical Formula 2-1]

wherein, in Chemical Formulae 1-1 and 2-1,

R$_2$ is C$_1$-C$_{10}$ alkyl or C$_6$-C$_{18}$ aryl;

R$_{11}$ to R$_{13}$ are each independently C$_1$-C$_{10}$ alkyl or C$_6$-C$_{12}$ aryl; and alkyl and aryl of R$_2$ are further substituted with any one selected from halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, and —OSi(R$_{21}$)(R$_{22}$)(R$_{23}$) and R$_{21}$ to R$_{23}$ are each independently C$_1$-C$_{10}$ alkyl or C$_6$-C$_{12}$ aryl.

3. The method of claim 1, wherein Chemical Formula 1 is represented by Chemical Formula 1-2 and Chemical Formula 2 is represented by Chemical Formula 2-2:

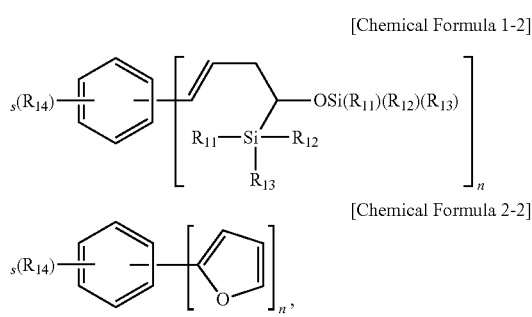

[Chemical Formula 1-2]

[Chemical Formula 2-2]

wherein, in Chemical Formulae 1-2 and 2-2,

R$^{11}$ to R$^{13}$ are each independently C$_1$-C$_{10}$ alkyl or C$_6$-C$_{12}$ aryl;

n is an integer of 1 to 3;

R$_{14}$ is halogen, C$_1$-C$_{10}$ alkyl, halo C$_1$-C$_{10}$ alkyl, thio C$_1$-C$_{10}$ alkyl, C$_1$-C$_{10}$ alkoxy, C$_6$-C$_{12}$ aryl, C$_6$-C$_{12}$ aryloxy, or —OSi(R$_{21}$)(R$_{22}$)(R$_{23}$);

R$_{21}$ to R$_{23}$ are each independently C$_1$-C$_{10}$ alkyl or C$_6$-C$_{12}$ aryl; and s is an integer of 0 or 1 to 4 and n+s≤6.

4. The method of claim 1, wherein the borane catalyst is B(C$_6$F$_5$)$_3$, (C$_6$F$_5$CH$_2$CH$_2$)B(C$_6$F$_5$)$_2$, (CF$_3$(CF$_2$)$_3$(CH$_2$)$_2$B (C$_6$F$_5$)$_2$, HB(C$_6$F$_5$)$_2$, B(C$_6$H$_5$)$_3$, or ClB(C$_6$F$_5$)$_2$.

5. The method of claim 1, wherein the borane catalyst is used in 0.01 to 0.03 mol based on 1 mol of the compound of Chemical Formula 2, Chemical Formula 5, Chemical Formula 7, Chemical Formula 9, or Chemical Formula 11.

6. The method of claim 1, wherein:

Chemical Formula 3 is used in 2.0 to 2.5 moles based on 1 mol of the compound of Chemical Formula 2, Chemical Formula 5, Chemical Formula 7, or Chemical Formula 11; and Chemical Formula 3-1 is used in 2.0 to 2.5 moles based on 1 mol of the compound of Chemical Formula 9.

7. The method of claim 1, wherein the borane catalyst is B(C$_6$F$_5$)$_3$ and Chemical Formula 3 is PhMe$_2$SiH.

* * * * *